US009742880B2

(12) United States Patent
Eisner et al.

(10) Patent No.: US 9,742,880 B2
(45) Date of Patent: Aug. 22, 2017

(54) SYSTEM AND METHOD FOR EXCHANGING INFORMATION AMONG EXCHANGE APPLICATIONS

(75) Inventors: Mark Eisner, Boxborough, MA (US); Gabriel Oancea, Boxborough, MA (US)

(73) Assignee: FireStar Software, Inc., Boxborough, MA (US)

( * ) Notice: Subject to any disclaimer, the term of this patent is extended or adjusted under 35 U.S.C. 154(b) by 0 days.

(21) Appl. No.: 13/418,240

(22) Filed: Mar. 12, 2012

(65) Prior Publication Data

US 2013/0041888 A1 Feb. 14, 2013

Related U.S. Application Data

(63) Continuation of application No. 11/566,177, filed on Dec. 1, 2006, now abandoned.
(Continued)

(51) Int. Cl.
*G06F 15/173* (2006.01)
*H04L 29/06* (2006.01)
(Continued)

(52) U.S. Cl.
CPC .............. *H04L 69/22* (2013.01); *G06F 9/546* (2013.01); *G06F 15/16* (2013.01); *G06Q 10/10* (2013.01); *G06Q 20/027* (2013.01); *G06Q 30/00* (2013.01); *H04L 29/0653* (2013.01); *H04L 29/0863* (2013.01); *H04L 29/08072* (2013.01); *H04L 49/309* (2013.01); *H04L 49/3009* (2013.01);
(Continued)

(58) Field of Classification Search
CPC ... H04L 29/08072; H04L 69/22; H04L 12/58; H04L 63/123; H04L 63/0823; H04L 63/126; H04L 63/102; H04L 63/12; G06Q 10/10; G06Q 20/027; G06F 9/546; G04L 67/10; G04L 67/28; G04L 67/2823; G04L 67/2804
USPC ................ 709/223, 224, 225; 707/102, 201; 370/401, 428, 474
See application file for complete search history.

(56) References Cited

U.S. PATENT DOCUMENTS 4,375,032 A 2/1983 Uchida
4,445,176 A 4/1984 Burk et al.
(Continued)

FOREIGN PATENT DOCUMENTS

WO WO-98/44676 A1 10/1998
WO WO-2005/112390 A1 11/2004
(Continued)

OTHER PUBLICATIONS

Ironport Appliances, "Ironport X1000T Preventive Security Email System", Oct. 2005.
(Continued)

*Primary Examiner* — Thuong Nguyen
(74) *Attorney, Agent, or Firm* — Anderson Gorecki LLP

(57) ABSTRACT

In a system and method for accessing messages in a data store in a gateway, a data frame request, which is a structured SQL query, is received at the gateway. The received data frame request is applied to the gateway data store, which stores messages. A data frame is generated that comprises messages from the data store that are responsive to the received data frame request, the data frame having a format that is readable by a character editor.

25 Claims, 14 Drawing Sheets

Related U.S. Application Data

(60) Provisional application No. 60/741,046, filed on Dec. 1, 2005.

(51) Int. Cl.

| | |
|---|---|
| *G06F 15/16* | (2006.01) |
| *H04L 29/08* | (2006.01) |
| *H04L 12/935* | (2013.01) |
| *H04L 12/861* | (2013.01) |
| *G06F 9/54* | (2006.01) |
| *G06Q 10/10* | (2012.01) |
| *G06Q 20/02* | (2012.01) |
| *G06Q 30/00* | (2012.01) |
| *H04L 12/58* | (2006.01) |

(52) U.S. Cl.
CPC ...... *H04L 49/9042* (2013.01); *H04L 63/0823* (2013.01); *H04L 63/102* (2013.01); *H04L 63/12* (2013.01); *H04L 63/123* (2013.01); *H04L 63/126* (2013.01); *H04L 67/10* (2013.01); *H04L 67/147* (2013.01); *H04L 67/28* (2013.01); *H04L 67/2804* (2013.01); *H04L 67/2823* (2013.01); *H04L 69/161* (2013.01); *G06F 2209/548* (2013.01); *H04L 12/58* (2013.01); *H04L 2463/102* (2013.01)

(56) References Cited

U.S. PATENT DOCUMENTS

| | | | |
|---|---|---|---|
| 5,497,491 A | 3/1996 | Mitchell et al. | |
| 5,522,077 A | 5/1996 | Cuthbert et al. | |
| 5,542,078 A | 7/1996 | Martel et al. | |
| 5,774,668 A | 6/1998 | Choquier et al. | |
| 5,781,902 A | 7/1998 | Waszkiewicz et al. | |
| 5,937,402 A | 8/1999 | Pandit et al. | |
| 5,943,137 A | 8/1999 | Larson et al. | |
| 6,081,591 A | 6/2000 | Skoog | |
| 6,101,502 A | 8/2000 | Heubner et al. | |
| 6,212,546 B1 | 4/2001 | Starkovich et al. | |
| 6,237,018 B1 | 5/2001 | Chessell | |
| 6,253,249 B1 | 6/2001 | Belzile et al. | |
| 6,353,834 B1 | 3/2002 | Wong et al. | |
| 6,356,951 B1 | 3/2002 | Gentry, Jr. | |
| 6,385,643 B1 | 5/2002 | Jacobs et al. | |
| 6,442,269 B1 | 8/2002 | Ehrlich et al. | |
| 6,516,353 B1 | 2/2003 | Richards | |
| 6,529,513 B1 | 3/2003 | Howard et al. | |
| 6,594,268 B1* | 7/2003 | Aukia et al. | 370/400 |
| 6,678,782 B1 | 1/2004 | Aydemir et al. | |
| 6,704,747 B1* | 3/2004 | Fong | |
| 6,768,994 B1 | 7/2004 | Howard et al. | |
| 6,769,124 B1 | 7/2004 | Schoening et al. | |
| 6,778,703 B1 | 8/2004 | Zlotnick et al. | |
| 6,829,634 B1 | 12/2004 | Holt et al. | |
| 6,901,428 B1* | 5/2005 | Frazier et al. | 709/203 |
| 6,904,449 B1 | 6/2005 | Quinones | |
| 7,000,120 B1 | 2/2006 | Koodli et al. | |
| 7,069,240 B2 | 6/2006 | Spero et al. | |
| 7,080,408 B1 | 7/2006 | Pak et al. | |
| 7,082,446 B1 | 7/2006 | Bottomley | |
| 7,082,458 B1 | 7/2006 | Guadagno et al. | |
| 7,136,485 B2 | 11/2006 | Wee et al. | |
| 7,139,844 B2 | 11/2006 | Smith et al. | |
| 7,149,777 B1 | 12/2006 | Rhee et al. | |
| 7,167,924 B1 | 1/2007 | Symonds et al. | |
| 7,181,766 B2 | 2/2007 | Bendinelli et al. | |
| 7,363,653 B2* | 4/2008 | Deng et al. | 726/11 |
| 7,376,830 B2 | 5/2008 | Sethi et al. | |
| 7,437,362 B1 | 10/2008 | Ben-Natan | |
| 7,447,775 B1 | 11/2008 | Zhu et al. | |
| 7,454,462 B2 | 11/2008 | Belfiore et al. | |
| 7,509,414 B2 | 3/2009 | Agarwal et al. | |
| 7,516,214 B2 | 4/2009 | Gandhi et al. | |
| 7,516,229 B2 | 4/2009 | Trastour et al. | |
| 7,562,382 B2 | 7/2009 | Hinton et al. | |
| 7,650,431 B2 | 1/2010 | Wang et al. | |
| 7,650,432 B2 | 1/2010 | Bosworth et al. | |
| 7,661,106 B1 | 2/2010 | Ankireddipally et al. | |
| 7,669,212 B2 | 2/2010 | Alao et al. | |
| 7,672,737 B2 | 3/2010 | Hood et al. | |
| 7,689,711 B2 | 3/2010 | Brouk et al. | |
| 7,706,831 B2 | 4/2010 | Richardson et al. | |
| 7,716,409 B2 | 5/2010 | Hum et al. | |
| 7,774,791 B1 | 8/2010 | Appelbaum et al. | |
| 7,813,822 B1 | 10/2010 | Hoffberg | |
| 7,996,352 B2 | 8/2011 | Jung et al. | |
| 8,001,546 B2 | 8/2011 | Felt et al. | |
| 8,032,409 B1 | 10/2011 | Mikurak | |
| 8,234,338 B1 | 7/2012 | Dagum et al. | |
| 2001/0028656 A1 | 10/2001 | Fukunaga | |
| 2001/0039570 A1 | 11/2001 | Stewart et al. | |
| 2001/0047326 A1 | 11/2001 | Broadbent et al. | |
| 2001/0051884 A1 | 12/2001 | Wallis et al. | |
| 2002/0007423 A1 | 1/2002 | Arao | |
| 2002/0010618 A1* | 1/2002 | Pellegrinelli et al. | 705/10 |
| 2002/0019884 A1 | 2/2002 | Gungabeesoon | |
| 2002/0023159 A1 | 2/2002 | Vange et al. | |
| 2002/0026513 A1* | 2/2002 | Hoglund et al. | 709/227 |
| 2002/0035559 A1* | 3/2002 | Crowe et al. | 707/2 |
| 2002/0049603 A1 | 4/2002 | Mehra et al. | |
| 2002/0059170 A1 | 5/2002 | Vange | |
| 2002/0059390 A1 | 5/2002 | Fletcher et al. | |
| 2002/0091533 A1 | 7/2002 | Ims et al. | |
| 2002/0107831 A1* | 8/2002 | Sturms et al. | 707/1 |
| 2002/0116453 A1 | 8/2002 | Todorov et al. | |
| 2002/0120603 A1 | 8/2002 | Thompson et al. | |
| 2002/0128946 A1 | 9/2002 | Chehade et al. | |
| 2002/0138582 A1 | 9/2002 | Chandra et al. | |
| 2002/0147711 A1* | 10/2002 | Hattori et al. | 707/3 |
| 2002/0156874 A1 | 10/2002 | Suorsa et al. | |
| 2002/0174010 A1 | 11/2002 | Rice, III | |
| 2002/0174244 A1 | 11/2002 | Beckwith et al. | |
| 2002/0186697 A1* | 12/2002 | Thakkar | 370/401 |
| 2002/0188657 A1 | 12/2002 | Traversat et al. | |
| 2003/0028585 A1 | 2/2003 | Yeager et al. | |
| 2003/0033349 A1 | 2/2003 | Lambert et al. | |
| 2003/0040992 A1 | 2/2003 | Ryan et al. | |
| 2003/0050931 A1 | 3/2003 | Harman et al. | |
| 2003/0083966 A1 | 5/2003 | Treibach-Heck et al. | |
| 2003/0097597 A1 | 5/2003 | Lewis | |
| 2003/0101283 A1 | 5/2003 | Lewis et al. | |
| 2003/0110097 A1 | 6/2003 | Lei | |
| 2003/0149594 A1 | 8/2003 | Beazley et al. | |
| 2003/0167229 A1 | 9/2003 | Ludwig et al. | |
| 2003/0212667 A1* | 11/2003 | Andersch et al. | 707/3 |
| 2003/0212676 A1* | 11/2003 | Bruce et al. | 707/5 |
| 2003/0212900 A1 | 11/2003 | Liu et al. | |
| 2003/0217000 A1 | 11/2003 | Wichman | |
| 2004/0001226 A1 | 1/2004 | Ohtuka et al. | |
| 2004/0010570 A1 | 1/2004 | Kaler et al. | |
| 2004/0019808 A1* | 1/2004 | Devine et al. | 713/201 |
| 2004/0028212 A1 | 2/2004 | Lok et al. | |
| 2004/0044985 A1 | 3/2004 | Kompalli et al. | |
| 2004/0078580 A1 | 4/2004 | Hsu et al. | |
| 2004/0090989 A1 | 5/2004 | Kobayashi | |
| 2004/0103367 A1 | 5/2004 | Riss et al. | |
| 2004/0128229 A1 | 7/2004 | Raines et al. | |
| 2004/0131082 A1 | 7/2004 | Evans et al. | |
| 2004/0168115 A1* | 8/2004 | Bauernschmidt et al. | 715/500 |
| 2004/0168124 A1 | 8/2004 | Beisiegel et al. | |
| 2004/0196797 A1* | 10/2004 | Lee et al. | 370/313 |
| 2004/0260921 A1 | 12/2004 | Treadwell | |
| 2005/0005266 A1 | 1/2005 | Datig et al. | |
| 2005/0010117 A1 | 1/2005 | Agutter et al. | |
| 2005/0021689 A1 | 1/2005 | Marvin et al. | |
| 2005/0027683 A1 | 2/2005 | Dill et al. | |
| 2005/0027851 A1 | 2/2005 | McKeown et al. | |
| 2005/0043940 A1 | 2/2005 | Elder | |
| 2005/0044197 A1 | 2/2005 | Lai et al. | |
| 2005/0060420 A1 | 3/2005 | Kovacevic | |
| 2005/0066058 A1 | 3/2005 | An et al. | |
| 2005/0067482 A1 | 3/2005 | Wu et al. | |

(56) References Cited

U.S. PATENT DOCUMENTS

| | | |
|---|---|---|
| 2005/0078580 A1 | 4/2005 | Kochale et al. |
| 2005/0086384 A1 | 4/2005 | Ernst |
| 2005/0089046 A1 | 4/2005 | Moussa et al. |
| 2005/0102361 A1 | 5/2005 | Winjum et al. |
| 2005/0110616 A1 | 5/2005 | Kajiwara |
| 2005/0120090 A1 | 6/2005 | Kamiya |
| 2005/0147251 A1 | 7/2005 | Wada et al. |
| 2005/0149759 A1 | 7/2005 | Vishwanath et al. |
| 2005/0157736 A1* | 7/2005 | Hamlin et al. ............ 370/412 |
| 2005/0159969 A1* | 7/2005 | Sheppard ................... 705/1 |
| 2005/0165761 A1 | 7/2005 | Chan et al. |
| 2005/0187873 A1 | 8/2005 | Labrou et al. |
| 2005/0198261 A1* | 9/2005 | Durvasula et al. ......... 709/224 |
| 2005/0223368 A1 | 10/2005 | Smith et al. |
| 2005/0228865 A1 | 10/2005 | Hirsch |
| 2005/0240445 A1 | 10/2005 | Sutherland et al. |
| 2005/0246211 A1 | 11/2005 | Kaiser |
| 2005/0246415 A1 | 11/2005 | Belfiore et al. |
| 2005/0251611 A1 | 11/2005 | Creta et al. |
| 2005/0257045 A1 | 11/2005 | Bushman et al. |
| 2005/0259797 A1 | 11/2005 | Swartz et al. |
| 2005/0259866 A1 | 11/2005 | Jacobs et al. |
| 2005/0262025 A1 | 11/2005 | Wajih et al. |
| 2005/0267947 A1 | 12/2005 | Patrick et al. |
| 2006/0007954 A1 | 1/2006 | Agrawal et al. |
| 2006/0010495 A1 | 1/2006 | Cohen et al. |
| 2006/0026655 A1 | 2/2006 | Perez |
| 2006/0031536 A1 | 2/2006 | Eydelman et al. |
| 2006/0056413 A1 | 3/2006 | Ikeda et al. |
| 2006/0059107 A1 | 3/2006 | Elmore et al. |
| 2006/0069912 A1 | 3/2006 | Zheng et al. |
| 2006/0069926 A1 | 3/2006 | Ginter et al. |
| 2006/0075102 A1 | 4/2006 | Cupit |
| 2006/0085331 A1 | 4/2006 | Imrey et al. |
| 2006/0085850 A1 | 4/2006 | Mayfield et al. |
| 2006/0101089 A1 | 5/2006 | Parr et al. |
| 2006/0107036 A1 | 5/2006 | Randle et al. |
| 2006/0123225 A1 | 6/2006 | Sharma et al. |
| 2006/0123467 A1 | 6/2006 | Kumar et al. |
| 2006/0123477 A1 | 6/2006 | Raghavan et al. |
| 2006/0136555 A1 | 6/2006 | Patrick et al. |
| 2006/0143098 A1 | 6/2006 | Lazaridis |
| 2006/0146879 A1 | 7/2006 | Anthias et al. |
| 2006/0167818 A1* | 7/2006 | Wentker et al. ............ 705/64 |
| 2006/0168318 A1 | 7/2006 | Twiss |
| 2006/0173985 A1 | 8/2006 | Moore et al. |
| 2006/0182103 A1* | 8/2006 | Martini et al. ............ 370/389 |
| 2006/0206558 A1 | 9/2006 | Cohen et al. |
| 2006/0224361 A1 | 10/2006 | McIntyre et al. |
| 2006/0233180 A1 | 10/2006 | Serghi et al. |
| 2006/0235716 A1 | 10/2006 | Mahesh et al. |
| 2006/0248009 A1 | 11/2006 | Hicks et al. |
| 2006/0253447 A1 | 11/2006 | Judge |
| 2006/0265689 A1 | 11/2006 | Kuznetsov et al. |
| 2006/0294333 A1 | 12/2006 | Michaylov et al. |
| 2007/0005774 A1 | 1/2007 | Singh et al. |
| 2007/0047586 A1 | 3/2007 | Tieman et al. |
| 2007/0061393 A1 | 3/2007 | Moore et al. |
| 2007/0067473 A1 | 3/2007 | Baikov et al. |
| 2007/0067475 A1 | 3/2007 | Videlov et al. |
| 2007/0067494 A1 | 3/2007 | Savchenko et al. |
| 2007/0067630 A1 | 3/2007 | Lenkov et al. |
| 2007/0078761 A1 | 4/2007 | Kagan et al. |
| 2007/0107012 A1 | 5/2007 | Rachamadugu |
| 2007/0107031 A1 | 5/2007 | Chan |
| 2007/0107032 A1 | 5/2007 | Rachamadugu |
| 2007/0124725 A1 | 5/2007 | Wang et al. |
| 2007/0143398 A1 | 6/2007 | Graham et al. |
| 2007/0150387 A1 | 6/2007 | Seubert et al. |
| 2007/0154098 A1 | 7/2007 | Geva et al. |
| 2007/0168301 A1 | 7/2007 | Eisner et al. |
| 2007/0171923 A1 | 7/2007 | Eisner et al. |
| 2007/0171924 A1 | 7/2007 | Eisner et al. |
| 2007/0180150 A1 | 8/2007 | Eisner et al. |
| 2007/0198437 A1 | 8/2007 | Eisner et al. |
| 2007/0214459 A1 | 9/2007 | Hsiao et al. |
| 2007/0233536 A1 | 10/2007 | Johnson et al. |
| 2007/0239818 A1 | 10/2007 | Liou et al. |
| 2007/0239858 A1 | 10/2007 | Banerji et al. |
| 2007/0239911 A1 | 10/2007 | Finnerty et al. |
| 2007/0271341 A1 | 11/2007 | Kumar et al. |
| 2007/0283150 A1 | 12/2007 | Cozianu |
| 2007/0288254 A1 | 12/2007 | Eisner |
| 2007/0294410 A1 | 12/2007 | Pandya et al. |
| 2008/0091550 A1 | 4/2008 | Zacarias et al. |
| 2008/0133136 A1 | 6/2008 | Breed et al. |
| 2008/0133582 A1* | 6/2008 | Andersch et al. ............ 707/102 |
| 2008/0147790 A1 | 6/2008 | Malaney et al. |
| 2008/0148413 A1 | 6/2008 | Brown et al. |
| 2008/0195651 A1 | 8/2008 | Rachmiel et al. |
| 2008/0222042 A1 | 9/2008 | Moore et al. |
| 2008/0249938 A1 | 10/2008 | Drake-Stoker |
| 2008/0255981 A1 | 10/2008 | Shiu |
| 2009/0111433 A1* | 4/2009 | Muhonen et al. ......... 455/414.1 |
| 2009/0235319 A1 | 9/2009 | Mao et al. |
| 2010/0042846 A1 | 2/2010 | Trotter et al. |
| 2010/0076813 A1 | 3/2010 | Ghosh et al. |
| 2010/0116880 A1 | 5/2010 | Stollman |
| 2010/0120408 A1 | 5/2010 | Beenau et al. |
| 2010/0144380 A1 | 6/2010 | Washburn |
| 2010/0169134 A1 | 7/2010 | Cheng et al. |
| 2010/0223629 A1 | 9/2010 | Appelbaum et al. |
| 2010/0235433 A1 | 9/2010 | Ansari et al. |
| 2011/0019651 A1* | 1/2011 | Fulknier et al. ............ 370/338 |
| 2011/0047290 A1 | 2/2011 | Levett |
| 2011/0082713 A1 | 4/2011 | Imrey et al. |
| 2011/0161132 A1 | 6/2011 | Goel et al. |
| 2011/0202597 A1 | 8/2011 | Mousseau et al. |

FOREIGN PATENT DOCUMENTS

| | | |
|---|---|---|
| WO | WO-2005/043274 A2 | 5/2005 |
| WO | WO-2006/034201 A2 | 3/2006 |

OTHER PUBLICATIONS

Kreger, Heather. Web services conceptual architecture. In IBM Technical Report Series, published May 1, 2001.

Yendluri, "RosettaNet Implementation Framework," Internet Citation, Feb. 2000, http://www.rosettanet.org/RosettaNet/Doc/0/TA0508VV3E7KLRIDD1BMU6N38/RN1F2.1.pdf, retrieved Oct. 18, 2008.

Handley, et al. "SDP: Description Protocol", RFC 2327, 1998.

Office Action in received in Canadian Appln No. 2,631,753 dated Nov. 22, 2013.

Rosenburg, et al. "SIP. Session Initiation Protocol", 2002, RFC 3261.

Sacha Schlegel, The ebXML Collaboration Protocol Agreement Formation Process, 2005.

Office Action received in Candian Appln No. 2,631,770 dated Feb. 10, 2014.

* cited by examiner

One-Step Transaction

SYSTEM AND METHOD FOR EXCHANGING INFORMATION AMONG EXCHANGE APPLICATIONS

CROSS REFERENCE TO RELATED PATENT APPLICATIONS

This application is a continuation of U.S. application Ser. No. 11/566,177, filed Dec. 1, 2006, which in turn claims priority to U.S. Provisional Application No. 60/741,046, filed Dec. 1, 2005, the disclosures of which are incorporated by reference herein in their entirety.

FIELD OF THE INVENTION

The present invention relates generally to communication systems and, more particularly, to a system and method for exchanging information among remote exchange applications.

BACKGROUND OF THE INVENTION

With the continued growth and expansion of computer technology and computer networks, such as the Internet, many companies are attempting to capitalize on the ability to perform automated electronic transactions or other automated functions with other companies as part of their daily and on-going businesses processes and business management. A computerized business transaction is a domain specific, distributed application that involves the sending and receiving of information that can be part of a multiple-enterprise business process. The information exchanges in a business transaction are contained in standardized and self-defined messages. Software applications in an enterprise create and process messages in preparation for sending them and process the messages after they have been received. In some cases, it can appear that human beings do the processing, such as ordering a widget online, and the like. However, since those individuals must interact through an application, say, for example, a browser, it is considered that an "application" is doing the processing.

Business transactions can be as simple as the one-way transmission of information, for example, a payment from an accounts payable application in Corporation A to an accounts receivable application in Corporation B. The business transactions can be as complicated as a multi-step transaction that involves many players and include many sub-transactions, for example, the cross-border settlement of a stock purchase that could involve over a dozen players. Also, business transactions can span a very short time interval, for example, a Request/Response interaction that approves the use of a credit card, or can literally span days or months, for example, the settlement of an insurance claim.

However, companies face numerous challenges to automating multi-enterprise electronic transactions. Generally, each company will have a private computer network and use a proprietary data format for conducting various types of transactions. Consequently, there is no common data format that would allow each of these companies to easily share information for automatically conducting such electronic transactions. Accordingly, disparate client information technology environments can generate excessive custom integration costs. Additionally, it can be exceedingly difficult to enforce a consistent transaction process across multiple independent companies, particularly when each company uses a different transaction process and different data formats for a given transaction. The high cost of integration can limit market penetration of such solutions. If gateway messages passed between companies are not valid, there can be a significant loss in time and money, and a concomitant increase in liability, for these companies to diagnose and repair the invalid gateway messages. As a result, modifying the management and transaction systems of companies to support multi-enterprise electronic transaction can be extremely costly and difficult to implement. Such problems and difficulties increase quickly as the client population grows to large numbers.

Therefore, there is a need for a system that greatly simplifies the development process for building inter-corporate automated exchanges. Such a system would minimize changes to each client's environment and would operate with each company's data formats and existing products. Such a system would provide the capability to manage message creation, consistency, data validation, and security, and allow the ability to audit and non-repudiate transactions. Such a system would also enable each client to maintain their proprietary environment independent of the exchange application.

SUMMARY OF THE INVENTION

According to an aspect of the invention, in a system and method for accessing messages in a data store in a gateway, a data frame request, which is a structured SQL query, is received at the gateway. The received data frame request is applied to the gateway data store, which stores messages. A data frame is generated that comprises messages from the data store that are responsive to the received data frame request, the data frame having a format that is readable by a character editor.

Further features, aspects and advantages of the present invention will become apparent from the detailed description of preferred embodiments that follows, when considered together with the accompanying figures of drawing.

DETAILED DESCRIPTION OF PREFERRED EMBODIMENTS

Figure 1:
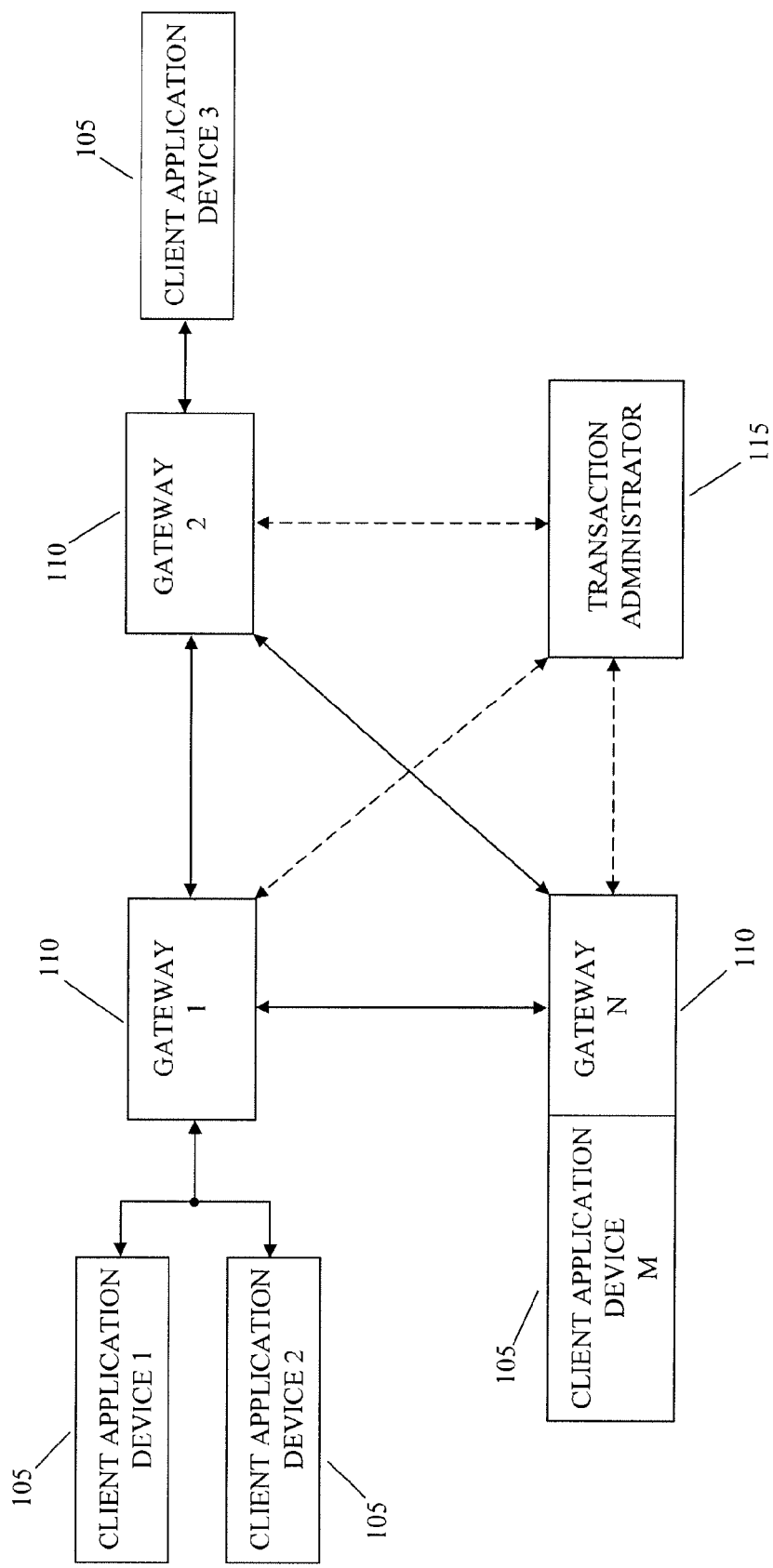
FIG. 1 is a diagram illustrating system for system for communicating messages, in accordance with an exemplary embodiment of the present invention.

Exemplary embodiments of the present invention are directed to a system and method for system and method for exchanging information among remote exchange applications, such as to participate in and complete transactions. According to exemplary embodiments, the system is comprised of a distributed application platform that is configured, for example, to handle defined, computerized business transactions among a community of disparate companies. The system can integrate existing client environments, regardless of the client's technology choices and data formats. The system is configured to convert existing client data into a common model data that can be shared among all other clients. The system includes the functions of a robust message system, and does not require a centralized processor or centralized database.

The system provides the capability to develop multi-enterprise business transaction exchange applications (i.e., gateway applications), with minimal impact on each client. More particularly, the system can be used by a controlling manager, such as, for example, a solution provider, that builds, distributes and manages the business transaction exchange applications among a group of clients. The solution providers can define global transaction attributes, such as, for example, the transactions supported, global validation rules, security, message processes, data stores and common services, that are shared with each client. However, each client can retain autonomy over their (perhaps unique and/or proprietary) transactions and data formats. Each client can maintain a local store of transactions that are transmitted and received. Additionally, each client can use their existing file formats and transport software, as the system uses the client's existing infrastructure. Consequently, little or no changes are required for the client's applications.

Thus, the solution provider can design the gateway applications using exemplary embodiments of the present invention to build an application that can be distributed and installed at all desired client sites. Each of the gateway applications is configured to communicate with other gateway applications in one or more common data formats that are shared and understood by all of the gateway applications. The gateway application at a client's site is also integrated to the local client's data formats, transport protocols, and any customized requirements. The local gateway applications are then configured to convert or otherwise transform the proprietary transaction information from the local client application into the common data format so that the information can be communicated to another, remote gateway application. Once received, the remote gateway application can convert or otherwise transform the transaction information in the common data format to the data format required by the remote client application. Thus, according to exemplary embodiments, all clients can send and receive transaction information to and from other clients to perform inter-corporate, multi-enterprise automated business or other suitable transactions.

These and other aspects of the present invention will now be described in greater detail. FIG. 1 is a diagram illustrating system 100 for system for communicating transaction information, in accordance with an exemplary embodiment of the present invention. The system 100 includes a plurality of client application devices 105 (e.g., client application device 1, client application device 2, client application device 3, . . . , client application device M, where M can be any suitable number). The client application devices 105 are distributed among one or more local client application devices and one or more remote client application devices. The system 100 also includes a plurality of gateways 110 (e.g., gateway 1, gateway 2, . . . , gateway N, where N can be any suitable number). The plurality of gateways 110, which can also be referred to as transaction exchangers, are distributed among one or more local gateways and one or more remote gateways.

For purposes of illustration and not limitation, the first gateway 110 (i.e., gateway 1) can be a local transition exchanger. Consequently, for the present illustration, the second through Nth gateways 110 (i.e., gateway 2, . . . , gateway N) can be remote gateways with respect to the (local) first gateway 110. Additionally, the first and second client application devices 105 (i.e., client application device 1 and client application device 2) can be local client application devices with respect to the first (local) transition exchanger 110. Therefore, for the present illustration, the second and third through Mth client application devices 105 (i.e., client application device 2, client application device 3, . . . , client application device M) can be remote client application devices with respect to the (local) first and second client application devices 105.

More particularly, the one or more local gateways 110 are configured to communicate transaction information with the one or more local client application devices 105, with which the one or more local gateways 110 are associated, using one or more local data formats. The one or more remote gateways 110 are configured to communicate the transaction information with the one or more remote client application devices 105, with which the one or more remote gateways 110 are associated, using one or more remote data formats. In other words, each gateway 110 is a local gateway with respect to itself. The client application device 105 is a local client application device with respect to the local gateway 110 with which the client application device 105 is associated. Consequently, any gateways 110 not located locally are remote gateways 110 with respect to the local gateway 110. Additionally, any client application devices 105 not located locally are remote client application devices 105 with respect to the local client application device 105 and the associated local gateway 110.

Each client application device 105 communicates with the associated gateway 105 using one or more local data formats. In other words, each gateway 110 understands the one or more local data formats used by the client application device 105 with which the gateway 110 is associated. For example, each client application device 105 can be a proprietary, customized or otherwise unique user application that uses proprietary, customized or otherwise unique data formats to undertake and process a transaction. The local data format of each (local) client application device 105 may not be understood or otherwise compatible with local data formats used by other (remote) client application devices 105. Therefore, according to exemplary embodiments, the one or more local gateways 110 are configured to transform the transaction information in the one or more local data formats into one or more common data formats that are shared with the one or more remote gateways 110. Thus, each gateway 110 can convert the transaction information in the local data format used by the associated client application device 105 into a data format that is understood and used by all transactions exchangers 110. Such a common data format allows each gateway 110 to communicate and share data or other messages with one or more other gateways 110.

For example, for purposes of illustration and not limitation, the first gateway 110 can transform the transaction information from the first client application device 105 from the local data format used by the first client application device 105 to the common data format used by the gateways 110. Once transformed, the first gateway 110 can transmit or otherwise communicate the transaction information in the common data format to another gateway 110, such as the second gateway 110. When the second gateway 110 receives the transaction information in the common data format, the second gateway 110 is configured to transform the transaction information in the common data format into the data format used by the third client application device 105 with which the second gateway 110 is associated. In other words, the one or more remote gateways 110 can transform or otherwise convert the transaction information in the one or more common data formats into the one or more remote data formats. Thus, according to exemplary embodiments, the transaction information from the one or more local client application devices 105 can be communicated to the one or more remote client application devices 105 for completing a transaction, without regard to the data formats used by each of the client application devices 105.

Conversely, the one or more remote gateways 110 are configured to transform the transaction information in the one or more remote data formats into the one or more common data formats that are shared with the one or more local gateways 110. For example, for purposes of illustration and not limitation, the second gateway 110 can transform the transaction information from the third client application device 105 from the local data format used by the third client application device 105 to the common data format used by the gateways 110. Once transformed, the second gateway 110 can transmit or otherwise communicate the transaction information in the common data format to another gateway 110, such as the first gateway 110. When the first gateway 110 receives the transaction information in the common data format, the first gateway 110 is configured to transform the transaction information in the common data format into the data format used by the first client application device 105 with which the first gateway 110 is associated. In other words, the one or more local gateways 110 are configured to transform the transaction information in the one or more common data formats into the one or more local data formats that are used by the local client application devices 105 associated with the local gateway 110. Thus, according to exemplary embodiments, the transaction information from the one or more remote client application devices 105 can be communicated to the one or more local client application devices 105 for completing the transaction, regardless of the data formats used by each of the client application devices 105. For example, each client can send and receive transaction information to and from other clients to perform inter-corporate, multi-enterprise automated business or other suitable transactions via the gateways 110 according to exemplary embodiments of the present invention.

As can be seen in FIG. 1, the communication connections between the gateways 110 form a network. A community of enterprises that share a specific set of automated business transactions using the gateways 110 is referred to herein as a Members-Only Interconnect (MOI). MOIs can be set up to serve a wide range of transaction-specific communities, from some that are very large and global, such as, for example, the community of banks that need to process cross-border payment transactions, to small local communities such as, for example, a small regional medical community including doctors, pharmacies, hospitals, payers, and the like. Each member in an MOI sends/receives standardized transaction information from/to an internal application that is meant to process that information. The client application devices 105 can comprise these internal applications.

A more general architecture than the MOI is referred to as a Service-Oriented Architecture (SOA). An SOA is a peer-to-peer network comprised of nodes that can usually be divided into client-nodes, which consume the processing done within the SOA, and service nodes, which provide an identifiable, single-purpose function to support the transaction. An MOI can be considered as containing a special, stylized distributed application—the "business transaction application" (BTA)—that a user has created to support a specific set of business transactions. The BTA is built by configuring and customizing the gateways 110. Thus, the system 100 is a fully-distributed application based on an SOA. Consequently, there is no central process, but, rather, a peer-to-peer network of applications connected together and communicating through the gateways 110. The clients of the BTA are the client application devices 105 that are creating, sending, receiving and processing the standardized information contained in the business transaction. This information is contained in a message, which is referred to here as a gateway message. The structure and format of gateway messages exchanged between gateways 110 in a BTA is fixed and defined by the users. The (local) client application devices 105 interact with a local gateway 110 through message queues. In addition to client application devices 105, the MOI can contain a number of specialized service applications that perform specific functions that support the execution of the given business transaction, such as, for example, authentication, coordinated time-stamping, logging services, credit checks, non-repudiation, data augmentation, routing services, and the like.

Figure 2:
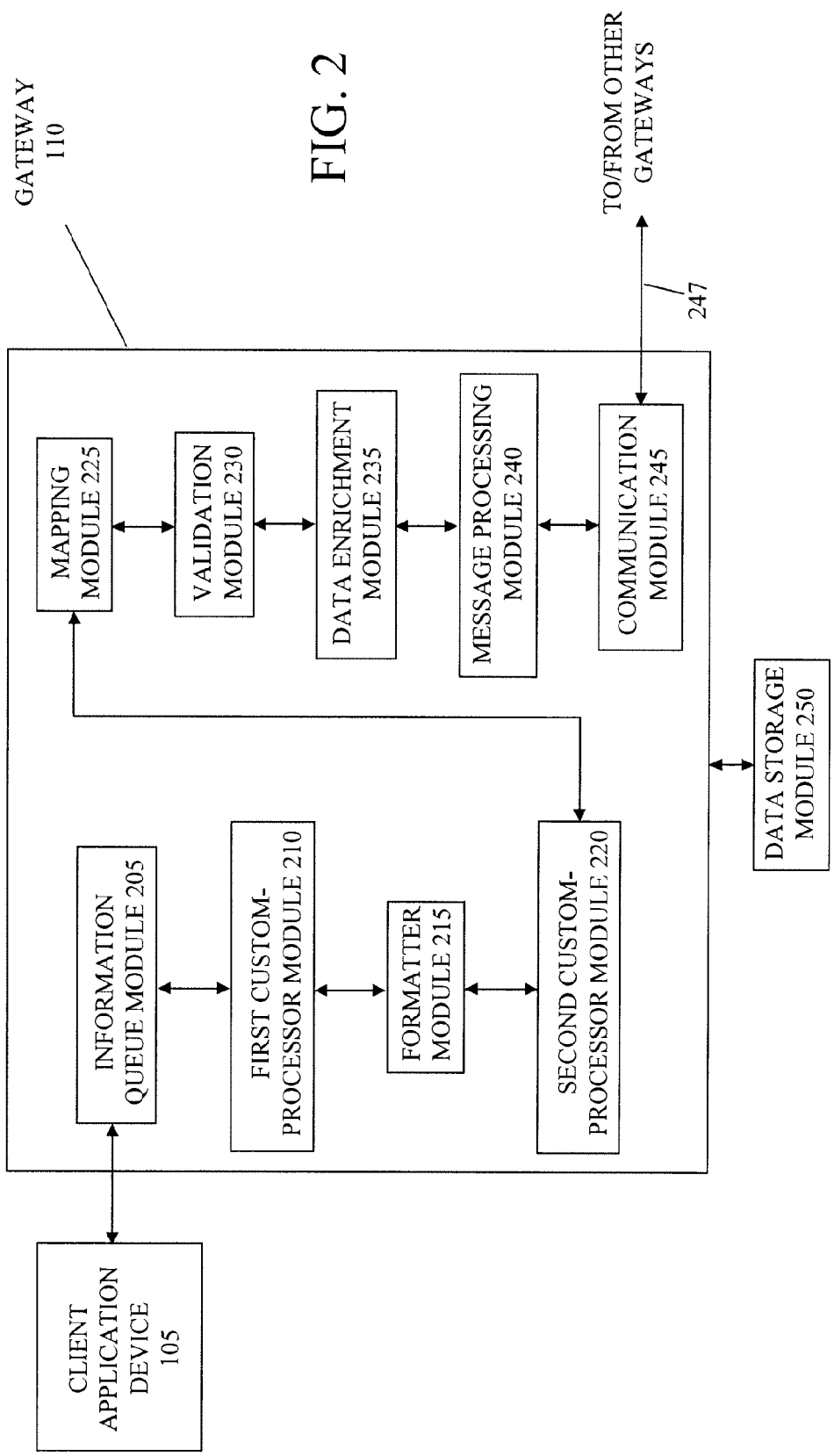
FIG. 2 is a diagram illustrating a gateway, in accordance with an exemplary embodiment of the present invention.

To convert between the local and common data formats so that transaction or other information can be passed from the local client application device 105 to the remote client application device 105, suitable message processing is performed in each gateway 110. FIG. 2 is a diagram illustrating a gateway 110, in accordance with an exemplary embodiment of the present invention. The gateway 110 includes an information queue module 205. The information queue module is configured to communicate transaction information in one or more local data formats with the client application device 105, although the information queue module 205 can be in communication with any suitable number of (local) client application devices 105. In other words, the information queue module 205 is configured to handle messages coming from the (local) client application device 105.

To interface and communicate with the (local) client application devices 105, the gateways 110 use message queues that are referred to herein as "abstract queues," as these abstract queues can standardize and abstract the interface between the gateways 110 and a wide variety of message delivery mechanisms. From the viewpoint of the gateway 110, an abstract queue can pass the message the abstract queue receives from either the (local) client application device 105 or from other (remote) gateways 110, and can receive messages from the gateway 110 to be sent either to a (local) client application device 105 or to a (remote) gateway 110. The gateway 110 can interact with an abstract queue through simple APIs, which contain a small amount of basic information about the message and a reference to the bytes that make up the message. The supplied information is sufficient so that the gateway 110 or the abstract queue can determine how to process the referenced message. Each abstract queue can have an associated error queue on which are placed messages that are not able to be processed for some reason, along with an error message (e.g., in a fixed format) describing the error. The error queues can be, for example, folders on the (local) gateway 110 where the files are placed. Such an error queue is at a level higher than the delivery mechanism error queue, which is specific to the delivery mechanism. For example, if the delivery mechanism is a JMS message broker, and the message cannot reach the intended message broker queue, then the message will be placed in the message broker's error queue.

Additionally, for each of the information queue module 205 and the communication module 245 (discussed below), the gateway 110 instantiates a queue listener as part of an abstract queue. The queue listener "listens" for or otherwise detects a message received by an abstract queue. The respective queue listener can send a signal to the information queue module 205 or the communication module 245 when the respective queue listener has received or detected a message. Such signals can be the event that begins processing by the gateway 110.

An abstract queue has the general qualities of a queue—for example, the ability to add and remove items, to create a listener for the queue and the like—but is abstract in the sense that it "sits on top" of the details of the mechanism that is implemented to send and receive messages (either to the client application device 105 or to other gateways 110). For example, the implementation of an abstract queue can be a standard JMS-based message broker or MOM, a Web service, FTP, an API call to an end user application, a database query, or the like.

One aspect of the abstract queue is to loosely couple the delivery mechanism and the business transaction in the gateway 110. There is no tight coupling with a MOM backbone as there is with many ESBs, so there is no requirement that the gateways 110 use a particular vendor or even a particular delivery mechanism to participate in a business transaction. Thus, the gateways 110 can be adapted to whatever transport mechanism is in place and being used by the client application devices 105.

Another aspect of the abstract queue is that it allows connection to the MOI using configuration tools, rather than requiring software coding. For example, a set of pre-built abstract queue adapters can be configurable simply by setting suitable properties. If changes in delivery strategy are required by a gateway 110, changes can be made to a different abstract queue type and suitable properties can be set, rather than re-coding the gateways 110.

The abstract queue properties can depend on, for example, the abstract queue type, which will be based on the particular client application device 105. Some properties of the abstract queues include the abstract queue name. Abstract queues are addressable entities within the gateway 110, and can therefore use a unique (within the gateway 110) name to identify them. The name can be any suitable designation or address, such a combination of alphanumeric characters, an IP address, or the like. For abstract queues for connecting with other gateways 110, such a name or designation should be available to other gateways 110 for addressing purposes.

According to an exemplary embodiment, the abstract queues can support guaranteed delivery. A delivery mechanism that does not support guaranteed delivery (e.g., FTP) may require additional processing by the sending/receiving gateways 110. For example, there might be additional properties required so that the sending gateway 110 can do the work that a normal MOM would do. For example, the gateway 110 can temporarily persist the message, wait for a callback that indicated the message was received (e.g., the message acknowledgment), and then delete the message from temporary persistent storage. However, if the message was not received within a certain period of time, the gateway 110 can re-send the message, up to the maximum number of retries. Alternatively, "alert" properties can be established (e.g., Time To Alert, Alert Destination, Alert Text), so that if no acknowledgment is received within a certain time, then an alert occurs.

The abstract queues can also include suitable listener properties. The listener properties can define what the abstract queue is listening for, e.g., what is the triggering event. For example, for an FTP abstract queue type, the listener property can be the name of the folder where the abstract queue checks for new files. However, for a message broker, the listener properly can be the queue where the abstract queue checks for messages. For example, the MOI architecture can support asynchronous transactions through the use of abstract queues at each gateway 110. The arrival of a message at an abstract queue can be the trigger that causes the gateway 110 to process that message. Such an architecture provides a simple, loosely-coupled interaction framework for building business transactions between participants.

One of the advantages of abstract queues is that they allow BTAs to be built on a wide, diverse set of message protocols, including legacy transports, e.g., FTP, direct leased lines, and the like. Consequently, BTAs should not entail the large changes in infrastructure required by other service-oriented solutions, such as, for example, ESBs and the like. According to exemplary embodiments, there are numerous types of abstract queues that can be used for the gateways 110. One example of an abstract queue is a JMS-compliant message broker abstract queue. Such an abstract queue can encapsulate a standard JMS interface to a message broker. Most conventional message brokers are JMS compliant and can provide such an interface, e.g., SonicMQ, MQSeries, other open source products and the like. For example, Manta Ray, one such open source product, can be used with the gateways 110. Manta Ray is suited for the fully distributed, decentralized nature of an MOI, as Manta Ray is fully distributed, i.e., all processing is done within the Manta Ray client and there is no central bus server. Additional JMS-compliant abstract queues may be necessary, depending upon the application. For example, an abstract queue may be necessary for MQSeries message brokers, because of the widespread popularity of such a message broker in the financial community.

Another example of an abstract queue is an FTP abstract queue. For example, much business transaction information is sent and received through batch-oriented FTP processes. An abstract queue can be used to encapsulate such a mechanism for moving information. Two versions of the abstract queue can be used—one that treats the file to be sent or received via FTP as a single payload, the other that treats each record within a file as a separate payload. However, other configurations of the FTP abstract queue can be used. The FTP abstract queue can provide a significant amount of flexibility to the gateway 110. A (local) client application device 105 can send a file to an FTP-based abstract queue used by the information queue module 205. The abstract queue can then pass each record of the file as a payload to the information queue module 205. After the gateway 110 has processed these records, the records can be re-packaged by an FTP-based abstract queue used by the communication module 245 and sent using FTP to another gateway 110. Alternatively, the records can be sent as separate messages using, for example, a JMS-based abstract queue.

There are situations in which two parties may desire to exchange data via FTP. In such an example, the user desires to send a file via FTP using the MOI architecture and gateways 110. An FTP abstract queue can be set up at the gateway 110 that is directed to the (local) client application device 105. For example, the FTP abstract queue can check a particular directory (defined by a property) to "listen" for incoming information. When the client application device 105 adds a file to the directory, the FTP abstract queue can activate the gateway 110 as though a message were added to a queue.

Certain header information can be provided to the FTP abstract queue, such as, for example, the transaction type, the message type, the recipient's address and the like. The FTP abstract queue can combine such information (the message metadata) with the non-normative data (the message content) to create a message that can be processed by the gateway 110, the last step of which is to place the message on a FTP abstract queue that is in communication with the other (remote) gateways 110. The "network-facing" FTP abstract queue can then send the file to the appropriate destination using the FTP protocol. The FTP abstract queue can send the bytes via FTP to the destination, which can be simply a directory. The destination gateway 110 can include an FTP abstract queue set up to listen on that directory. When the file arrives, the gateway 110 can act as though a message was received on a queue, and perform processing to reconstitute the file as a message that the gateway 110 can understand. At that point, subsequent gateway 110 processing begins, as discussed below. It should be noted that FTP can be used to batch together multiple messages in one file, and have the receiving gateway 110 reconstitute the file as individual messages.

Another example of an abstract queue is a direct-line abstract queue. Much of current inter-enterprise transactions between applications is performed between client applications at the users' locations and a large centralized server at a remote server location. These client/server systems generally use direct leased line connections. The direct-line abstract queue can wrap the underlying direct line messaging protocol, allowing the gateways 110 to be used with such legacy systems.

A further example of an abstract queue is a web services/SOAP abstract queue. Such an abstract queue can use SOAP to handle the transmission of a message. In many cases, these web service abstract queues can be used to handle Request/Response messages when specific queries need a direct response. Many internal system messages can also utilize this type of abstract queue. For example, an instantiation of a web service abstract queue can handle interactions with the (local) client application device 105 that, for efficiency, can utilize the normative XML messages (discussed below).

Another example of an abstract queue is a database integration abstract queue. An advantage of the MOI and architecture of system 100 is the ease of integrating the gateways 110 with internal applications and databases. The database integration abstract queue can access the message payload to make it simpler for users to send or receive messages directly from/to an internal database. For example, to send a message, the database integration abstract queue can map data from an internal database to its own version of the message payload object model. The abstract queue can then create a normative message (as discussed below) for that payload and pass the message onto the gateway 110. Such a process would be reversed to receive and store a message into an internal database. Substantially all of the capabilities necessary to interact with the internal database are supported. Such functionality can include support for any JDBC driver so that many forms of tabular data can be accessed. It should be noted that the integration to internal applications is separated from the central mapping in the gateway 110, so that management of the MOI can be performed (including, for example, handling injection and versioning (discussed below)), without interfering with the local customization efforts undertaken by users.

According to an exemplary embodiment, the messages communicated between the (local) client application device 105 and the information queue module 205 can be referred to as "queue messages" or "raw messages." The queue (or raw) message is a message received from an abstract queue. The queue message can be comprised of, for example, a minimal header and the message data. The header in a queue message can be different than the header used for other message types used by the gateway 110, as discussed below. The queue header can include a minimal amount of information, such as which formatter to use (if needed), the message type, the transaction type, and other like information. The header information can be imparted to the message via the abstract queue. The message data in a queue message is simply an array of bytes. Nothing else need be assumed about the payload. As discussed below, for queue messages coming from the (local) client application device 105, the formatter module 215 can transform the queue messages into corresponding non-normative information, such as, for example, XML messages.

The gateway 110 optionally includes a first custom-processor module 210 in communication with the information queue module 205. The first custom-processor module 210 is configured to process the transaction information using the one or more local data formats used by the (local) client application device 105. The first custom-processor module 210 is provided to allow users to add customized processing capabilities to the gateway 110. For example, the user can configure the first custom-processor module 210 to perform a series of actions on the transaction information while that information is still in the local data format (e.g., add or modify the transaction information, re-format the transaction information, and the like). According to an exemplary embodiment, since the user can add functionality to their own process module, a wide variety of local processing can be supported, such as, for example, data enrichment, complex business rule authorizations, and the like.

More particularly, according to an exemplary embodiment, the first custom-processor module 210 can be responsible for executing a series of steps called an "action list" on the message content (or payload) that is in the local data format. The first custom-processor module 210 can perform, for example, validation, enforce local security policies, perform data enrichment, and the like, as desired by the user. An action list defines the steps that the first-custom processor module 210 follows for a message. Action lists can be associated with a particular message type. Action list templates can be provided that can be used as a starting point for users to configure their action lists. The user can configure the appropriate parameters for the action lists, such as, for example, by specifying queue names, log file names, and the like. According to exemplary embodiments, no software coding is necessary for performing such a configuration. The action list can specify that certain steps are required or that certain steps can be skipped that are not required. Additional steps can be added to an action list at any time to extend the processing that occurs with the first custom-processor module 210. There is no restriction on the sequence in which steps can be defined for processing. However, the user should ensure that the sequence of steps are proper and logical. Separate action lists can reside in each gateway 110.

According to an exemplary embodiment, one or more predefined steps can be used to create an action list for the first custom-processor module 210. For example, such predefined steps can include, but are not limited to: validate the message content; create an entry in a local log file; send a different message (different message type), for example, to creates a new transaction; send the message to an enterprise-facing abstract queue (discussed below), which can trigger additional processing via another application, web service, or the like; store the message and its state in a repository associated with the gateway 110; and other like predefined steps. However, there is no requirement that any of these steps be used. Each step may have different properties defined. For example, the log step might have properties for the log file location, while the send reply step might specify the message type to send, and the like. In addition to using such predefined steps, the user can create additional customized steps can be used when building action lists.

According to an exemplary embodiment, steps can be processed in the order in which they are defined in the action list, in a linear sequence. However, conditional branching, forking and joining can also be used. Additionally, steps can be synchronous, meaning that processing is blocked until a step is complete, although asynchronous processing can also be used. Furthermore, a step can be flagged as a long-duration step (not to be confused with long-running transactions) if the processing for that step is not expected to return immediately. For example, such flagging can enable the inclusion of manual processing, or some other process that takes hours or even days to complete. Note that this facility may provide the "look and feel" of an asynchronous process, but is actually a synchronous process. For a long-duration step, the message state can be persisted to a repository associated with the gateway 110 (e.g., the data storage module 250 discussed below), and a "listener" process can be established to wait for a return from the sub-processing that was invoked. Long-duration steps can include additional properties specifying, for example, the maximum time to wait and the error queue to notify if the sub-process exceeds such a limit.

In the event of a failure of one or more steps performed by the action lists, the action list can define which of the following can happen when a step fails: all further processing stops, and another action (from a short list) may be invoked, such as sending the message to an error queue; a warning is logged (either directly in the repository or via an administrative message), and processing continues with the next step in the Local Processor action list; or the failure is ignored. Additional or alternative error events can occur when one or more of the steps to be performed by the action list fail.

The gateway 110 includes a formatter module 215 in communication with the first custom-processor module 210 (or the information queue module 205 if no first custom-processor module 210 is used or present). The formatter module 215 is configured to transform the transaction information in the one or more local data formats into a data format associated with the gateway 110. The data format associated with the gateway 110 can be any suitable data format that can be used by the gateway 110. According to an exemplary embodiment, the data format associated with the gateway is referred to herein as "non-normative information," and can comprise XML or the like. Merely for purposes of discussion and illustration, XML will be used as an example of the non-normative information, although any other suitable data formats can be used for the non-normative information. For example, messages processed within the gateway 110 can be well-formed XML documents. However, messages from the (local) client application device 105 can be in a variety of formats, e.g., EDI, a flat file, or any other proprietary or custom format. The formatter module 215 is configured to transform messages from/to such external formats to/from a non-normative XML message that the gateway 110 can understand and manipulate.

More particularly, the formatter module 215 can be responsible for performing a one-for-one "tokenization" or transformation of a non-XML message into an XML message (e.g., EDI to XML), and vice versa. For a "sending" transformation, the formatter module 215 can transform a queue (or raw) message (e.g., non-XML) from the (local) client application device 105 into a non-normative XML message format that the gateway 110 can process. The gateway 110 can process the resulting non-normative XML message, because the gateway 110 uses a map between the non-normative XML message and a normative data model. For "receiving" transformations, the formatter module 215 can transform a non-normative XML message into a queue message (e.g., non-XML) that the (local) client application device 105 can process. The formatter module 215 can support any suitable transformation to/from the non-normative information (e.g., XML), such as, for example, EDIFACT, X12, FIN (or, more generally, SWIFT non-XML (ISO 7775)), fixed-length flat files, delimited flat files, FIX, and the like.

As used herein, a non-normative XML message is a well-formed XML message that conforms to an XML model that is part of the gateway 110 application map. The XML model is mapped to the normative data model (the object model). The difference between a non-normative XML message and a normative message is two-fold. First, a non-normative XML message is an XML message, while a normative message can be either an XML message or an instantiated message object. The second difference is one of degree. Both messages are represented by an XML model in the application map, but the XML model of the normative message can be considered to be an exact or substantially exact representation of the normative data model. The XML model of the non-normative XML message is a variation on the normative data model. For messages coming from the client application device 105, a non-normative XML message is the result of a one-for-one "tokenization" or transformation of a non-XML message into an XML message by the formatter module 215. In other words, the formatter module 215 takes the queue message (for example, EDI) and changes the form of the queue message to the non-normative information, such as XML or the like.

Producing a non-normative XML message is the first step in the process of creating a normative message. Each non-normative XML message is defined by an XML model in the application map, which is mapped to the normative data model (the object model). From such a mapping, a normative message can be created. For messages going to the client application device 105, part of the processing of the gateway 110 can involve converting a message into the correct non-normative XML message format so that it can be transformed by the formatter module 215 into a queue message.

According to exemplary embodiments, when a message is placed on an outbound queue of the client application device 105, the queue listener, based on information in the queue message it receives from the abstract queue, determines the formatter module 215 and format map to use for transforming the queue message appropriately into a non-normative XML message. Thus, each gateway 110 can support one or more formatter modules 215, with each formatter module 215 supporting a separate transformation format. Alternatively, a single formatter module 215 can support numerous transformation formats, with the appropriate format selected based on information in the queue message. It should be noted that the header may indicate that no formatting is required (e.g., the message is already in the correct format for the gateway 110 to process), in which case the processing performed by the formatter module 215 can be skipped. Once processed by the formatter module 215, the non-normative message is passed to the (optional) second custom-processor module 220.

For a message received by a gateway 105, the formatter module 215 is invoked after the (optional) second custom-processor module 220 is finished. The message is changed from a normative message to a non-normative message so that the formatter module 215 can process it. In addition, the formatter module 215 and the format map to be used can be determined based on information in the message header of the received gateway message. The formatter module 215 then transforms the message from a non-normative XML message into a queue message that is appropriate for the client application device 105.

The formatter module 215 can be a COTS product that can include a design-time component that can be used to create standard transformations that would be included as part of a service offering. The formatter module 215 can optionally use validation to confirm the accuracy of the transformation. For example, if the (local) client application device 105 requires a different or more stringent data format than that required by other MOI participants, such validation can be included in the format map used by the formatter module 215.

The gateway 110 can optionally include the second custom-processor module 220 in communication with the formatter module 215. The second custom-processor module 220 can be configured to process transformed transaction information using the data format associated with the gateway 110. According to an exemplary embodiment, the second custom-processor module 220 can be used to process the non-normative XML message transformed by the formatter module 215. The second custom-processor module 220 is provided to allow users to add customized processing capabilities to the gateway 110. For example, the user can configure the second custom-processor module 220 to perform a series of actions on the transaction information while that information is in the non-normative XML format (e.g., add or modify the transaction information, re-format the transaction information, and the like). As with the first custom-processor module 210, the second custom-processor module 220 can be responsible for executing one or more action lists on the non-normative XML message before further processing.

The gateway 110 includes a mapping module 225 in communication with the second custom-processor module 220 (or the formatter module 215 if no second custom-processor module 220 is used or present). The mapping module 225 is configured to convert the transaction information in the data format associated with the gateway 110 into a common data format that is shared with at least one other gateway 110, using a normative data model configured to generate normative transaction information. A normative message reflects the normative data model used by members of the MOI. The normative message can be either an instantiated message object (or set of objects), or an XML message. A normative message can be sent to and received from any other gateway 110 in the MOI. The normative data model can be based on industry-sponsored initiatives, such as HL7, FIX, SWIFT, RosettaNet, or the like, or can be defined as part of a new application. However, the normative data model can use any suitable type of mapping that is configured to transform or otherwise map the non-normative information into the normative information that can be shared with and understood by all of the gateways 110.

The normative data model is part of the application map that can be used by the gateways 110 to perform the transformation or conversion between the data of different formats. An application map can include, for example, a main map file, which simply points to the other files, an object model, and one or more XML maps, each of which is comprised of an XML model and a mapping between that model and the object model. There is generally one object model in an application map, although other object models can be used. The object model is the normalized data model for the gateway 110. The object model describes the message classes and their relationships. The object model can also contain the validation rules used by the validation module 230 (discussed below), as well as the business transaction definitions, and other suitable information. An XML map is comprised of an XML model and an object-model-to-XML-model mapping. An XML map can be used by the gateway 110 to transform an XML message to an instantiated message object based upon a given XML model, and to transform an instantiated message object back to XML. Such a facility allows the gateways 110 to handle multiple XML message formats that map to the same normative data. In other words, the object model represents the normative information shared by all members of the MOI, but each member can use different XML schemas to represent that data in an XML message.

The gateway 110 can also include a validation module 230 in communication with the mapping module 225. The validation module 230 is configured to validate the normative transaction information. For example, the validation module 230 can validate the normative transaction information to ensure that the normative transaction information includes data required by mandatory data fields and cross-data field constraints.

More particularly, validation is performed by the validation module 230 using validation rules specified by the user. The validation rules are part of the application map that each gateway 110 uses to participate in the MOI to ensure that messages exchanged between members are valid according to the commonly-accepted validation rules of the members.

It should be noted that message validation is not a separate service performed as part of a process flow. Rather, each gateway 110 can validate any message. Such a mechanism can be contrasted with conventional approaches that require a central validation service that can become a process bottleneck, or that include a separate validation service as part of a process flow. Although performed by the validation module 230, validation can also be one of the steps that can be invoked by the action lists used by the first and second custom-processor modules 210 and 220, respectively. For example, the user can define when the validation should be invoked, in addition to the validation performed by the validation module 230 when sending a message. Since action lists are defined on a per message type basis, such a mechanism allows for validation to be invoked for one message type but not another. The user can also make validation an optional step for certain message types and a required step for others. The validation performed by the validation module 230 can be referred to as "local validation," since the rules are defined and maintained for a particular gateway 110, rather than globally for all gateways 110. Local validation is generally not less stringent than global validation.

As discussed previously, the validation rules are part of the application map. The validation rules are associated with the normative data model (the object model), which is the "hub" of that map, rather than with the XML schemas to which the object model is mapped. The validation module 230 validates the objects, not the XML. Such an approach allows for more comprehensive data validation than is possible using an approach that simply validates XML against XML schema. In particular, the latter approach, as used by conventional architectures, cannot handle cross-field validation (for example, if Field A is null, Field B must be greater than $1,000). In contrast, the validation module 230 is capable of performing cross-field validation. Cross-field validation is a very common requirement for validating messages, but because it cannot be handled by validating against XML schema, it is generally handled by the business logic layer in conventional architectures. The validation approach used by the validation module 230 can, therefore, extend data validation into the realm of business rules to allow more business rules to be handled by simpler validation rules.

The validation rules used by the gateway 110 can be of two types: field-level validation rules, that define the allowable data and format for a specific field; and cross-field validation rules, that can validate the data/format of one field in a message instance against the data/format of another field, as well as against global system values such as current date/time and the like. Validation rules can use regular relational (>, ≥, and the like) and logical (AND, OR, NOT and the like) operators, as well as parenthesis for grouping. Also, arithmetic operators (+, −, * and /) can be used, as well as special operators such as "ISNULL", ":" and the like. A selected set of string, numeric, and Boolean functions can also be used to build the validation rules.

The gateway 110 can include a data enrichment module 235 in communication with the validation module 230. The data enrichment module 235 is configured to customize the validated normative transaction information to generate enriched normative transaction information. The data enrichment module 235 can be used by the user to add, modify or otherwise customize, in any suitable manner, the normative transaction information that has been validated by the validation module 230. For example, the data enrichment module 235 can be used to add the four digit add-on code (identifying a geographic segment within the five digit zip code delivery area) to a five-digit zip code or the like. The data enrichment module 235 does not alter the validated normative transaction information in such a way as to make the data unusable by or unshareable with other gateways 110. Rather, the data enrichment module 235 can be used to augment the validated normative transaction information to include additional (normative) information that can be shared with other gateways 110 and, ultimately, used by the (remote) client application devices 105.

The gateway 110 includes a message processing module 240 in communication with the data enrichment module 235. The message processing module 240 is configured to generate a transaction or gateway message by providing an envelope for the (validated and possibly enriched) normative transaction information in the common data format. Transaction information is encapsulated in a message, in particular, a gateway message. The message processing module 240 is further configured to execute predetermined next actions and processing demands that can be imposed by at least one other (remote) gateway 110 (e.g., to include information in the message that is expected by the (remote) gateway 110).

According to exemplary embodiments, a message is comprised of an envelope that contains blocks of information. The envelope has a small set of information including, for example, a unique ID for a message and certain other information that will permit the gateway 110 to process it. The blocks contain the various sets of information that comprise the message. One block type is the payload that contains the transaction information that is to be transmitted from an initiator to a target. Other blocks can contain information to support processing by the gateway 110, such as, for example, transmission, persistence, security and the like. For example, blocks can include information about the target's address, message security, and the like. Two exemplary blocks that can be used in a message are: 1.) the transaction routing slip that defines the path the message is to follow in the MOI as it goes from initiator to target; and 2.) the message processing history that keeps a running record of all state changes incurred by the message, for example, visiting an intermediate service, and the like. Thus, the envelope is a wrapper that is used to bundle the normative transaction information for transmission to other (remote) gateways 110 and the associated (remote) client application devices 105. The blocks other than the payload can be considered a message header for the gateway message.

Figure 3:
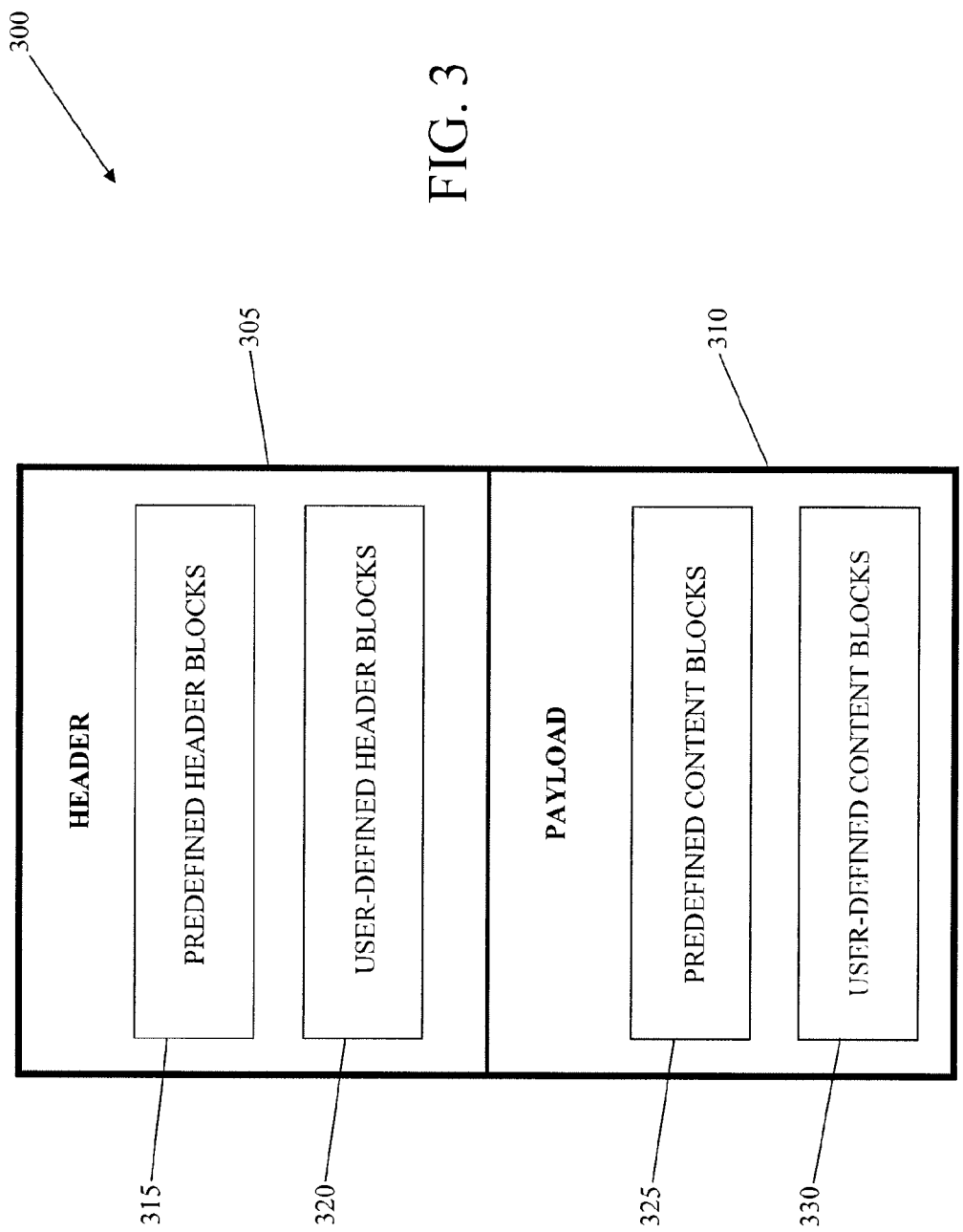
FIG. 3 is a diagram illustrating a gateway message, in accordance with an exemplary embodiment of the present invention.

More particularly, FIG. 3 is a diagram illustrating a gateway message 300, in accordance with an exemplary embodiment of the present invention. The gateway message 300 comprises the message data 310 (payload or message content), message metadata 305 (header or message context), and, optionally, a message network header (e.g., as part of the message metadata 305). The message data 310 is comprised of instances of classes from the application domain model (i.e., the application map). The message data 310 can exist in a local data format (i.e., the data format used by the (local) client application device 105). The message data 310 can also be encrypted when sent over the network. The message metadata 305 is comprised of a set of user and system information that accompanies the message data 310. Some of the message metadata 305 can be supplied by the user (such as an addressee). Other data elements can be supplied by the gateway 110 through the message processing module 240, such as, for example, a unique message identifier, a timestamp, transaction context, and the like. Both users involved in a transaction (the local and remote client application devices 105) can view and otherwise use the metadata information. According to exemplary embodiments, the metadata information can be stored with the message data 310 in local data storage. The optional message network header can be comprised of a set of system-generated information that is used by the communications layer to properly deliver the message. The message network header is generally not visible or accessible to either users involved in a transaction, and does not have to be persistent. Some or all of the information in the message network header can be derived by the message processing module 240 from, for example, the message metadata 305.

According to an exemplary embodiment, each message can include a unique message identifier, generated by the message processing module 240 of the originating gateway 110. A message identifier can be guaranteed to be unique within the MOI. The message identifier generated by the message processing module 240 is independent of any message identifier generated by the communications infrastructure. According to an exemplary embodiment, the system 100 can support itinerary-based routing for messages. In other words, messages can be routed based on the business transaction definitions created by the users. These definitions can define the central services through which a message passes for a given message type and transaction type. When a message is instantiated, the itinerary is carried with the gateway message 300 in one of the header blocks of the message metadata 305 as the gateway message 300 travels through the system 100. For example, the itinerary can be declared as a linear sequence of gateways 110 through which the gateway message 300 passes until the gateway message 300 reaches its destination. The system 100 can also support content-based routing. In content-based routing, a gateway 110 can make decisions on where a message is to be routed based on the contents of the message. For example, the message processing module 240 can use message header-based routing, in which the message processing module 240 determines the next leg of the route based on information in a specific message header block.

The message processing module 240 is also responsible for processing the header blocks in the message envelope when a message is received from a network-facing queue listener. According to an exemplary embodiment, the message envelope can be an XML document comprised of blocks of data. Each block can include a corresponding class that processes the block. Blocks can be processed in a particular sequence, if desired. The message envelope structure and the processing of the blocks can be the same for all messages exchanged among members of the MOI. For example, a configuration file can define the association between each message header block and the class that processes the message header block.

As illustrated in FIG. 3, the gateway message 300 can include several types of blocks. For example, the message metadata 305 can include one or more predefined header blocks 315, which include header information that cannot be customized or extended by the user, and one or more user-defined header blocks 320, which include header information that can be customized and extended by the user. The message data 310 can include one or more predefined content blocks 325, which include message content that cannot be customized or extended by the user, and one or more user-defined content blocks 330, which include message content that can be customized or extended by the user. For example, the normative transaction information can be contained in the user-defined content blocks 330 of the gateway message 300. According to an exemplary embodiment, any block can be an indirect link (e.g., using XLINK/XPATH or the like). By using an indirect link, much of the content of a message need not be in the message itself. Such indirect links can be used, for example, for an often re-used routing slip, a very large payload that is actually a file to be FTP'ed, and the like.

For the message metadata 305, Table 1 illustrates some of the types of information that can be included in the predefined header blocks 315 and the user-defined header blocks 320, although additional and/or alternative information can be included in the message metadata 305.

TABLE 1

Information in Predefined and User-Defined Header Blocks 315 and 320

| Block | Description | Predefined or User-Defined |
| --- | --- | --- |
| Message ID | Uniquely identifies a message and its context. Includes message type, message ID, transaction ID, date/time created, message category (from several defined, e.g., business message, administrative message). | Predefined |
| Security | For message authentication and encryption. Any message block can be signed and/or encrypted, and the digests are added to the Security block. | Predefined |
| Processing History | Date/time sent/received. Each gateway 110 updates the history block as the message is processed, so messages contain a record of where they have been and how they have been processed. The history can be included in the message acknowledgment which is returned to the original sender. | Predefined and User-Defined |
| Message Processing Flags | Message processing flags determine additional processing for a message, e.g., processing for potential duplicate emission, non-repudiation, not-valid warning, and the like. The classes for these message processing flags are provided by the user. | User-Defined |

TABLE 1-continued

Information in Predefined and User-Defined Header Blocks 315 and 320

| Block | Description | Predefined or User-Defined |
| --- | --- | --- |
| Routing | Routing slip specifies the gateway 110 itinerary (e.g., addressing and routing information), including central services and the final recipient. The itinerary is associated with the message type and the transactions defined for it. The routing slip can specify the entire route and the reply-to address, but at a minimum preferably specifies the next step and final destination. There can be arbitray number of steps before reaching the final destination. | User-Defined |
| Custom | To handle other processing as needed. | User-Defined |

The message metadata 305 can include the message processing history for the gateway message. In other words, every time there is a change in the state of a gateway message 300, a history of that change can be stored in the message processing history. Such changes in state can include, for example, when a message is accepted by a gateway 110 from an abstract queue, when a message is sent to an abstract queue, when a message is transformed in any way, and the like. Message processing histories are used by the gateway 110 to understand the precise state of a gateway message 300 that it has received. The combination of the routing information and the message processing history provides information that can be used by the gateway 110 to understand what processing is required to accomplish the next step in the transaction. The message processing history can be comprised of individual information components (e.g., separate processing events), and the gateway 110 can be configured to process individual information components of the message processing history.

The message processing history can also include a history of the transaction to which the transaction information is directed. For example, a transaction can comprise a compound transaction, e.g., a multi-step transaction made up of simple (binary or one-step) transactions. By including the transaction history in the message processing history, exemplary embodiments of the present invention can suspend and resume a compound transaction as required by the business needs of the users. A compound transaction can be suspended until a predetermined condition is met. For example, the predetermined condition can be a time limit (e.g., the transaction is suspended until a certain amount of time has passed) or the like. The transaction can be resumed once the predetermined condition is satisfied. Additionally, by including the transaction history in the message processing history, users (both local and remote client application devices 105) can determine the status of individual components of the compound transaction and exchange the status information, as needed, for completing the transaction. The system 100 can process or otherwise execute the individual components of the compound transaction either sequentially or in parallel.

The routing information contained of the envelope can define the high-level process flow of the transaction, such as the addressing and routing information for the gateway message 300. The routing information can specify the message itinerary (e.g., the gateways 110 through which the message will pass) and the acknowledgment behavior. According to an exemplary embodiment, the itinerary can be specified declaratively as a linear sequence of steps. For example, an itinerary can be specified as follows:

Step 1="Send the message from {origin address} to {Service 1 address}"
Step 2="Send the message from {Service 1 address} to {destination address}"
Step 3="Send ACK from {destination address} to {origin address}"

It should be noted that the routing does not specify what occurs at each gateway 110. The behavior of each gateway 110 can be determined by the message processing module 240 and the first and second custom-processors 210 and 220 of each gateway 110, which, in turn, are based on the message type and other message metadata. The routing can support a linear process. Alternatively or additionally, the routing can support forks, joins, or conditional processing behavior. The end point of a given step is considered to be the starting point of the next step. Furthermore, the routing information can be changed by intermediate gateways 110 to allow for dynamic routing in which each gateway 110 can determine the next message hop.

Each block in the gateway message 300 can be encrypted using any suitable form of encryption. Descriptive information on the type of encryption of each block can be included in a block in the message metadata 305. By encrypting individual blocks, a gateway 110 or a module within the gateway 110 can read a header block containing information for it, while not being able to read the contents of a block of message data 310. Additionally, for a PKI-based encryption system, each block in the gateway message 300 can be individually, digitally signed. Digitally signing the blocks uniquely identifies the signer, incorporates a precise time and date stamp, and can guarantee that none of the content of the signed block has been changed or otherwise altered. Descriptive information of the digital signature of each block can be included in a block in the message metadata 305. The message processing module 240 can validate the signatures for any signed blocks in the gateway message 300. The message processing module 240 can also determine whether any encrypted blocks are intended for the current gateway 110, and if so, can be read. By default, signed/encrypted blocks that are not intended for a gateway 110 cannot be modified by that gateway 110. Conversely, blocks that are not signed or encrypted can be modified by any gateway 110. If a gateway 110 modifies a signed/encrypted block that is not intended for it, then the processing associated with that block can leave the original block and signature as is, make a copy of it, modify the copy, and sign the copy.

The gateways 110 include one or more communication modules 245 in communication with the message processing module 240. The communication modules 245 are configured to communicate the gateway message with at least one other (remote) gateway 110 for completing the transaction. The communication modules 245 can be in communication with the communication modules of other gateways 110 using any suitable communication link 247 (e.g., either wired or wireless) and any suitable transmission protocol (e.g., TCP or other suitable network communication protocol). The communication modules 245 are also configured to receive gateway messages provided by the at least one other (remote) gateway 110 for completing the transaction. As discussed below, the communication modules 245 are responsible for signing and encrypting a gateway message that is to be transmitted to another (remote) gateway 110. The communication modules 245 are also responsible for "finalizing" the gateway message before the gateway message is passed to the abstract queue for transmission. For example, the communication modules 245 can resolve references to the addresses of other gateways 110, including determining the address of the next destination. The communication module 245 is also configured to send message acknowledgments, if required.

The communication modules 245 are further configured to record transmitted and received gateway messages and the transaction states of the transmitted and received gateway messages. For example, the communication module 245 can notify the information queue module 205 (using any suitable type of signal or event notification) and the (local) client application device(s) 105 that a gateway message has been transmitted. Receipt of a gateway message by the communication module 245 can be the event or signal that begins processing of the gateway message by the gateway 110 for communication of the transaction information contained in the gateway message to the (local) client application device 105. Such processing of the received gateway message would be in a substantially reverse order to that which is performed for processing transaction information from the (local) client application device 105 to generate and transmit a gateway message.

With regard to security and encryption of communicated gateway messages, the gateways 110 are configured to support security standards such as, for example, Public Key Cryptography Standards (PKCS), suitable IETF standards (e.g., X.509 certificates, S-MIME, and the like), secure transport protocols (e.g., SSL and TLS), XML Encryption and XML Signature, conventional cryptographic algorithms, including encryption (e.g., RSA, 3-DES, and the like), digest (e.g., SHA, MD5, and the like), and message authentication codes (e.g., MAC, HMAC and the like), and other like security standards. The gateways 110 are also configured to support message authentication and encryption from a level of no security (e.g., if using leased lines or working with low-value messages), to self-signed certificates, to public key infrastructure (PKI). However, the system 100 does not impose a security model on the users. Rather, the users can choose to use any of these or other security models, or none at all. However, once a model is chosen, all gateways 110 preferably comply with that security model.

For message authentication and encryption, the system 100 can support several models for authenticating/encrypting messages, including, for example, self-signed X.509 certificates and PKI. By default, the system 100 can use self-signed certificates for performing authentication and encryption. The self-signed certificates model is similar to the PKI model, except that there is no trusted third party (e.g., a certificate authority (CA)) that validates the certificates. A sender creates the private key and the certificate with which the corresponding public key is broadcast, but the identity of the sender is not verified by a third party. Such a model implies that there is some level of trust between parties that is established outside of the CA. For example, the parties might communicate via a secure leased line, or validate certificates out-of-band (e.g., through e-mail or the Web).

In contrast, a PKI binds public keys to entities, enables other entities to verify public key bindings, and provides the services needed for ongoing management of keys in a distributed system. PKI ensures that the entity identified as sending the transaction is actually the originator, that the entity receiving the transaction is the intended recipient, and that data integrity has not been compromised. A certificate binds an identity (Distinguished Name or DN) to a public key. Information encrypted with the public key can only be decrypted with its corresponding private key, and vice versa. Under the PKI model, the sender's gateway 110 would require a private key, held securely locally with the gateway 110, and a certificate with which the corresponding public key is broadcast. The key pair can be generated while creating a certificate application, which, when completed, is sent to the CA associated with the local user. It is the responsibility of the CA to verify the applicant's identity, to maintain a Certificate Revocation List (CRL) and to publish a list of valid certificates by Distinguished Name (DN). When the CA has satisfied its verification requirements, the certificate is sent to the gateway 110 and added to the list of valid certificates maintained by the gateway 110.

The list of valid message recipients for a given gateway 110 can be maintained and published by the CA associated with the (local) user. The gateway 110 can maintain a cached copy of such a list. Before each time the list is used, the gateway 110 can ensure, via a suitable communication link with the CA, that the list is up-to-date. The list can be made available to the (local) client application device 105, via the gateway 110, for presentation to the user while selecting the message recipient.

The decision about which message blocks, if any, to sign or encrypt and under what conditions is controlled by the users. More particularly, such information can be part of the envelope definition that is distributed to all members of the MOI. For each envelope block, the signing/encryption can be specified as being either mandatory, optional or not allowed. Signing data includes encrypting the data digest with a private key associated with a certificate. The gateways 110 can be configured to support the ability to sign only a portion of the data in a message. For example, particular blocks of data in an XML message (e.g., header blocks or payload blocks) can be signed. The standard security processing generally prohibits a signed message block from being changed by any intermediate gateway 110. However, if it is necessary for an intermediate gateway 110 to change signed message blocks, a copy of the original message block can be included in the message (along with its signature), then changes can be made to the copy and the copy signed.

Encrypting data generally includes the generation of a symmetric key, encrypting the message data with that key, and then encrypting the key with the public key of the intended recipient. As with signatures, the gateways 110 can be configured to support the ability to encrypt specific blocks of data in an XML message. However, the security block of a message will not be encrypted.

According to exemplary embodiments, certain processing occurs before a secure message is transmitted. Such processing can be performed by the communication modules 245, and can include the following, for example: acquire the certificate for the sender; look up the certificate for the recipient; validate the certificate; sign the gateway message or selected parts thereof; and encrypt the gateway message or selected parts thereof. Additional and/or alternative steps can also be performed by the communication modules 245 and/or the message processing module 240.

According to exemplary embodiments, if a received gateway message (or parts thereof) has been signed or encrypted, the message processing module 240 or the communication modules 245 can process the gateway message in, for example, the following manner after the gateway message is passed from the associated queue listener: extract the certificate from the gateway message; validate the received certificate; validate the gateway message signature; and if encrypted, decrypt the gateway message or the encrypted parts thereof. The various modules of the gateway 110 can then process the decrypted gateway message to pass the transaction information to the (local) client application device 105.

Each gateway 110 can include a keystore that is configured to store the private key of the sender, as well as certificates for other (remote) gateways 110 with which the (local) gateway 110 can communicate. Such a keystore can be kept up-to-date to reflect additions/deletions of participants from the list of possible message recipients, and to reflect changes to individual certificates (e.g., when a certificate expires). The keystore can be maintained and accessed differently, depending on whether the MOI is using self-signed certificates or PKI.

When a new gateway 110 joins the MOI of system 100, the certificate for the new gateway 110 is distributed to all participants who are allowed to exchange messages with the new gateway 110. The keystores of those participants are then be updated with the new certificate. In the self-signed certificates model, the gateways 110 can create the certificates and have the certificates distributed to all the other participating gateways 110 (e.g., through a centralized distribution facility) so that the keystores of those gateways 110 can be updated. In the PKI model, the CA is the trusted third party responsible for vetting and confirming the identities of the gateways 110. The CA can provide a central location for certificate storage and distribution.

As discussed previously, the gateways 110 use the abstract queues to send and receive messages. According to an exemplary embodiment, the abstract queues can be responsible for message transport security. For example, if a JMS message broker using SSL is used, then such a transport security mechanism is abstracted from the gateway 110 processing, given the nature of the abstract queues. Thus, the gateway 110 simply places a message on the abstract queue, and the abstract queue will perform all necessary subsequent processing to ensure the message transport security.

The system 100 is also configured to support non-repudiation of delivery for gateway messages. Non-repudiation of delivery provides proof that the recipient received a gateway message, and that the recipient recognized the content of the gateway message (e.g., the message could be understood by the receiving gateway 110, although this does not necessarily imply that the gateway message could be understood/consumed by the (remote) client application device 105). The security model for the gateways 110 can use self-signed X.509 certificates or the like to achieve non-repudiation, which does not involve the services of a CA. Such a model can provide a base level of non-repudiation of delivery. If a trusted third party is required for an additional level of security, the gateways 110 can be enabled and configured for PKI security, which requires a CA.

Whichever level is selected, non-repudiation can be provided without using a central service. In such a scenario, non-repudiation can be provided by the combination of digital signatures and timestamps included on transactions messages. With the addition of PKI, such signatures are vetted by the certificate chain that includes a trusted root (the CA).

However, a central service can be added, where gateway messages marked for non-repudiation can automatically pass and be recorded in a central archive. Such a scenario can add some amount of processing overhead, but also offers a non-repudiation resolution service in which all records are easily accessible, storage can be rigorously controlled, and the like. Alternatively, such functionality can be provided without using a central service. However, if the storage of gateway messages is scattered over a number of member repositories, some of which might have archived messages to offline storage, collecting the records required to prove non-repudiation may become somewhat more challenging. Nevertheless, storing gateway messages in member repositories only, as opposed to a central archive, assures that each member controls its own repository and need not entrust the control of storing gateway messages to a third party overseeing the central archive.

The gateway 110 includes a repository or data storage module 250 in communication with the gateway 110. The data storage module 250, which can also be referred to as a data store, is configured to store information transmitted and received by the gateway 110, and any other information maintained by the gateway 110. For example, the data storage module 250 can be used to enable reporting on the state of any gateway message. For example, when a gateway message is transmitted, the communication modules 245 can store the gateway message in the data storage module 250 after final processing of the gateway message is completed and before placing the gateway message on the appropriate abstract queue. When a gateway message is received, the appropriate queue listener can store the gateway message in the data storage module 250 before processing of the message begins. The information queue module 205 can update the message (e.g., the status of the message) before the associated transaction information is communicated to the (local) client application device 105. The database storage module 250 can comprise any suitable type of computer database or computer storage device that is capable of storing data. However, the structure of the database storage module 250 can be based on the object model, which is the normative data model that is used by all members of the MOI of system 100.

The data storage module 250 can also contain the information necessary for the gateway 110 to operate. However, each of these local data storage modules 250 is, in aggregate, an integral part of the BTA, as the data storage modules 250 are where the data for the BTA can be stored. While the information in the data storage modules 250 can be accessible and of interest to the (local) client application device 105 being serviced by the gateway 110, the format and schema of the data storage module 250 can be defined in the process of creating a BTA.

Other types of information that can be maintained in the data storage module 250 include the message and payload states. The data storage module 250 can persist message and payload states until the transaction with which they are associated is complete. The state of a gateway message can change as a result of, for example, processing by the gateway 110. For example, the receipt of a gateway message by the receiving gateway 110 can trigger an acknowledgement to the sending gateway 110. Such an acknowledgement can be associated with the sent gateway message, and result in a change in the reported state of the (received) gateway message. Queries of the data storage module 250 can provide reports on the state of gateway messages and transactions that have been processed by a gateway 110. The message and payload information persisted in the data storage module 250 can be retained until such information is explicitly removed. However, the data storage module 250 is both a cache and a persistence mechanism, handling the ever-changing stream of information being processed by the gateway 110, as opposed to a more traditional database, which stores information permanently for later retrieval.

The data storage module 250 can also hold any or all metadata needed by a gateway 110, such as the XML schemas associated with message payloads, the maps used to transform messages, and the like. Additionally, since the data storage modules 250 associated with each gateway 110 can provide data storage in the aggregate for a BTA, the data storage modules 150 can also be used to store other information in addition to persisted gateway messages. In particular, such additional information can include a wide variety of setting and configuration files. Also, the data storage modules 250 can contain information that can be used to monitor activity of a local gateway 110 or to monitor the BTA as a whole.

The data storage modules 250 are further configured to support "data frame" functionality. The data frame provides a mechanism for cutting and/or copying datasets from the data storage module 250 and preserving these datasets as, for example, a large XML document or other like data format. The gateways 110 can access such data frames using the same interface used to read data from the data storage modules 250. Additionally, import capabilities allow information within the data frame to be imported into the data storage module 250. For example, data frames can be used for secondary back-up and restore. The primary back-up can rely on the conventional back-up capabilities of the database used by the data storage module 250. The data frames can also be used for secure archiving. Such a feature involves cutting data from the data storage module 250, signing the "cut" data and storing such signed data as an XML document. The archived data can be read (by those that have permission) at anytime without the need for any special program.

The data frames can further be used for bulk transmission of information stored in the data storage module 250. For example, any query into the data storage module 250 can become a data frame that can then be sent as the payload in a gateway message to another member in the MOI or sent externally as an XML document. The data frames can be used for the transmission of metadata sets. Metadata can be expressed in XML documents and stored. The distribution of metadata can be accomplished by creating appropriate data frames of such metadata for distribution to and processing by the gateways 110. The data frames can also be used for signed, complete self-contained messages. In certain situations, it may become necessary to send a self-describing, self-contained gateway message with all of the information relevant to that gateway message including, for example, the original version of the message, any local transformations, the XML schema defining the payload, message history, and the like. All such information can be captured as a data frame, signed for robust non-repudiation, and sent as the payload of a gateway message. The data frame functionality can be used for other processing in conjunction with the data storage module 250.

The security of the data storage module 250 can be performed using the trusted database account principle. Such a principle means that a fixed user account is used to access the data stored in the data storage module 250, but the user will not be able to manipulate or access the database directly. The gateway 110 can access the database using a user ID and password that can be encrypted and stored within a local configuration file stored in the gateway 110. The user ID and password can be generated by the installer when the gateway 110 is installed for the first time.

The gateway messages stored in the data storage module 250 do not need to be encrypted. However, the transactions messages can be encoded. Such encoding allows any Unicode characters to reside in the gateway message body without restrictions. For example, Base64 encoding can be used, although any suitable encoding scheme can be used. A signature can be stored together with each gateway message in the data storage module 250 to ensure data integrity. The signature can include a digest of the gateway message (such as a CRC, MD5 or the like), and be encrypted with the private installation key. The private installation key can be generated when the gateway 110 is installed for the first time, on a per installation basis, and stored securely. The generated key can be encrypted with a static private key internal to the gateway 110, and stored in several locations, such as, for example, a special table in the data storage module 250, a settings file and the like. The gateway 110 can check the signature each time the gateway 110 opens a gateway message from the data storage module 250. If the gateway message was tampered with, the gateway can log an entry in a log file and cancel the opening of the gateway message in question.

Any or all information contained in the data storage module 250 can be archived at any suitable time. The data in an archive can comprise one (perhaps large) XML file (or other suitable data format) containing all or substantially all of the archived gateway messages, and any relevant records used by those gateway messages. Both gateway messages and data can be Base64 encoded or the like. Although the data in the archive can be encrypted, there is no requirement to do so. Once the archive file is created, a checksum can be computed using, for example, the SHA algorithm or other suitable checksum algorithm. The archived data file and the digest can then be compressed together in, for example, a ZIP file or the like for storage or for transmission to another site, for example, for offsite storage. When the archived data file is loaded, the digest of the archived data file can be calculated and compared with the decrypted checksum stored in the ZIP file. If the two do not match, the restore operation can be aborted, and the appropriate security violation logs can be written.

Referring to FIG. 1, the system 100 can include a transaction administrator 115. The transaction administrator 115 can be in communication with each or any of the gateways 110 in the system 110. The transaction administrator 115 can be used to measure and maintain the gateways 110. The transaction administrator 115 can also be used to monitor any suitable statistics of the gateways 110 (e.g., number of messages sent and received by each gateway 110, errors, disk reads/writes from/to data storage modules 250, and the like). Any suitable number of transaction administrators 115 can be used in the system 100 to maintain and monitor the gateways 110. According to an exemplary embodiment, the transaction administrator 115 can be comprised of a gateway 110 with the administrative capabilities to configure, measure, monitor, maintain and otherwise govern the other gateways 110 in the system 100.

The transaction administrator 115 can be configured to administer and update each gateway 110 via automated administrative messages, a process referred to herein as "injection." Thus, the transaction administrator 115 can distribute updates to each or any gateway 110 using suitable administrative messages. The administrative messages can be of the same structure as the gateway messages, such as the structure of gateway message 300 illustrated in FIG. 3. Any suitable feature of the gateways 110 can be updated independently through injection, including, for example, the object model, the XML model, the mapping between the object model and XML model, business transaction definitions, global validation rules, envelope processing configuration, abstract queue implementations, local processing action lists and associated classes, formatter maps (includes local validation), configuration files, map and configuration file structures, and the like.

In addition, any custom processing performed in the gateways 110 (e.g., via the first and second custom-processor modules 210 and 220) can be updated using appropriate administrative message sent from the transaction administrator 115. For example, the administrative messages, like the gateway messages, can provide a definable block in the envelope of the administrative message that is configured to provide parameters for the customized processes. The features of the gateways 110 can be updated using suitably-encrypted secure administrative messages. In other words, the administrative message are configured to utilize message security in a manner similar to that used in the gateway messages (e.g., individual blocks can be encrypted and signed, and the like). Additionally, the transaction administrator 115 can be configured to query one or more gateways 110 to ascertain the status of a transaction, using the unique transaction ID tags, envelope ID tags, message ID tags or other identifying information contained in a gateway message. The administrative messages used by the transaction administrator 115 can also be used to query any data stored in any data storage module 250 associated with any gateway 110.

The gateways 110 include processing that can ensure reliability in case of failure. The gateway 110 can achieve such reliability by using checkpoints at various points of the process between the modules of the gateway 110. A checkpoint is a transactional boundary that verifies the message is ready for the next step. A checkpoint sends a signal to the prior checkpoint indicating that the message was successfully processed. The prior checkpoint can then remove that message from whatever storage mechanism was used. If an error condition occurs along the way to the next checkpoint, or a timeout occurs and the message never reaches it, the whole transaction is rolled back to the state of the message as it existed at the prior checkpoint.

For example, a checkpoint can be located in the information queue module 205 at the interface to the client application device 105. A failure that occurs before this point can be handled by the abstract queue used to communicate with the client application device 105. For a transmitted message, a checkpoint can be located at the output of the communication module 245. Failure before this point can roll the message back to the state it was in at the checkpoint for the information queue module 205. Once the gateway message passes the checkpoint at the communication module 245, the gateway message can be stored in the data storage module 250. For received gateway messages, failure before this point can roll the message back to the state it was in at the checkpoint at the output of the communication module 245 of the sending gateway 110, that is, to the state of the message when it was sent (which is persisted in the data storage module 250 of the sending gateway 110). If the gateway message is received correctly, processed, but fails at the checkpoint for the information queue module 205 (i.e., before the transaction information is passed to the client application device 105), the message can be rolled back to the state it was in when received (i.e., at the checkpoint of the communication module 245). It should be noted that when a gateway message is passed to an error queue, the transaction is considered to be complete.

According to exemplary embodiments, the universe of message exchanges that can be used in a BTA is defined by business transactions that can be described utilizing activity diagrams. (An activity diagram is graphic way of describing the interaction between objects or processes.) In the case of a business transaction, the activity diagram can describe the interaction between gateways 110. Each business transaction starts by an initiator client application device 105 placing a message (transaction information) on a queue. The message is processed by the gateway 110 and then placed on the abstract queue associated with the communication module 245 to be picked up by one or more target gateways 110 for use by the (remote) client application device 105.

One difference between the BTAs supported by the system 100 and the business transactions supported by more general BTMs and workflow tools is that nested transactions need not be used by the system 100. The reason for this is that a compound transaction can be suspended with all its states and then resumed, as discussed previously. Such a mechanism renders nested transactions unnecessary. Such a capability can keep transactions smaller and simpler, and can allow a more arbitrary and dynamic aggregation of basic transactions.

Figure 4:
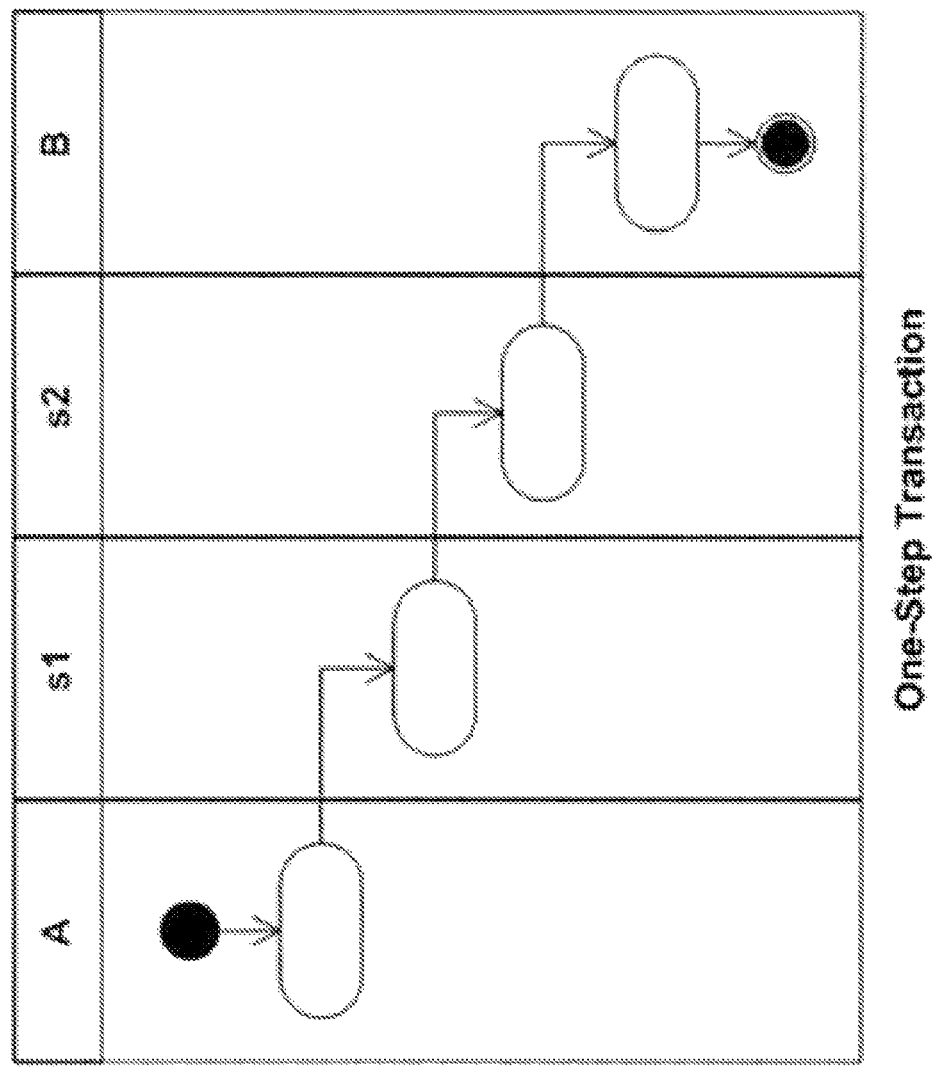
FIG. 4 illustrates a one-step transaction using an activity diagram, in accordance with an exemplary embodiment of the present invention.

The set of business transactions supported in a BTA according to exemplary embodiments can be expressed through stylized UML activity diagrams. The business transaction definition determines the entire route of a message. It can be visualized as an activity diagram showing either a one-step transaction or a Request/Response. FIG. 4 illustrates a one-step transaction using an activity diagram, in accordance with an exemplary embodiment of the present invention. In FIG. 4, a message exchange occurs from A to B that passes through two central services, s1 and s2. When A initiates the message, the business transaction definition specifies a central service gateway 110, s1, as the next destination. For example, the next destination can be a credit check service, an audit repository, or the like. The service is specified generically, and it is up to the gateway 110 to resolve the actual endpoint address of the service before the message is sent. The business transaction definition used for a particular message and transaction type can be the same at all gateways 110. Such commonality makes it possible to resolve addresses in two ways: 1.) the initiator can determine all of the addresses at the outset and specify them within the routing block of the message header; or 2.) each gateway 110 can specify the address of the next gateway 110. As discussed previously, the address resolution is performed by the communication module 245.

According to exemplary embodiments, a message acknowledgment, referred to herein as a "business acknowledgment," is an administrative message sent from one gateway 110 to another gateway 110 indicating positive receipt of a gateway message. It should be noted that negative acknowledgments are always sent if there is a delivery failure or other error. A business acknowledgment can contain any suitable type of acknowledgment information about the original message, such as, for example: the message ID block, which provides unambiguous identifying information about the message; and the history block, which includes a record of each gateway 110 where the message has previously stopped. The business transaction definition can specify the business acknowledgment behavior. There should be at least one business acknowledgment in a business transaction definition. When a gateway message reaches a destination on its itinerary, the business transaction definition can specify one or more gateways 110 that should receive a business acknowledgment. The gateways 110 that were part of the message's route can be sent a business acknowledgment.

Figure 5:
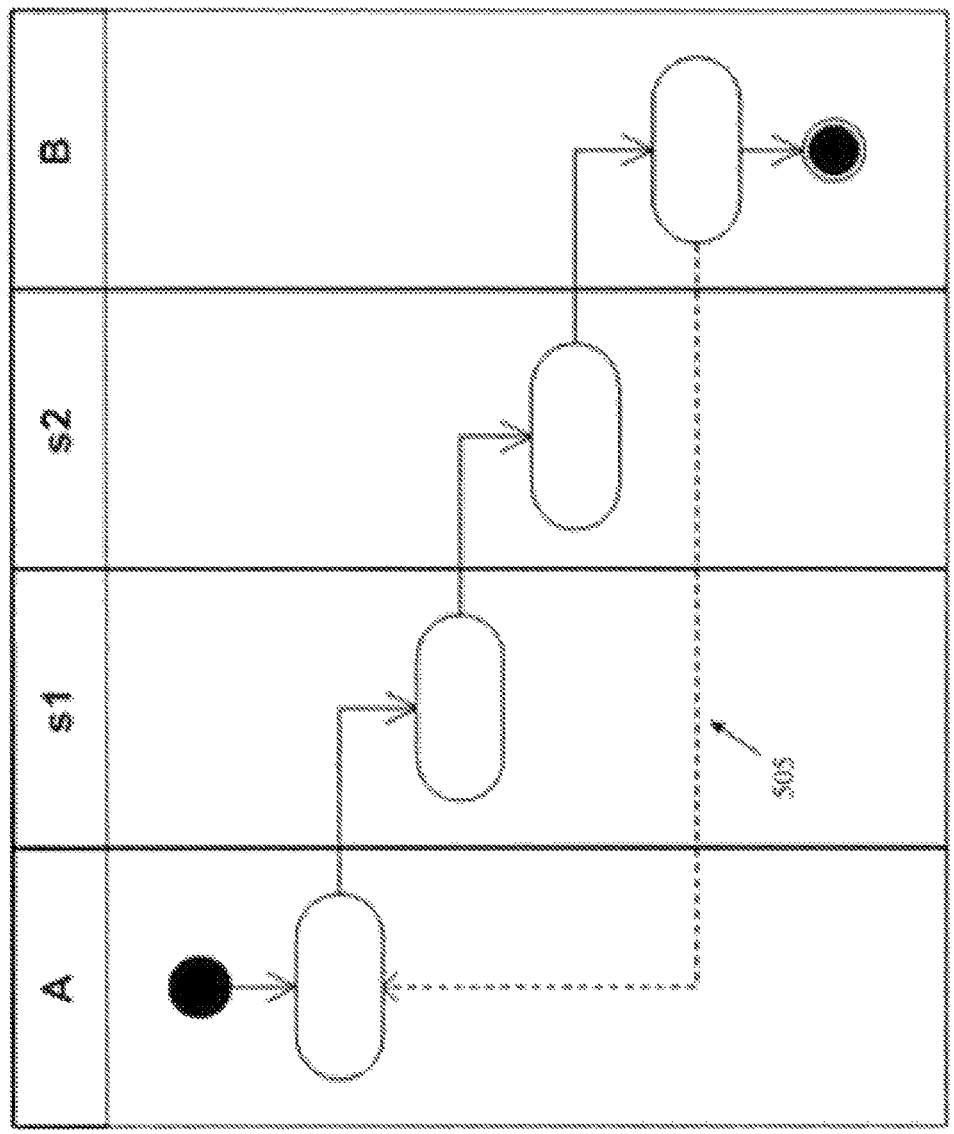
FIG. 5 illustrates a one-step transaction with a business acknowledgment, using an activity diagram, in accordance with an exemplary embodiment of the present invention.
Figure 6:
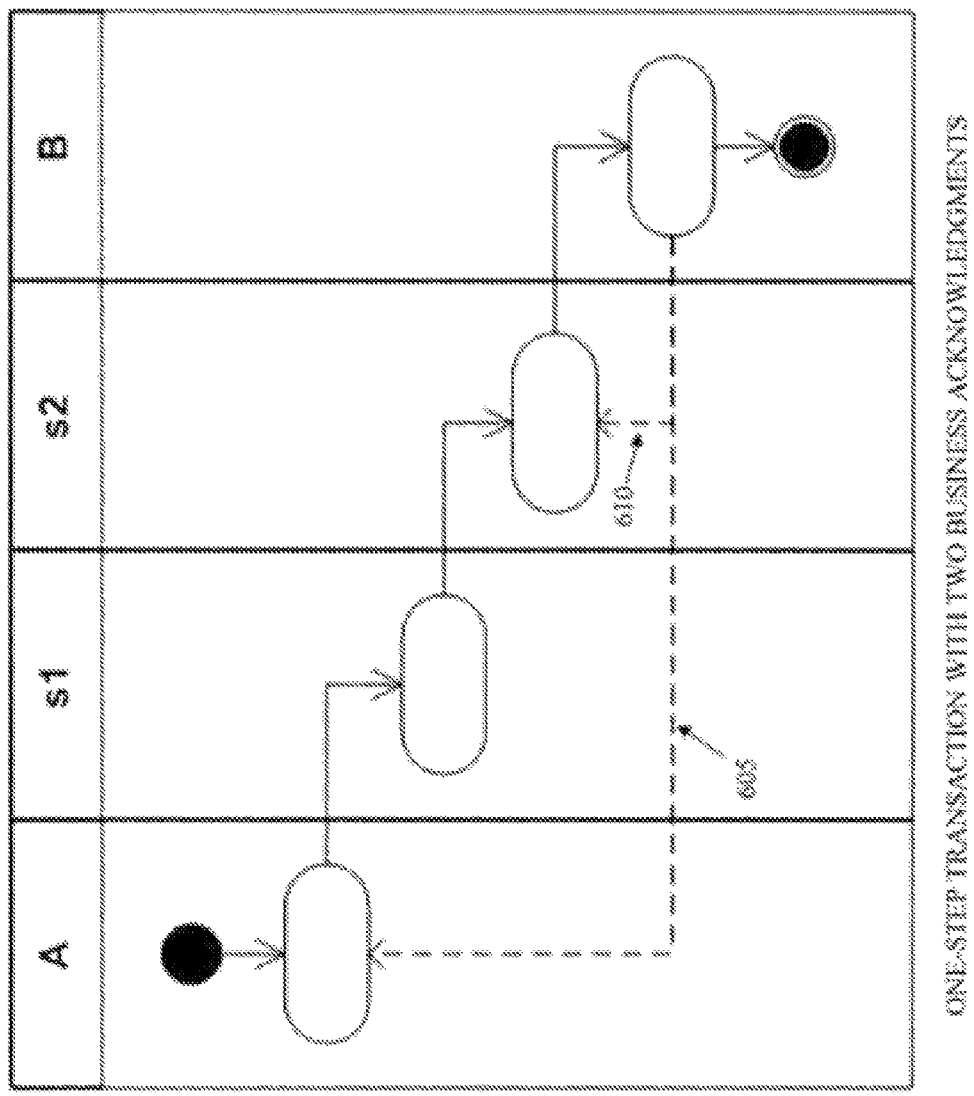
FIG. 6 illustrates a one-step transaction with two business acknowledgments, using an activity diagram, in accordance with an exemplary embodiment of the present invention.

FIG. 5 illustrates a one-step transaction with a business acknowledgment, using an activity diagram, in accordance with an exemplary embodiment of the present invention. In FIG. 5, a one-step transaction from gateway A to gateway B occurs. Once the gateway message is (successfully) received at gateway B, a business acknowledgment 505 is sent from the destination (B) to the origin (A). FIG. 6 illustrates a one-step transaction with two business acknowledgments, using an activity diagram, in accordance with an exemplary embodiment of the present invention. In FIG. 6, a one-step transaction again occurs from gateway A to gateway B. However, the destination (B) now sends two business acknowledgments, one (610) to s2 and another (605) to the origin (A). In FIG. 6, gateway B sends both business acknowledgments; s2 does not send the business acknowledgment to gateway A.

Figure 7:
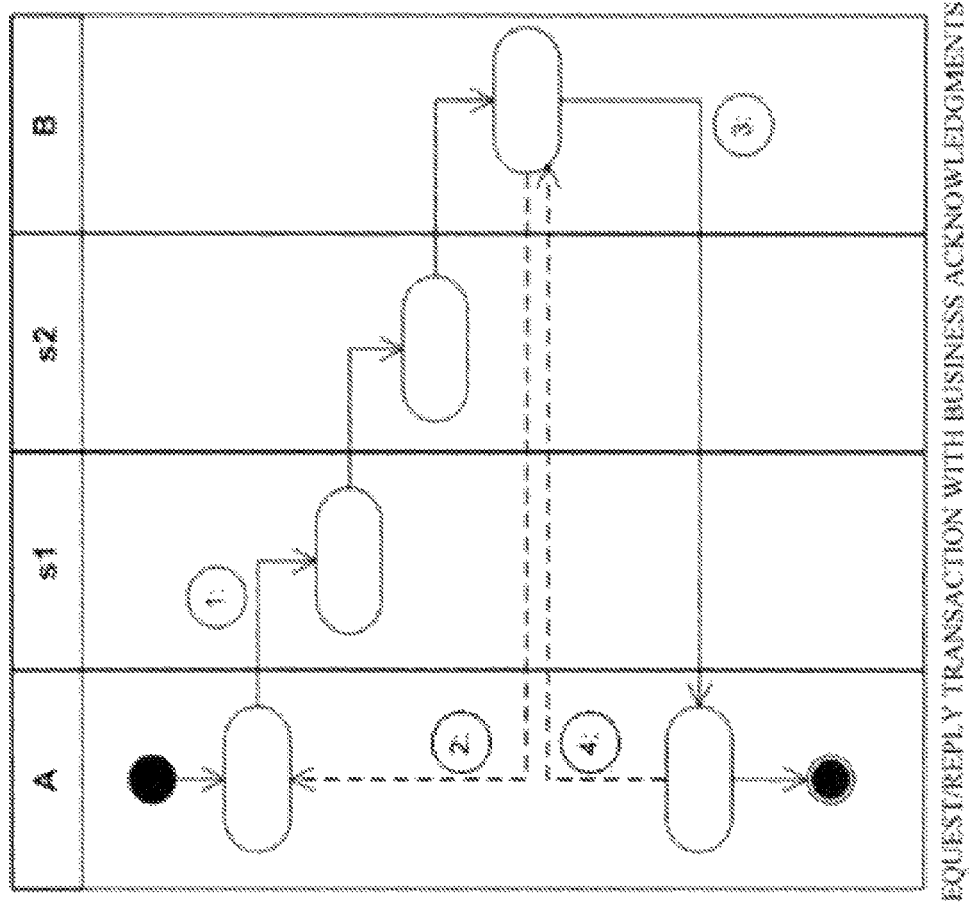
FIG. 7 illustrates a Request/Response transaction, using an activity diagram, in accordance with an exemplary embodiment of the present invention.

FIG. 7 illustrates a Request/Response transaction, using an activity diagram, in accordance with an exemplary embodiment of the present invention. Request/Response transactions are defined where the information in the request gateway message is, in effect, a query and the information in the response gateway message provides the answer to that query. It should be noted that the response gateway message should return to the initiating client application device 105, but does not necessarily have to pass through the same gateways 110 as the request gateway message. In FIG. 7, gateway A sends a request to gateway B (step 1). Gateway B sends a business acknowledgment to gateway A to acknowledge the request (step 2). Gateway B then sends the reply to gateway A (step 3). Gateway A then sends a business acknowledgment to gateway B to acknowledge the reply (step 4). Many such business transaction, both one-step and multi-step, can be specified using such activity diagrams.

Each of components of the system 100, including the gateways 110 and transaction administrator 115, and each of the modules of the gateway 110, including the information queue module 205, the first custom-processor module 210, the formatter module 215, the second custom-processor module 220, the mapping module 225, the validation module 230, the data enrichment module 235, the message processing module 240, the communication modules 245 and the data storage module 250, or any combination thereof, can be comprised of any suitable type of electrical or electronic component or device that is capable of performing the functions associated with the respective element. According to such an exemplary embodiment, each component or device can be in communication with another component or device using any appropriate type of electrical connection that is capable of carrying electrical information. Alternatively, each of the components of the system 100 and the modules of the gateways 110 and transaction administrator 115 can be comprised of any combination of hardware, firmware and software that is capable of performing the function associated with the respective component or module.

Alternatively, the gateways 110 and transaction administrator 115 can each be comprised of a microprocessor and associated memory that stores the steps of a computer program to perform the functions of the modules of the respective components. The microprocessor can be any suitable type of processor, such as, for example, any type of general purpose microprocessor or microcontroller, a digital signal processing (DSP) processor, an application-specific integrated circuit (ASIC), a programmable read-only memory (PROM), an erasable programmable read-only memory (EPROM), an electrically-erasable programmable read-only memory (EEPROM), a computer-readable medium, or the like. The memory can be any suitable type of computer memory or any other type of electronic storage medium, such as, for example, read-only memory (ROM), random access memory (RAM), cache memory, compact disc read-only memory (CDROM), electro-optical memory, magneto-optical memory, or the like. As will be appreciated based on the foregoing description, the memory can be programmed using conventional techniques known to those having ordinary skill in the art of computer programming. For example, the actual source code or object code of the computer program can be stored in the memory.

In addition, the communication links between the gateways 110 and between the gateways 110 and transaction administrator 115 can be comprised of any suitable type of communication medium or channel (e.g., either wired or wireless) capable of transmitting and receiving electrical information. Furthermore, as illustrated in FIG. 1, each of the client application devices 105 can be comprised of a suitable user application (e.g., a software application) that is either separate from (e.g., first, second and third client application devices 105) or integral with (e.g., Mth client application device 105) the associated gateway 110. The system 100 can include a graphical user interface. The graphical user interface can be configured to provide access to and management of the gateways 110, for example, using the transaction administrator 115.

Exemplary embodiments of the present invention are configured to facilitate the automatic initiation, processing and completion of a transaction. Any suitable type of transaction that can be performed electronically using one or more steps can be supported by the system 100. For example, the transaction can be one or more of a commercial transaction, a legal transaction, a financial transaction, a governmental transaction, a medical transaction, a civic transaction, a social transaction, or other suitable transaction. In other words, the transaction can be associated with one or more or a banking industry, a trading/securities/financial industry, a healthcare industry, a telecommunication industry, a satellite service industry, an energy industry, a utility industry, a manufacturing industry, an automotive industry, a pharmaceutical industry or other like industry. Several examples of application of the system 100 to various types of transaction for various types of industries will be discussed.

With respect to the banking industry, assume that the Treasury Systems division within a bank wishes to receive automatic payment transactions from their corporate customers. The bank has a specific back-end application format that they desire for all transactions received. The bank also has certain data content, data validation, and other rules to which the bank desires that each automatic transaction conform. Each customer has application systems that utilize a format or formats different than that desired by the bank. Exemplary embodiments of the present invention can allow such disparate application systems (between the bank and the bank's customers) to automatically exchange payments without modification to either the bank's or the customers' applications.

The bank begins by configuring a gateway 110 to include the content requirements of each desired payment transaction. The bank defines the normative data model, data validation rules, security requirements and rules, custom processes, data enrichment processes, routing rules, error handling processes, and other pertinent processes. The bank then configures a copy of the gateway 110 to operate within the bank, whereby each valid transaction received from another copy of the gateway 110 is translated from normative information into the bank's desired format for its back-office processing by the bank's client application device 105.

The bank then configures a copy of the gateway 110 at the site of each corporate customer from whom they desire to receive automatic payment transactions. The gateway 110 is configured to operate with each customer's local application(s) (i.e., the client application devices 105). The gateway 110 processes payments from the format used by that customer's client application device 105 into the format (non-normative information) used by the customer's version of the gateway 110. The customer's version of the gateway 110 then validates, enriches, secures, records, logs the data according to the processes and/or rules established by the bank, returning errors to the customer as configured, and then sends successful payment gateway messages, in normative form, to the bank. The gateway messages are received by the gateway 110 located at the bank, checked against all content and validation rules, then processed from normative form into the format used by the bank's gateway 110, logged, confirmed and processed into the transaction information used by the bank's back-office application. Automated payment transactions can then flow from the gateways 110 located at customer sites to the gateway 110 located at the bank site—flowing payments from customer applications to the bank's back-office application, without modification to either the bank's or the customers' applications.

With respect to closed-end trading exchanges, assume that a group of companies or an independent Solution Provider wishes to create a closed-end trading network between selective buyers and sellers of a particular commodity, avoiding certain issues that they have on public trading forums such as the New York Mercantile Exchange (NYME). Such a service requires specific formats to be interchanged between participating companies. However, each buyer and seller currently has existing application systems that utilize different formats for analyzing and registering trades. The trading closed-end network cannot succeed unless these disparate systems can be linked. Exemplary embodiments of the present invention can allow such disparate application systems (between the buyers and the sellers) to automatically exchange the data required for successful commodity trading without modification to any potential counter-party's applications.

Exemplary embodiments can allow the Solution Provider to determine the requirements of the transactions that will be processed (e.g., a format could be a simple trade of a fixed amount, at a fixed time, at a fixed price, or it could be a complex structure in which the amounts, timing of receipt of amount, price paid for each amount received, and credit/payment instructions vary). The Solution Provider defines the types of transactions (e.g., bid, offer, execute). The Solution Provider also defines data content, data validation, and other rules to which each transaction must conform (e.g., how anonymity is protected during the trading process, how to bill for the use of the system, and the like). The Solution Provider begins by configuring a gateway 110 to include the content and processing requirements of each desired transaction. The Solution Provider then defines the normative data model, data validation rules, security requirements and rules, custom processes, data enrichment processes, routing rules, error handling processes, administrative messages and rules, and other pertinent processes. The Solution Provider then configures a copy of the gateway 110 so that the gateway 110 can receive valid gateway messages from another copy of the gateway 110.

The Solution Provider then configures a copy of the gateway 110 at the site of each buyer and seller with whom they desire to be participants in the closed trading network. Each of these gateways 110 is configured to operate with that particular customer's local application(s) (i.e., the client application devices 105). The gateway 110 is also configured to interact with all other gateways 110 within the closed network, through the passing of normative information in the form of gateway messages. Each gateway 110 can process information in the format of that participant's local client application device 105 into the format used by that participant's version of the gateway 110. The participant's version of the gateway 110 then validates, enriches, secures, records, logs the data according to the processes and/or rules established by the service provider as well as rules and processes that the customer themselves can establish (e.g., what specific trading parties to whom a particular type or amount of transaction will be routed, details on the payment of the transaction), returning errors to the customer as configured, and then sending successful commodity trading gateway messages, in normative form, to another participant. The gateway messages are received by the gateway 110 located at the other participant's site, checked against all content and validation rules, then processed from normative form into the format used by that participant's gateway 110, logged, confirmed and then processed into the transaction information used by the participant's (local) application. Accordingly, automated bids and purchases of the commodity can then flow from the gateways 110 located at each participant's site to the gateways 110 located at other participants' sites—flowing trades from each participant's application to other participants' applications, without modification. A similar scenario can be used by a Solution Provider who wishes to create a private closed-end trading network between buyers and sellers of a security, a derivative of a security, or some other financial instrument.

With respect to utilities, the smooth supply of electricity relies on many different enterprises, such as, for example, generation suppliers, utilities that supply/manage the distribution of electricity, and transmission entities that are responsible for the transport of electricity. For a particular region, there is an Independent Service Operator (ISO) that is assigned the responsibility that all of these entities work together. Such collaboration involves the real-time exchange of numerous messages to balance electricity demand and supply and, most importantly, making sure that remittance information and records are properly conveyed. To ensure efficiency, the network of entities managed by the ISO is best served if the various messages, reports, and datasets can be directly integrated to the appropriate software applications that process this information in each entity. Exemplary embodiments of the present invention can allow the ISO to utilize standard formats for the messages, reports and datasets, while at the same time allowing each entity involved to map these standards to there own internal formats. In addition, exemplary embodiments can allow entities to maintain records of pending and completed transactions, as well as being able to produce archived information that can provide the basis for non-repudiation of a transaction by any of the parties involved in that transaction.

The ISO begins by configuring a transaction administrator 115 to include the definitions of a normative data model for all messages, reports and datasets to be exchanged. The ISO also configures a transaction administrator 115 with administrative information such as the data about the bilateral and multi-lateral agreements between the entities for which it is responsible, the definition of any administrative messages, such as queries of each involved entity's data store to determine the state of transactions, and the like. The ISO then distributes and verifies the installation of one or more gateways 110 to each entity in its network of responsibility. Along with the installation, the ISO provides in a secure a manner a private key that uniquely identifies each gateway 110 for each entity. Such a procedure allows the entities to uniquely encrypt and digitally sign messages reports and datasets. The entity can then execute administrative transactions with the ISO that provide, for example, information about which other entities it can exchange messages, definitions of the transaction to be executed, definitions of the content of the messages, reports, datasets to be used in those transactions, and the like. Next, an entity, using the tools provided with the gateway 110, can integrate messages to the internal applications (i.e., the client application devices 105), specifically by configuring the appropriate transport wrapper and by mapping internal formats to the normative message definitions provided by the ISO.

Messages, reports and datasets can now flow from the client application devices 105 in one entity to the ISO or another allowed entity. Aspects of any messages, reports, and datasets can be encrypted and/or digitally signed to ensure the reliability and security of a transaction. Each entity can have local, protected information of transactions in which it has been involved. The ISO can have access to relevant information from all entities through its administrative queries. The ISO manages a complex, dynamic set of entities and relationships. Changing requirements require message, reports and dataset formats to be modified or created. These changes can be efficiently handled in a non-disruptive and dynamic manner through the administrative message and re-mapping capabilities of the gateway 110 and transaction administrator 115.

With respect to inventory management, assume that a large manufacturer desires real-time, just-in-time, inventory purchase and supply for all necessary parts from their parts suppliers, based upon actual real-time orders from their dealers and distributors. Such ability optimizes inventory turn ratios, enhances sales through ability to fill orders in a timely manner, and ensures that only the correct pieces and parts are purchased. However, each parts supplier utilizes a different parts-ordering system, with different data types and formats that prohibit on-line interaction. Each of these systems is built using differing technologies, differing data formats, and there is no capacity to receive orders from other computer systems, no capacity to identify part availability or price back to the manufacturer, and no capacity to roll up the collective information into a cohesive, accurate, real-time ability for the manufacturer to purchase parts automatically. Exemplary embodiments of the present invention can allow such disparate parts systems (between the various suppliers, and the manufacturer) to automatically exchange part availability, price, quantity, and other desired information without modification to any of the existing systems (either suppliers' or manufacturer's).

The Solution Provider begins by configuring a gateway 110 to include the content requirements of each desired parts transaction. The Solution Provider defines the normative data model, data validation rules, security requirements and rules, custom processes, data enrichment processes, routing rules, error handling processes, and other pertinent processes. The Solution Provider then configures a copy of the gateway 110 to operate at the manufacture's site, whereby each valid parts transaction received from another copy of the gateway 110 is translated from the normative form into the Manufacturer's desired format for its processing by the Manufacturer's local application.

The Solution Provider then configures a copy of the gateway 110 at the site of each supplier's system from whom they desire to receive automatic parts transactions. The gateway 110 is configured to operate with each supplier's local parts application(s) (i.e., the client application devices 105). The gateway 110 processes transactions from the format used by the supplier's client application device 105 into the format used by the supplier's gateway 110. Each supplier's version of the gateway 110 then validates, enriches, secures, records, logs the data according to the processes and/or rules established by the solution provider, returning errors to the supplier's system as configured, and then sends successful parts gateway messages, in normative form, to the manufacturer's system. The gateway messages are received by the gateway 110 located at the manufacturer, checked against all content and validation rules, then processed from normative form into the format used by the manufacturer's gateway 110, logged, confirmed and processed into the transaction information used by the manufacturer's local application. Accordingly, automated parts orders can then flow from the gateways 110 located at each of the supplier sites to the gateway 110 located at the manufacturer—flowing part transactions from each remote, diverse, supplier application to the manufacturer's application, without modification to the manufacturer's or any of the existing supplier applications.

With respect to the government, the federal government desires up-to-date visibility and accuracy on all aspects of military-related inventory, including personnel, ordinance, and military logistics, across all divisions of the armed forces, and across all state-controlled divisions of the National Guard. Such information is vital to national defense. However, each armed service utilizes different logistical tracking systems, sometimes multiple systems. Each is built using differing technologies, differing data formats, and there is no capacity to share changes within any singular tracking system with any other tracking system, no capacity to move inventory between one tracking system and any other, and no capacity to roll up the collective information into a cohesive, accurate, real-time status of all forces' inventory, ordinance or other pertinent information. Exemplary embodiments of the present invention can allow such disparate logistics systems (between the various branches of the armed forces, within each force, and with each state National Guard) to automatically exchange information without modification to any of the existing systems.

The Solution Provider begins by configuring a gateway 110 to include the content requirements of each desired logistical information transaction. The Solution Provider defines the normative data model, data validation rules, security requirements and rules, custom processes, data enrichment processes, routing rules, error handling processes, and other pertinent processes. The Solution Provider then configures a copy of the gateway 110 to operate at the Federal level, whereby each valid logistic information transaction received from another copy of the gateway 110 is translated from the normative form into the Federal system's desired format for its processing. The Solution Provider then configures a copy of the gateway 110 at the site of each logistics system from whom they desire to receive automatic information transactions. The gateway 110 is configured to operate with each force's local logistic application(s) (i.e., the client application devices 105). The gateway 110 processes payments in the format used by the client application device 105 into the format used by the force's version of the gateway 110. Each force's version of the gateway 110 then validates, enriches, secures, records, logs the data according to the processes and/or rules established by the solution provider, returning errors to the local logistics system as configured, and then sends successful logistical gateway messages, in normative form, to the federal system.

The gateway messages are received by the gateway 110 located at the federal level, checked against all content and validation rules, then processed from normative form into the format used by the gateway 110 at the federal level, logged, confirmed and processed into the transaction information used by the federal level local application. Accordingly, automated logistic information transactions can then flow from the gateways 110 located at each of the armed forces and state National Guard sites to the gateway 110 located at the federal level—flowing information from each remote, diverse, logistics application to the Federal applications, without modification to the Federal, state-level or any armed forces existing logistics applications.

With respect to the insurance industry, assume that a Solution Provider wishes to create a direct network between all participants associated with processing and executing elements of a property insurance claim process. The participants in the property claims process can include insurance agents, claims adjustors, private contractors to bid and execute specific work, inspectors, payment providers, and others. While the collection of potential participants may desire to participate in such a direct network, they must also participate in claims processes outside of that network, as not all industry participants will join the service simultaneously. Therefore, the interested participants may not be willing to accept any requirements from the service provider that forces them to change their current operations, the internal systems that they currently utilize, or use two different processes—one for claims within the network and another for claims outside the network. The Solution Provider has specific data requirements and data formats that define such transactions and that encompass the type of activities/transactions received during the process of making, substantiating, and ruling on a claim. The Solution Provider also has certain data content, data validation, and other rules that they desire that each transaction conform to (e.g., what information a specific participant can access or cannot access in the transaction, a rule to determine who is qualified to participate in this specific transaction in the claims process, etc.). However, each potential participant has application systems that utilize a different data format or formats. Exemplary embodiments of the present invention can allow such disparate application systems (between all participants of the claims process) to automatically exchange the specific formats or combination of the formats required of successful claims processing, without modification to their applications.

The Solution Provider begins by configuring a gateway 110 to include the content requirements of each desired format of the pertinent transactions. The Solution Provider defines the normative data model, data validation rules, security requirements and rules, custom processes, data enrichment processes, routing rules, error handling processes, and other pertinent processes. The Solution Provider then configures a copy of the gateway 110 so that it can receive valid transactions from another copy of the gateway 110. The Solution Provider then configures a copy of the gateway 110 for each participant with whom they desire to participate in the transactions. The gateway 110 is configured to operate with each participant's local application(s) (i.e., the client application devices 105). The gateway 110 processes transactions in the format of that participant's client application device 105 into the format used by that participant's version of the gateway 110. The participant's version of the gateway 110 then validates, enriches, secures, records, logs the data according to the processes and/or rules established by the Solution Provider as well as rules and processes that the participant themselves can establish, returning errors to the participant as configured, and then sending successful insurance claim gateway messages, in normative form, to another participant. The gateway messages are received by the gateway 110 located at the other participant's site, checked against all content and validation rules, then processed from normative form into the format used by that participant's gateway 110, logged, confirmed and processed into the transaction information used by that participant's local application. Accordingly, automated transactions can then flow from the gateways 110 located at participant sites to the gateways 110 located at other participant's sites—flowing insurance claim transactions from one participant's application to another participant's applications, without modification.

The healthcare industry is currently characterized by a multitude of disparate organizations involved in the care of common patients. The difficulties associated with capturing critical patient data and making it available in a timely fashion is a well-documented problem plaguing the industry, often resulting in sub-par patient care, and always resulting in excessive cost. Antiquated and disparate legacy systems within hospitals, physicians' offices, laboratories, pharmacies and insurance companies, combined with patient confidentiality and privacy regulations, are at the root of a data sharing challenge that has significantly restricted the industry. Exemplary embodiments of the present invention can be used within the healthcare industry to address many aspects as such problems within the industry. Large, decentralized organizations (like health systems with affiliated hospitals, physician practices, laboratories, pharmacies, etc.) can be linked to exchange information between them, efficiently and accurately, without consolidating sensitive data into a single database. Individual service providers, who have varying degrees of computer application ability, can link into much larger networks of affiliates, without significant cost or confusion. Within health systems, the present invention can enable data to flow between disparate applications without requiring the significant outlay of financial resources and time necessary to align extremely large legacy applications, such as medical records, enrollment, scheduling, pharmacy, laboratory, and billing. As a result, consistent information can be made available to all medical professionals in a timely fashion, thereby contributing to the overall quality of care and customer service.

The Solution Provider begins by configuring a gateway 110 to include the content requirements of each desired format of the pertinent transactions. The Solution Provider defines the content requirements of each desired healthcare transaction (e.g., an update to a medical record, a prescription, or an order for a medical test, and the like). The Solution Provider then defines the normative data model, data validation rules, security requirements and rules, custom processes, data enrichment processes, routing rules, error handling processes, and other pertinent processes to perform against the data being transferred. A copy of the gateway 110 is then configured for each independent health care organization, whereby each valid transaction received from another copy of the gateway 110 is translated from the normative form into the format used by that organization's gateway 110 to generate the transaction information in the format used by that organization's local applications. Using such a model, the originator of the data is able to push the content to all interested parties with no incremental effort, and the overall access to medical information is vastly improved. At no time is sensitive patient data exposed beyond those entities that require the information.

In the pharmaceutical industry, every new drug can take up to 15 years and over 275 million dollars in clinical costs before the FDA approves the drug. A primary reason for the excessive time and the cost is the enormous problem of consolidation and analysis of clinical trial data. Each pharmaceutical company literally maintains warehouses of paper-based clinical trial data. It can take years for such data to be assembled, consolidated, analyzed, and conclusions drawn. In addition to time and cost, patients wait or even die. Assembling clinical trial data is problematic, because all of the pertinent participants (pharmaceutical companies, hospitals, clinics, doctors, pharmacies, etc.) utilize disparate data systems. The industry's answer to date for such a problem has been to use paper to record data—paper that is then sent to warehouses where it waits to be manually entered into a consolidated system. Exemplary embodiments of the present invention in the pharmaceutical industry can allow such disparate application systems (hospitals, clinics, doctors, pharmacies, etc.) to automatically send pertinent clinical trial data to the pharmaceutical company, without modification to any of their existing applications, and without the use of paper. The present invention can allow a pharmaceutical company to determine the requirements of the information that must be captured for a successful clinical trial, (i.e. patient history, age, weight, symptoms, etc., etc.). The pharmaceutical company then defines the types of transactions (e.g., routine data update, emergency data update, etc). The pharmaceutical company also defines data content, data validation, and other rules that they require each trial record to conform to (e.g., how patient anonymity is protected at all times during the clinical trail, while important drug information is captured and sent on, etc.).

The pharmaceutical company begins by configuring a gateway 110 to include the content and processing requirements of each desired clinical trial transaction. The pharmaceutical company then defines the normative data model, data validation rules, security requirements and rules, custom processes, data enrichment processes, routing rules, error handling processes, administrative messages and rules, and other pertinent processes. The pharmaceutical company then configures a local copy of the gateway 110 so that the gateway 110 can receive valid clinical updates from any other copy of the gateway 110, and so that any clinical updates that are received are processed into the format required by existing analysis applications within the pharmaceutical company, or to a new application.

The pharmaceutical company then configures a copy of the gateway 110 at the site of each doctor, hospital, or clinic with whom they desire to be participants in the closed clinical trail. Each gateway 110 is configured to operate with that particular health care provider's application(s) (i.e., the client application devices 105). The gateway 110 is also configured to interact with the pharmaceutical company's gateway 110, passing to it normative versions of the clinical data transactions. Each gateway 110 processes transaction information from that health care provider's client application device 105 into the format used by that health care provider's version of the gateway 110. The health care provider's version of the gateway 110 then validates, enriches, secures, records, logs the data according to the processes and/or rules established by the pharmaceutical company, as well as rules and processes that the health care provider's themselves can establish (e.g., local logging of their patients' data that was sent on to the pharmaceutical), returning errors to the health care provider as configured, and then sending successful healthcare gateway messages, in normative form, to the pharmaceutical company. The gateway messages are received by the gateway 110 located at the pharmaceutical company site, checked against all content and validation rules, then processed from normative form into the format used by the pharmaceutical company's gateway 110, logged, confirmed and processed into the transaction information used by the pharmaceutical company's local applications. Accordingly, automated clinical trial data can then flow from the gateways 110 located at each health care provider's site to the gateways 110 located at the pharmaceutical company's site—flowing healthcare data from each health care provider's application to the pharmaceutical company's applications without modification, saving time, cost, and even lives.

Another significant challenge facing the health industry today is the expense and difficulty in servicing the process of HMO claims. Healthcare administration costs currently run at 25% or more of revenue, as compared to less than 5% in the financial industry. Such a disparity is due to the complexity of the healthcare industry, coupled with the healthcare industry's lack of automated processing capabilities. HMO plans are riddled with industry rules and requirements that the member and the health care providers must adhere to in order to receive benefit payments from the insurance companies. For example, referrals and pre-authorizations are typically required for services delivered by a provider other than the member's PCP, or out of the member's home service area. Getting the right information to the various parties involved (providers, labs, pharmacies, and insurers) is today generally done by telephone or fax, often leading to errors, as the right information is not always provided in the right format. Time delays often result, both in receiving the service and paying claims for the service. The information is passed via telephone, because the providers' current data systems are different from the insurer's, and will not integrate easily. Another example of the inefficiency that this causes is that the information a PCP may communicate to a pharmacy or lab may not always be the full data the pharmacy or lab may require. Furthermore, claims submitted to an insurer, even electronically submitted claims, may have data issues, such as, for example, missing or incomplete data, that require human intervention to fix. Using exemplary embodiments of the present invention, the providers, insurers, labs, pharmacies can automatically communicate with each other in automated, interactive fashion. The industry has already defined standards for several health claim transactions, such as referrals and authorizations. As further agreed standards are accepted, the last hurdles will be the ease of integration, which the present invention directly addresses.

A Solution Provider can begin by configuring a gateway 110 to include the content requirements of each desired claims transaction. The Solution Provider defines the normative data model, data validation rules, security requirements and rules, custom processes, data enrichment processes, routing rules, error handling processes, and other pertinent processes. The Solution Provider then configures a copy of the gateway 110 to operate at the Insurer level, whereby each valid claims transaction received from another copy of the gateway 110 can be translated from the normative form into Insurer's desired format for processing the claims transaction.

The Solution Provider then configures a copy of the gateway 110 at the site of each participating provider system from whom they desire to receive automatic claims transactions. The gateway 110 is configured to operate with each provider's local application(s) (i.e., the client application devices 105). The gateway 110 processes claims from the format used by the provider's client application device 105 into the format used by the provider's version of the gateway 110. Each provider's version of the gateway 110 then validates, enriches, secures, records, logs the data according to the processes and/or rules established by the solution provider, returning errors to the local claims system as configured, and then sending successful claims gateway messages, in normative form, to the Insurer's system. The gateway messages are received by the gateway 110 located at the Insurer level, checked against all content and validation rules, then processed from normative form into the format used by the Insurer's gateway 110, logged, confirmed and processed into the transaction information used by the Insurer's local applications. Multiple insurers can implement the Insurer's version of the gateway 110. Each provider that utilized a version of the gateway 110 can provide automatic claims to any Insurer that utilized an Insurer's version of the gateway 110. Over time, a fully integrated transaction network can grow that is capable of processing accurate claims without modifying any of the local applications, saving the industry significant time and money, while improving accuracy.

Assume that the Ticket Issuing and/or Payment Systems division within a ticket issuer wishes to receive automatic ticket issuing and/or payment transactions from their corporate customers. The ticket issuer has a specific back-end application format that they desire for all transactions received. The ticket issuer also has certain data content, data validation, and other rules that they desire that each automatic transaction conform to. Each customer has application systems that utilize a format or formats different than that desired by the ticket issuer. Exemplary embodiments of the present invention can allow such disparate application systems (between the ticket issuer and the ticket issuer's customers) to automatically exchange ticket issuing and/or payments without modification to either the ticket issuer's or the customers' applications.

The ticket issuer begins by configuring a gateway 110 to include the content requirements of each desired ticket issuing and/or payment transaction. The ticket issuer defines the normative data model, data validation rules, security requirements and rules, custom processes, data enrichment processes, routing rules, error handling processes, and other pertinent processes. The ticket issuer then configures a copy of the gateway 110 to operate within the ticket issuer, whereby each valid transaction received from another copy of the gateway 110 is translated from the normative form into the ticket issuer's desired format for its back-office processing.

The ticket issuer then configures a copy of the gateway 110 at the site of each corporate customer from whom they desire to receive automatic ticket issuing and/or payment transactions. The gateway 110 is configured to operate with each customer's local application(s) (i.e., the client application devices 105). The gateway 110 processes ticket issuing and/or payments from the format used by that customer's client application device 105 into the format used by the customer's version of the gateway 110. The customer's version of the gateway 110 then validates, enriches, secures, records, logs the data according to the processes and/or rules established by the ticket issuer, returning errors to the customer as configured, and then sending successful ticket issuing and/or payment gateway messages, in normative form, to the ticket issuer. The gateway messages are received by the gateway 110 located at the ticket issuer, checked against all content and validation rules, then processed from normative form into the format used by the ticket issuer's gateway 110, logged, confirmed and processed into the transaction information used by the ticket issuer's back-office application. Accordingly, automated ticket issuing and/or payment transactions can then flow from the gateways 110 located at customer sites to the gateway 110 located at the ticket issuer site—flowing ticket issuing and/or payments from customer applications to the ticket issuer's back-end applications, without modification to either the ticket issuer's or the customers' applications.

With respect to Sarbanes-Oxley (SOX) compliance, assume that the SOX Verification and/or Financial Systems division within a corporation wishes to receive automatic verification and/or financial transactions from their corporate operating units. The corporation has a specific back-end application format that they desire for all transactions received. They also have certain data content, data validation, and other rules to which they desire that each automatic transaction conform. Each corporate operating unit has application systems that utilize a format or formats different than that desired by the corporation. Exemplary embodiments of the present invention can allow such disparate application systems (between the corporation and the corporation's operating units) to automatically exchange verification and/or financials without modification to either the corporation's or the corporate operating units' applications.

The corporation begins by configuring a gateway 110 to include the content requirements of each desired verification and/or financial transaction. The corporation defines the normative data model, data validation rules, security requirements and rules, custom processes, data enrichment processes, routing rules, error handling processes, and other pertinent processes. The corporation then configures a copy of the gateway 110 to operate within the corporation, whereby each valid transaction received from another copy of the gateway 110 is translated from the normative form into the corporation's desired format for its back-office processing. The corporation then configures a copy of the gateway 110 at the site of each corporate operating unit from whom they desire to receive automatic verification and/or financial transactions. The gateway 110 is configured to operate with each corporate operating unit's local application(s) (i.e., the client application devices 105). The gateway 110 processes verification and/or financials from the format used by that corporate operating unit's client application device 105 into the format used by the corporate operating unit's version of the gateway 110. The corporate operating unit's version of the gateway 110 then validates, enriches, secures, records, logs the data according to the processes and/or rules established by the corporation, returning errors to the corporate operating unit as configured, and then sending successful verification and/or financial gateway messages, in normative form, to the corporation. The gateway messages are received by the gateway 110 located at the corporation, checked against all content and validation rules, then processed from normative form into the format used by the corporation's gateway 110, logged, confirmed and processed into the transaction information used by the corporation's back-office application. Accordingly, automated verification and/or financial transactions can then flow from the gateways 110 located at corporate operating unit sites to the gateway 110 located at the corporation site—flowing verification and/or financials from corporate operating unit applications to the corporation's back-end applications, without modification to either the corporation's or the corporate operating units' applications.

There are many other examples of uses and applications of exemplary embodiments of the present invention to other types of transaction for other types of industries.

The following description provides further details on the elements and components previously described. This further detail, for exemplary purposes, will focus on the gateway, which can be a core component of a Business Transaction Application within a Members Only Internet, and the message construct that they process. These gateways have a wide use even as standalone platforms to handle message traffic to and from an application.

As described above, gateway messages that are sent within a system 100 are preferably formatted as XML documents with two main blocks, a message header and a payload. The payload can comprise one or more payloads (content "messages"). These payloads are what are actually sent and received by the applications that the gateways 110 are serving. The message header contains the information necessary for gateways 110 to process its payloads, i.e., the information to support functions such as sending, receiving, delivering, and persisting payloads. All messages are preferably described by an associated message type. A structured description of each message type can be stored in the local data store of a gateway 110. A data store can be comprised of any on-line mechanism for persisting data including a database and associated files.

Message and Message Headers

A message is typically part of a simple transaction. Gateway-based systems can support two or more types of simple transactions including:

| Class | Description |
|---|---|
| Transmissions | Message goes from gateway A to gateway B |
| Request/Response | Message goes from gateway A to gateway B; return message goes from gateway B to gateway A |

The message header preferably having an XML format contains a hierarchy of tags. Each XML tag in the first level of the message header is associated with a software module. These tags delineate separate blocks of information. Message processing is accomplished by moving down the tags and executing the software module associated with that tag's block. The content of the blocks provide the necessary arguments and data to execute the associated software module.

There are a number of advantages to this manner of processing blocks. First there are separate message schema for each message type. This means the processing of messages can be specific to each message type as variant blocks can be introduced for each message type. Second, it is very easy to provide customized modules for any message to provide additional processing functionality. For example a Solution Provider could add a block and associated software that checks license validity, or interrogate a gateway database to ascertain charges.

Figure 8:
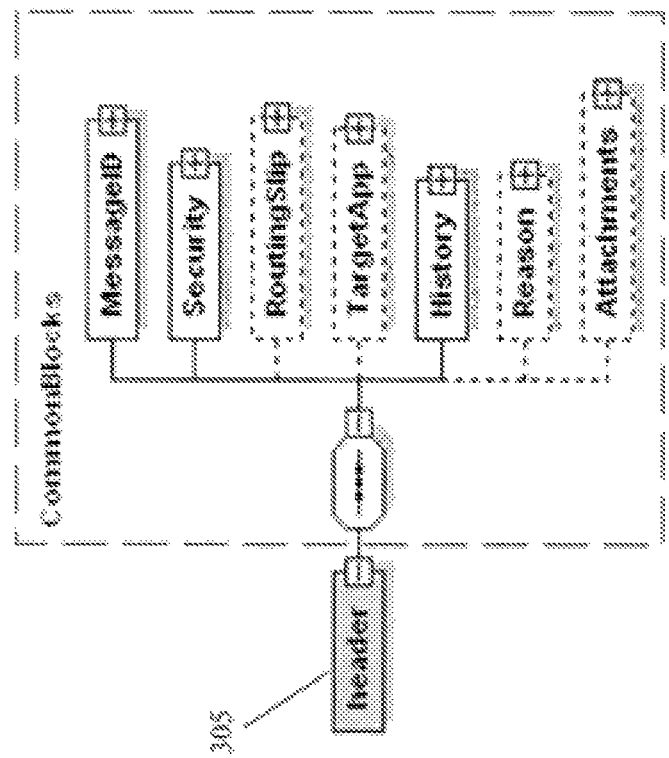
FIG. 8 illustrates a exemplary blocks in a message header of a gateway message, in accordance with an exemplary embodiment of the present invention.

There are preferably a set of standard blocks for the message header with associated modules that, unless customized, are called for all message processing received by a gateway 110. An exemplary set of standard blocks for the message header, which are shown in FIG. 8, are described in detail below.

The Message Id block provides basic identification information about a message. It can have the following attributes: transaction-type, message-type, transaction-ID, message-ID, message alias, origin, destination, possible duplicate, etc. A unique internal identifier can be created for the message and for the transaction of which it is a part. This ID is permanently unique and can always be used to definitively identify a message and the transaction of which it is a part. To provide audit-ability and coherent, distributed BTAs, each gateway 110 maintains an embedded database as a persistent store. Given this unique ID it is possible to retrieve all related data associated with a particular message or transaction from any gateway's local datastore. This can be useful, for example, for retrieval queries, to assure auditability, and for reconstructing a damaged datastore.

The Security Block provides information about the security of the message. In particular, the Security Block contains a log of what is encrypted and by which entity. Conventionally, this information is not kept with the message. There are preferably at least two capabilities that fall under the "security" rubric, encryption and digital signing. Encryption is used to prevent an entity (person or machine) from being able to read data or content in a message, except those entities that are able to de-crypt it. Digital signing is a means to ensure that the integrity of a set of data has been preserved in a given state and to clearly identify the entity that is providing that surety.

PKI (Public/Private Key Infrastructure) is a very popular mechanism used to encrypt and sign data. The mechanism involves a Private Key held by an entity and a Public key that is freely distributed to those entities that are potential counterparties. Either key can be used to encrypt some data, but its companion key must be used to decrypt that data. For example if A wants to encrypt a file he is sending to B so that only B can read it, then A would use B's Public key to encrypt it. B can decrypt the file using its Private Key. Anyone else receiving the file, other than B, cannot decrypt the file as they do not have B's Private Key. In order for PKI to work, private keys are kept private so that no third party can decrypt a message destined for the holder of the private key. Public keys are usually transmitted and stored in a standard format, such as a 509 certificate. A 509 certificate contains the party's public key, name or identification, serial number, expiration date, and the digital signature of the issuing authority so a receiving party can verify that public key has been vouched for by a trusted party.

Digital signing makes use of PKI and a mechanism in computing called "hashing." A hashing algorithm will take any set of data and produce a unique single number, called a hash-code, that represents that number. If even one bit of the input data is changed, then a very different hash code is produced. Hashing can be used to identify any change in a set of data.

To create a digital signing, entity A inputs the data to be signed into a hashing algorithm which produces a hash code for data. Then, entity A encrypts the hash code with its Private Key. The result is a digital signature. When signed data is sent to entity B, entity B can decrypt the digital signing using A's Public key. It can then run the data through the same hashing algorithm. If the decrypted hash code from A matches the hash code produced by B, then B knows two things: one, the data came from A (as A is the only holder of its Private key); and two, the data sent by A has not been altered in any manner. If the digital signing is persisted with the data then it can provide a permanent record that particular data was sent on a particular day-time by a particular entity. Important auxiliary information can be added to the data that is digitally signed. For example, with the date-time of the signing, there is not only a record of who signed a data set but exactly when it was signed, which increases audit-ability.

There are several features that are embodied in the Security Block of the message. First of all, any XML tag block (or sub block) in the message can be encrypted by one or more entities. For example, gateway A can encrypt the Message History block so it can be seen by entity B and encrypt the payload block to be seen only by gateway C. (The sub-blocks within a payload can also be encrypted down to individual fields if the payload is structured and the gateway is aware of its addressing mechanism.) Another encryption scenario can be that gateway A encrypts the payload block targeted to gateway C. The gateway B, which may be a service, adds additional information, which it also encrypts for gateway C.

When messages and payloads are persisted in a local data store, the sections that are targeted to the receiving gateway can be stored in the clear (i.e., decrypted), while other sections are left encrypted but still persisted. In addition, all digital signings are preferably stored in the Security block, with pointers to the block in the message or payload that is signed. Digital signings can be executed by a gateway for a number of conditions.

A signing of the message or a block in the message can occur in a number of circumstances including: whenever a message is sent (i.e., when placed on a SEND or OUT abstract queue); whenever a service performs a particular function (typically, the particulars describing the particular functions are a customized block or are an entry in the Message History that is signed); when an internal procedure completes its function; or when certain error conditions arise and a state must be ensured.

Since the Security block is persisted when a message is persisted then all the Digital Signings are persisted. This feature provides a basis for audit-ability and non-repudiation, and is therefore useful for many business-as-usual functions, as well as for protecting against misbehavior. This feature is enabled, at least in part, due to the distributed database contained in every gateway 110. To provide adequate audit-ability, it can be useful to provide extended data persistence. For example, there are some cases in the United States where information must be maintained for 66 years and some cases in the United Kingdom where data must be maintained for 106 years.

The Target Block is meant to identify the ultimate target application that is to receive the message. The target can be dynamic, i.e., it can change during the processing of a message so that the sender does not have to know the actual name/location of a target application. For example, a message may be a payment that the sending application assumes is to be sent to the accounts receivable of a large enterprise. At the time the message is sent, the target can be general (e.g., accounts receivable) but would be enough information for the sending gateway to know what an appropriate receiving gateway is. The receiving gateway may know the address of an Accounts Receivable Distribution Server, and this information is enough for the receiving gateway to send the message to the gateway serving that Distribution Server. Finally, the gateway at the distribution server can find out specifically to which Accounts Receivable to send the message. The dynamic nature of the Target block allows for "Just-in-time" delivery of a message, i.e., the target of the message need not be fully identified until it is actually needed by either a SEND queue (Send queues send messages to other gateways) or an Out queue (Out queues send messages to "users," i.e., the back office applications).

The Collection Block contains parameters that associate a gateway message with other messages. There are three types of collections. A GROUP links any set gateway messages together, usually for the benefit of client applications. A SET which defines a set of messages that are bound together for a purpose. A SEQUENCE which is an ordered and enumerated set of messages bound together for a purpose.

The Routing Slip contains a template of the simple transaction of which the message is a part. There are two types of simple transactions—a Transmission (a transaction that sends a message from gateway A to gateway B) or a Request/Reply (a transaction that sends a message from gateway A to gateway B with a required reply Message that is sent from gateway B to gateway A.) For either Transmissions or Request/Reply transactions, a message can stop at various services that perform specific functions, e.g., authorization, store and forward, authentication, etc. The Routing Slip template can include any prescribed mandatory or optional service stops associated with the transaction.

As a transaction progresses, the Routing Slip includes information of exactly what stops have been completed, so a receiving gateway can verify what action is to be done next. Because the current state of a simple transaction is, in effect, stored in the Routing Slip, a transaction can be stopped in mid-stream simply by persisting the message. When that transaction needs to restart, the Routing Slip in the persisted message has the necessary state information to restart it.

The History Block keeps a log of all the major events that have occurred to a message as the message progresses through a transaction. This includes, for example, that the was placed on a SEND or OUT queue, that the transaction was stopped because of an error condition, etc. The fact that a log is maintained within a message header allows a receiving gateway and the applications that it is serving to know the history of the received message. This can be very useful in a distributed system. Often entries in the History Block will be digitally signed. This is very useful for auditability and non-repudiation.

The Attachment Block includes information about any attachments that are associated with a message. The information can refer to one or more external files that are to be associated with a message. There are a number of reasons for having attachments. The clearest one is when information to be transmitted is just too big to be handled as a payload. As mentioned above each payload must be loaded into memory so performance and memory constraints provide a natural size limitation for payloads.

Gateway attachments are similar to email attachments, but are handled in a different way. Attachments are not directly bound to a message; rather the location, name and supporting information about each attachment is provided in "tokens" that are stored in the Attachment Block of a message. When a message is sent to an application, these tokens are also delivered. The gateway then offers a service to the application to retrieve the attachment. The receiving application has two options: it can get a copy of the file; or it can directly access the file to read it. By using this token approach, attachments are only delivered when and if they there are needed by the receiving application.

There are a number of options for dealing with attachments. For example, the attachment can either be moved or copied into the sending gateway's data store. Once the attachment has entered the gateway's domain, the gateway can assure that the attachment's location is known and that its integrity is maintained. A receiving application can then read the attachment file by accessing the remote sending gateway's datastore or it can request that the attachment be moved to the receiving gateway datastore, thus the file will be local so accessing it will not be over a network.

Attachments can also remain in the sending applications data store, external to the gateway domain. In this case a gateway cannot assure either the location or integrity of the file. Maintaining attachments within the sending applications domain is useful in a number of ways; e.g., to send background data or information along with a message for which it is important that receiving application has reference access but does not have an immediate need; to provide access to a file such as a medical record, which will be periodically changed, in a way that the receiving application always has access to the up-to-date information.

The payload section of the message can contain one or more payloads. This is the information that is to be sent from a sending "user" application to a receiving "user" application. A payload can either be processed as a blob, in which case the gateway does not process its content; or it can be a "known" structured message that the gateway can process. A payload is "known" to the gateway if there is defining message-type information in the gateway's configuration data store. All structured payloads, which are sent between gateways as gateway messages, are preferably in a normative XML form. The normative form for a payload can be defined, for example, by an XML message-type schema that is compatible with the serialization of an object model that represents the message-type.

Abstract Queues

Abstract queues, discussed previously, are gateway mechanisms having several potential functions. For example, the abstract queues can standardize the way messages/payloads are sent and received form a "user" application i.e. the enterprise application that either needs to transmit some information or the enterprise application that needs to receive some information. The abstract queues can also standardize the way messages (i.e., payloads with their complete header information) are sent and received between gateways. In addition, the abstract queues can standardize the way errors are being reported (ReplyTo Queues), so that member application or local administrator can monitor the generated errors and take appropriate actions.

Figure 9:
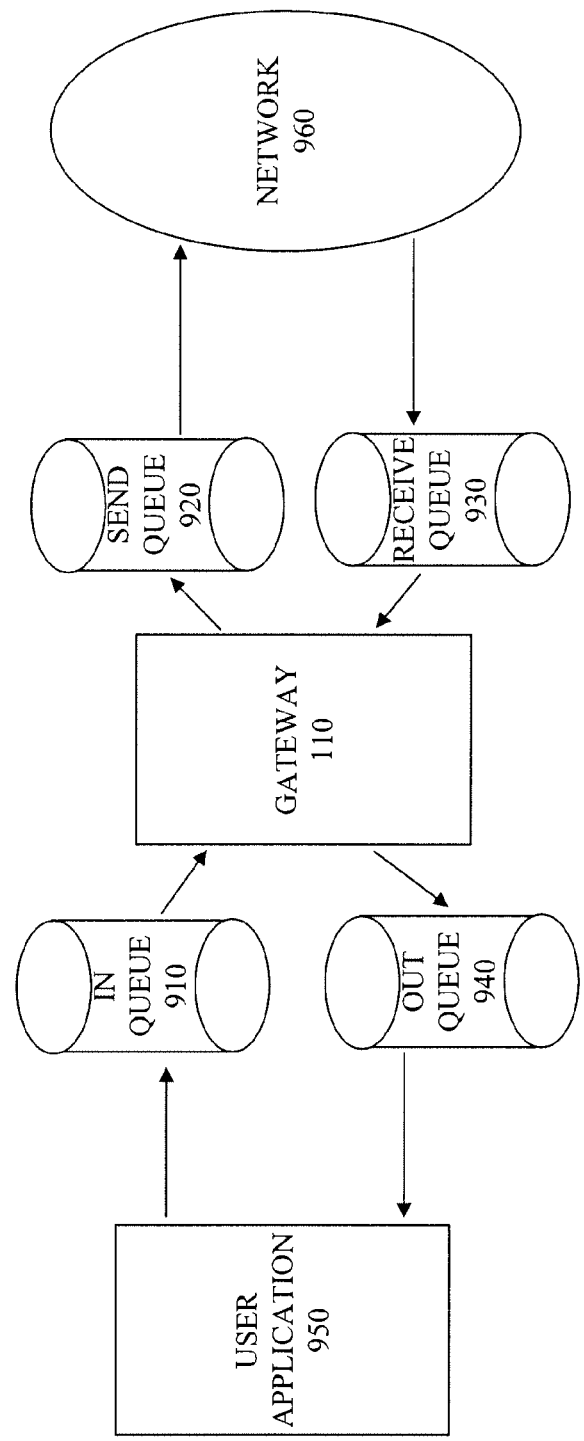
FIG. 9 illustrates a block diagram of a process flow with abstract queues, in accordance with an exemplary embodiment of the present invention.

In general, there are four types of abstract queues used for standard message processing—IN, OUT, RECEIVE, and SEND. They are paired as seen in FIG. 9. As shown in FIG. 9, IN Queues 910 get information from a user application 950 and present it to the gateway 110. After processing by the gateway 110, the SEND Queues 920 send the information as a gateway message to other gateways 110 through a network 960. The RECEIVE Queues 930 gets a gateway message from a sending gateway 110 via the network 960 and presents it to a receiving gateway 110. After processing by the receiving gateway 110, OUT queues 940 send information to a receiving user application 950.

Any number of abstract queues of each type can be utilized by one gateway 110. These abstract queues can provide different channels for an application to interact with a gateway 110 and for gateways 110 to interact with other gateways 110. The IN Queue 910 and OUT Queue 940 from one gateway 110 can also be configured to handle information to/from many user applications 950 as gateways 110 can run in a "server" mode.

Another example of an abstract queue is called a REPLYTO Queue, which is used to maintain a separate communication channel between the gateway 110 and user applications 950. The REPLYTO Queue is used to provide auxiliary information, including error messages. Messages on the REPLYTO Queue can be directed to any user application 950. For example, it may communicate with the user application 950 that sent the original message or it might communicate with a special error processing application. The REPLYTO Queue can be used for other administrative or system messages that can be conveyed to a user application 950.

Raw Message Formatters

Figure 10:
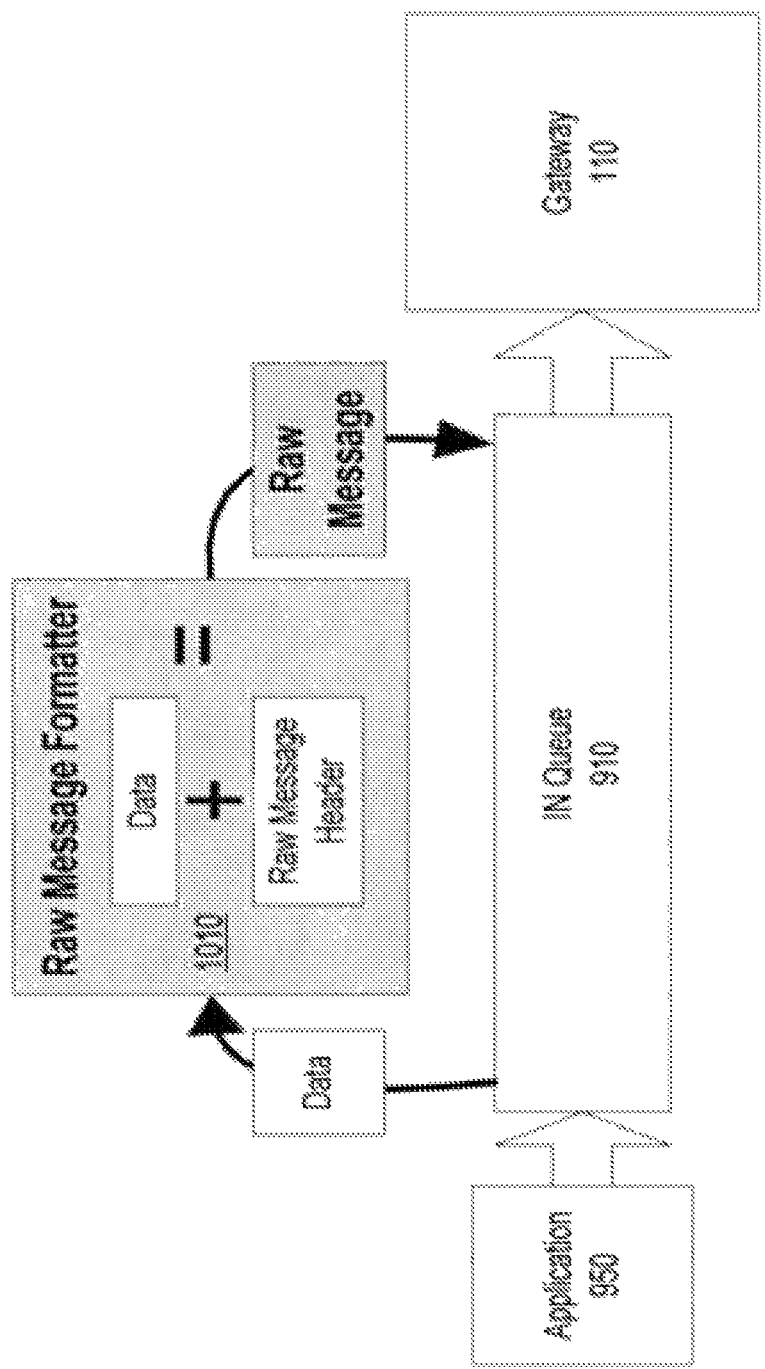
FIG. 10 illustrates a block diagram of a process flow for a raw message formatter in an IN queue, in accordance with an exemplary embodiment of the present invention.

Raw message formatters are used to standardize the connection between user applications 950 and the gateway 110. The IN Queues 910 have the job of providing enough information to a main gateway engine, in a standardized format, so that the engine can know how to process a payload into a gateway message. This information includes items such as transaction type and message type plus a bunch of other mandatory or optional parameters. A raw message formatter has the job of obtaining this information, storing it into a raw message header, and then bundling it with the payload received from a user application 950 to create a raw message. FIG. 10 illustrates this activity. As shown in FIG. 10, a raw message formatter 1010 receives data (i.e., an application payload) from an application 950, creates a raw message header from the received data, which is bundled with the raw message header to create a raw message that is provided to the gateway 110.

Figure 11:
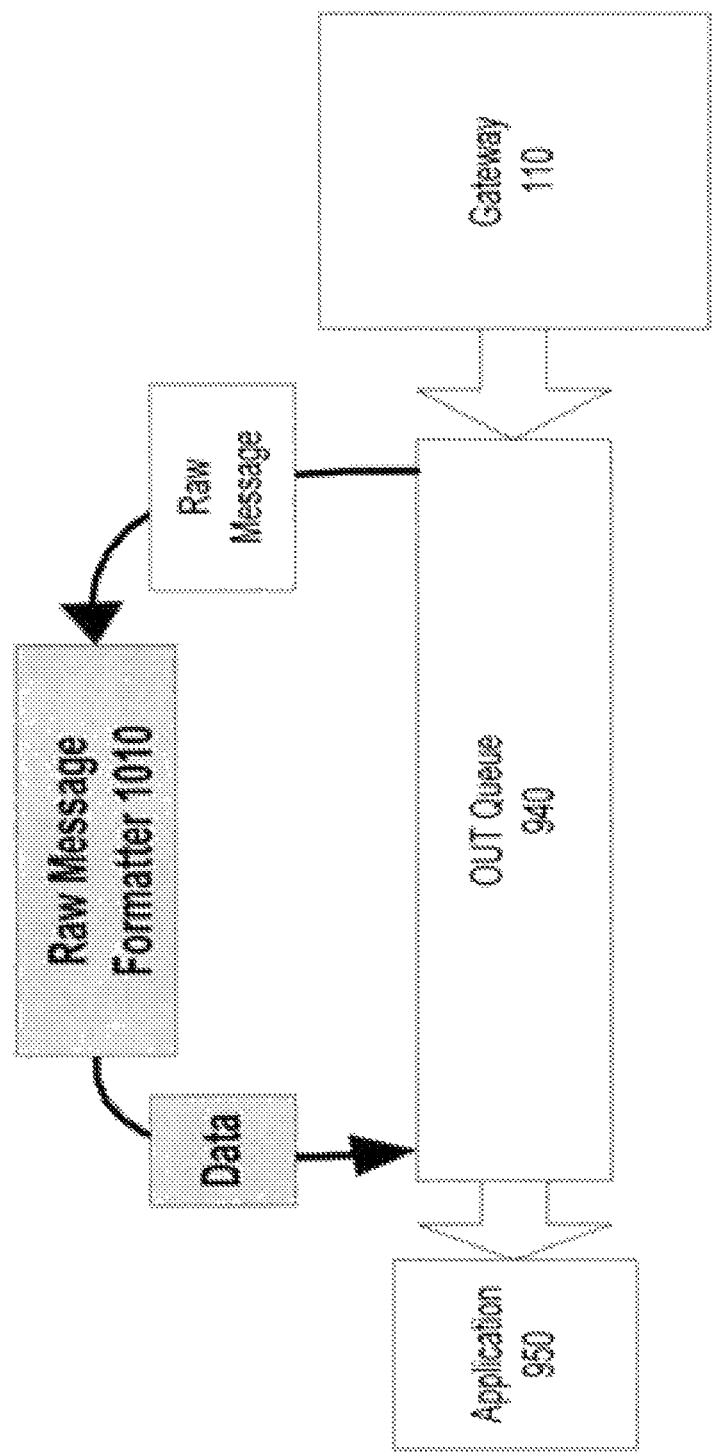
FIG. 11 illustrates a block diagram of a process flow for a raw message formatter in an OUT queue, in accordance with an exemplary embodiment of the present invention.

Conversely OUT Queues 940 have the job of taking a standardized raw message that has been created by the main gateway engine and putting it into a form that is expected by a user application 940 as illustrated in FIG. 11. As shown in FIG. 11, the gateway 110 provides the raw message to the OUT Queue 940, which converts it into data (or application payload) that is received by the application 950.

As with most components that make up the gateway 110, there is preferably a well defined API (Application programming Interface) for the raw message formatter 1010. Custom raw message formatters 1010 can be easily registered and used by the gateway 110. The gateway libraries also can include a set of standard raw message formatters 1010, in addition to custom raw message formatters 1010, that can be used for transformation between data and raw messages.

Wrapping Message Transports

Abstract Queues provide an abstraction layer that wraps an existing message transport so any underlying message transport can be used. There are lots of message transports, old and new, for moving data between applications—The Internet Protocol provides the most utilized transport layer. The Web Services (SOAP) messaging protocol is specifically designed to provide inter-application communication.

In addition, there are message transport products in a category called Message-Oriented Middleware (MOM), which are geared to transmitting and queuing messages, the most popular of which are IBM's MQSeries, and Tibco's Rendezvous. In addition, there is a general Java standard, Java Message Service (JMS) for which there are many implementations, as well as older mechanisms for transporting data, such as the File Transport Protocol, older styled (non-IP) networks, direct port-to-port transports, etc.

The abstract queues wrap (hide the actual workings of) any of these transports, providing a standard interface to the main gateway processing engine in the gateway 110. This wrapping can be complex, as it involves knowing underlying queue addresses, handling error conditions, querying for state, etc. Because Abstract Queues can handle a wide variety of message transports, gateways 110 can be used to setup peer-to-peer networks in an existing heterogeneous multi-enterprise messaging environment and create communication channels between legacy applications that were never designed to communicate with each other. It also means that applications can be a "user" of a gateway network without requiring significant recoding by using an abstract queue that fits the data being produced by the legacy (existing) application or that fits the access interface of the legacy application.

In general, applications 950 that are communicating with a gateway 110 are remote from the gateway, i.e., the applications 950 are running on a separate machine or in a separate partition of the same machine. However, there is a set of in-memory abstract queues that can provide efficient communication for applications 950 sharing the same memory space as the gateway 110. With this configuration, all of the regular abstract queue mechanisms and the normal processing of the gateway 110 can be utilized while the message transport is as efficient as it can be.

Reliable Messaging

The system 100 can provide reliable messaging, which basically means that a message will not get lost during transmission or local processing. It does not mean that nothing will happen to a message but rather that if something does happen, the system 100 will either fix the problem or reliably provide information as to what has happened to a message.

Transport Reliability

Since abstract queues wrap existing message transports, abstract queues can rely on the underlying message transport to provide transport reliability. Most modern message transports provide transmission reliability at least as an option and provide "guaranteed delivery" of a message of various sorts. Older transports such as FTP may not inherently provide guaranteed transmission reliability but will have some reliability mechanisms. The transport reliability for a "gateway" transaction will only be as good as the transport reliability of the underlying message transport used for that transaction. However, in order for a gateway 110 to discover problems when an underlying transport may be unreliable, it preferably includes a mechanism to reliably send internal "administrative" messages between gateways 110. Therefore a reliable message transport is bundled with the gateway 110 with appropriate SEND and RECEIVE abstract queues.

Local Processing Reliability

Messages cannot be lost while they are being processed within a gateway 110. To achieve this reliability, a message is not removed from an input abstract queue until it is finished processing and it has been queued on an output abstract queue. Therefore, if there is any abnormal termination of the processing the message will still be on the input Abstract queue and will be reprocessed. To be more specific, a message is not removed from the IN Queue 910 until it has been successfully queued on a SEND Queue 920 or until processing has been terminated by an error condition and a message has been placed on a REPLYTO Queue. Conversely, a message is not removed from the RECEIVE Queue 930 until it has been successfully queued on an OUT Queue 940 or has been terminated with a message on a REPLYTO Queue.

Process Flow in the Gateway

There are two streams of processing that go on within the gateway 110 once a message is received from an abstract queue: an IN-to-SEND process, which takes a payload from an application 950 and sends it as a message to another gateway 110; and a RECEIVE-to-OUT process, which gets a message from a gateway 110 and sends its payload to an application 950. Since these processes are more or less mirror images of each other, the following description is limited to the process flow for IN-to-SEND should be adequate.

Queue Listener

For each IN Queue 910, there is a queue listener. After an IN Queue 910 has created a raw message, the queue listener looks at the information in the raw message header, which preferably includes at least a transaction type and a message type, and instantiates a unit of work that processes the raw message into a gateway message. Since each unit of work can be configured to a transaction type and/or a message type, the procedures executed at each step of the message processing can be different for different messages. Also, since it is relatively easy to add custom procedures, there is great flexibility in how messages are processed.

Unit of Work

In the gateway 110, a unit of work, which has been initiated by the queue listener, is a self-contained class (process) that can be specific to a message type and/or transaction type and execute all the steps necessary to process a raw message into a gateway message. If a processing thread is available, then the unit of work will execute; otherwise, it waits for an available thread. As a result, messages can be processed in parallel up to the number of threads that are available from the thread pool.

Figure 12:
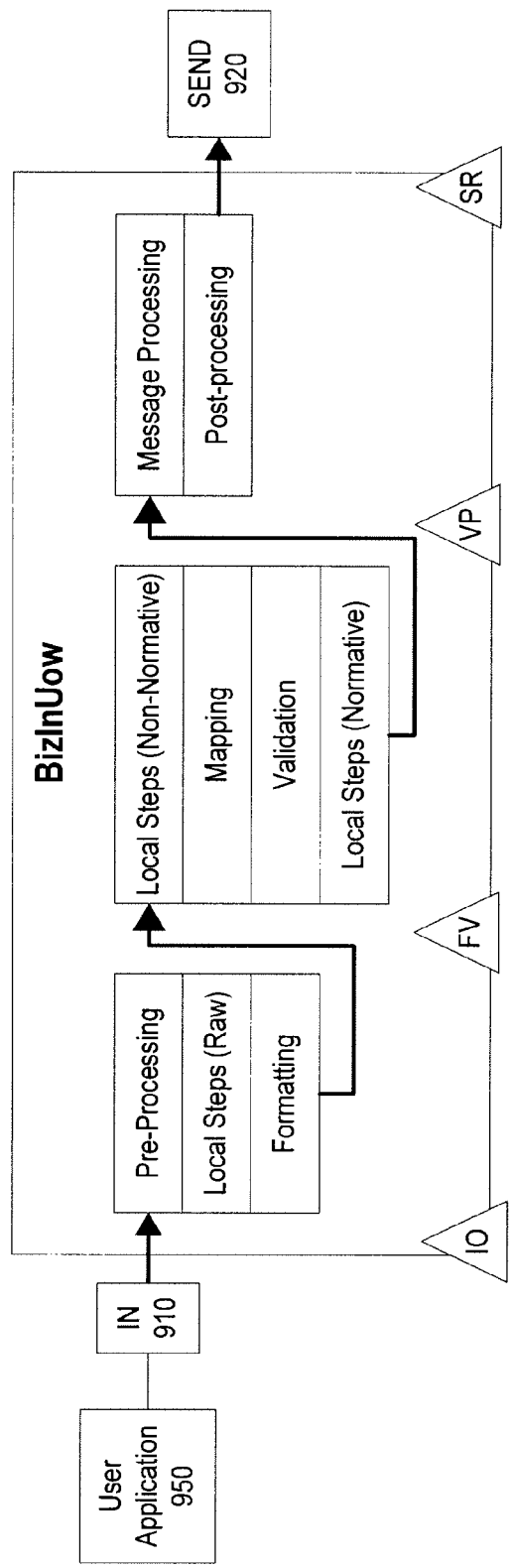
FIG. 12 illustrates a process flow for generating a gateway message from a raw message, in accordance with an exemplary embodiment of the present invention.

FIG. 12 is a diagram shows a template for an IN-SEND unit of work. The triangles in the diagram are breakpoints in the processing where the state of the message can be persisted to the gateway's local data store. The unit of work preferably persists the raw message at the beginning of processing (IO) and persists the message at the end of processing (SR) so there is always a record of what has been done to a message.

The table below explains theses steps. (The third column indicates where the information needed for a step is located in the configuration meta-data store.)

| | Description | How Configured |
| --- | --- | --- |
| (1) Pre-processing | stores the raw message to the repository | n/a |
| (2) Raw Local Steps | performs any custom local steps on the raw message | LOCAL_RAW process in TxnInfoFixed/TxnInfoLocal |
| (3) Formatting | transforms the raw message data to non-normative XML format, if required | FORMAT process in TxnInfoFixed/TxnInfoLocal |

| | Description | How Configured |
|---|---|---|
| (4) Non-normative Local Steps | performs any custom local steps on the non-normative XML message | LOCAL_NON_NORMATIVE process in TxnInfoFixed/TxnInfoLocal |
| (5) Mapping | transforms non-normative XML to normative XML | TRANSFORM in process TxnInfoFixed/TxnInfoLocal |
| (6) Validation | validates the normative XML message payload | VALIDATE in process TxnInfoFixed/TxnInfoLocal |
| (7) Normative Local Steps | performs any custom local steps on the normative XML message | LOCAL_NORMATIVE in process TxnInfoFixed/TxnInfoLocal |
| (8) Message processing | processes all standard and custom envelope blocks | Envelope Block processing in Envelope configuration entity |
| (9) Post-processing | the finalize step, which decides what happens next | FINALIZE process in TxnInfoFixed/TxnInfoLocal |

Many of the middle steps involve the processing of structured payloads. If a payload is a blob, then only steps 1, 2, 8, and 9 are executed.

In addition to the IN-SEND unit of work, there are a number of other units of work that are associated with a transaction type. These other units of work include: a RECEIVE-OUT unit of work, which is symmetrical to the IN-SEND unit of work since the steps are processed in reverse (but with different modules); a SYSTEM unit of work, which handles message information messages that need to be conveyed to an application such as Receipts, Rejections and Faults; an ADMINISTRATIVE unit of work, which handles a wide number of internal, gateway-to-gateway administrative transactions; and a U-TURN unit of work, which provides a mechanism to process a Request/response message or to perform a service within a transaction without needing to interact with a remote application.

U-Turns

U-turns allow a gateway to process a message purely through local processing, which typically includes executing custom procedures. A U-turn is accomplished by not putting a message that has been processed by a unit of work on an output abstract queue but sending it the appropriate input abstract queue.

For example, a message comes into the RECEIVE Queue 930 of a service gateway that has local procedures that can authenticate the sender of a message. Once the local processing is accomplished, instead of sending the message to an OUT Queue 940, it is directed to the queue listener of an IN Queue 910. A unit of work is executed, which in turn sends the processed message to a SEND Queue 920. The gateway 110 keeps track of the fact that these two units of work are linked together so that it can execute the proper actions in terms of error condition and reliable messaging.

With this unit of work approach, many messages can be processed in parallel, since the waiting units of work can grab threads as they become available from the pool, which makes the processing of messages by the gateway 110 reasonably efficient. In addition, the processing steps executed by a unit of work can be specific to a transaction type and message type, which provides a structured means for fine-grained processing of messages. The unit of work approach also permits customized local modules to be easily inserted into the processing steps, which allows for a wide range of custom behaviors. In effect, the gateway 110 can be configured as a specialized application platform.

Error Processing

When an error occurs in message processing a number of actions can take place. For example, there may be a need to communicate the error to the sending and/or receiving application. This communication can be accomplished by placing a message on a REPLYTO Queue. The REPLYTO Queue is preferably monitored by the target application or by a surrogate application that is handling error conditions for the target application. There are multiple categories of error messages including: Rejections, which are error conditions that are known; and Faults, which are error conditions that arise unexpectedly.

Certain processing errors can be logged and/or entered into the Message History block. In some cases, error conditions are packaged into administrative messages that can be transmitted to other gateways 110, or sent to a monitoring service utilizing, for example, the JMX protocol.

Queue Resolvers

Once a unit of work is finished processing or has terminated because of an error condition, its results (e.g., a message for a IN-SEND unit of work, a Raw Message for an RECEIVE-OUT unit of work) are sent to a queue resolver, which determines on which specific SEND, OUT or REPLYTO Queue the results should be placed. This determination can be a complex decision based on, for example, knowing which target applications are serviced by which queues, rules execution based on the message content, desired transmission formats, etc. In addition to queue resolvers in the gateways library, there can be a queue resolver API so that customized queue resolvers can be added.

Structured Payload Mapping

Many of the processing steps executed by a unit of work involve processing the structured payloads in a message. It can be desirable to have distributed processing of structured payloads. For example, by processing these structured payloads, the gateway 110 can validate messages locally before they are sent;

The gateway 110 is also useful in reliably moving blobs, which is payload content that the gateway 110 does not process but just passes on. However, the gateway 110 intelligently processing structured payloads can yield even greater value. For example, by processing structured payloads (or messages), the gateway 110 can validate messages locally before they are sent. Since it allows local processing, these errors can often be repaired within a gateway 110 through a custom procedure. By performing content mapping, the gateway 110 can produce payloads in the formats of each local application 950 it is serving. Through its mapping capability, the gateway 110 can greatly reduce the cost of change introducing new message standards that map to older standards so that no change in legacy applications are required to handle the new messages—a process known as "injection and versioning."

Figure 13:
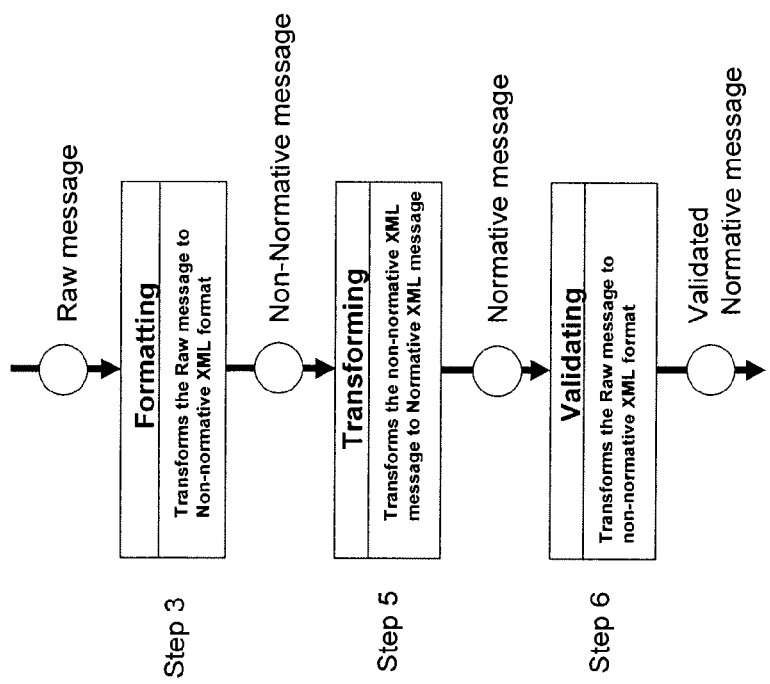
FIG. 13 illustrates a flow diagram of selected steps in the process flow of FIG. 12, in accordance with an exemplary embodiment of the present invention.

FIG. 13 is a diagram showing the major unit of work steps that involve message processing. Steps 4 and 7 involve local processing of messages. These local processing steps can be inserted in a unit of work anywhere. While the diagram of FIG. 13 portrays one step of each kind, there can be many steps of each type. In other words, there can be more than one transformation step; there can be more than one validation step, etc. As shown in FIG. 13, processed messages are converted from the form as received from an application 950 into a normative message format, which has utility in the system 100.

Normative Messages-Types

Normative messages ensure that a consistent payload format is sent between gateways 110 no matter what unique formats may be required by the applications 950 being serviced by a gateway 110. There are two dimensions that cause variability in the raw form of a message. One dimension is "spatial"—various applications may use different formats for a message, some being proprietary and some being based on different internal standards. The other is dimension is "time"—over time even industry standard message formats change. Rather than recode all of the legacy applications, it is simpler to map all the existing formats into a standard or normative form when sending a message, and in turn map this normative format into whatever version an application expects when receiving a message.

Since the normative messages are sent or received between gateways 110, the actual format of those messages is irrelevant to the outside world. Receiving applications 950 only get the raw messages they expect. The gateway 110 preferably uses an XML message format for normative messages, which is useful for a number of reasons. For example, XML messages are self-defining because they are based on an accompanying XML schema that defines the message's message type. Given an XML schema, message types can be deterministically converted into an object model, and this object model can be instantiated and used by local operations and gateway modules to process a message.

Currently, XML is a standard for all messaging. This means that many normative messages types can be in the same format as industry standard messages. In addition, users of the gateway will have existing XML schema for normative messages or will understand how to create them using the many known tools available for manipulating XML messages. For example, normative messages types can be first modeled as objects classes, using the more structured modeling paradigm of UML, and then automatically converted into an XML schema.

Since the normative form of a message is used entirely internally (i.e., within and between gateways 110), the gateway 110 can transmit these messages in very efficient internal formats. For example, normally XML messages are very verbose and are in character format, which requires parsing to be processed. Instead, the gateway 110 can transmit messages in an already parsed form, thus reducing the processing time.

In FIG. 13, step 3 (in the IN-SEND unit of work) involves a formatter that converts a structured payload from a raw message into a non-normative XML message. The formatter is configured to remove the structured syntax from a raw message and get the message into an XML format. Translating into a non-normative XML format avoids the difficulty of dealing with the structured syntax format found in raw messages. If the raw message is already in a valid XML format, with an associated schema, this step can be skipped.

Performing the syntax translation from a raw message to a non-normative XML message is a relatively complicated process that cannot be easily generalized. For example, it can involve parsing complicated fixed field EDI-like formats, such as the field formats found in older SWIFT messages. Rather than try and tackle the problem with one general formatter, the gateway 110 can offer are a number of formatters, each covering a category of raw formats, which simplifies the conversion problem. The particular formatter that is used can be determined in accordance with configuration data associated with that message type. To expand coverage or increase efficiency, it is also possible to add customized formatters, such as by using a standardized API and providing appropriate entries in the configuration data. For a RECEIVE-OUT process, there is a comparable set of formatters that will take a non-normative payload and create the appropriate raw message as expected by the user application 950.

Step 5 of FIG. 13 involves transforming, which is mapping a non-normative payload into a normative payload and vise versa. If the source payload is already in normative format, then this step can be skipped. A design tool, which can be referred to as a mapper, can be provided to define this mapping. The mapping is done from the non-normative format to the object model version of the normative payload. Mapping from the non-normative format to the object model version of the normative payload may be done because many industry standards are being defined based on UML models of the industry interactions. In those cases, the UML models of the transactions can be read in by the mapper to create the normative message type format.

The transforming step can be executed more than once, which enables versioning to be accomplished efficiently. To illustrate versioning, assume that the SWIFT system initially has an XML payment message called an MX103 that serves as a normative message. There will be many raw formats from many applications that are mapped to the MX103 message type. The SWIFT system then upgrades the message with a new version called MX103a. This new version becomes the normative message as it contains some additional fields. It would be inefficient to have to remap all of the raw messages into the MX103a format. Instead a two step transformation process is initiated. The first transformation maps raw messages as before into the MX103 format, and then a second transformation step maps the MX103 format into the MX103a format. In this manner, only the second transformation needs to be defined for all to utilize the new normative message type format.

For the RECEIVE-OUT process, there is a comparable set of transformers that will translate a normative message into a non-normative message.

Step 6 is FIG. 13 is performed to validate a normative payload. The mapper tool provides a means for entering validation rules and constraints for a normative message. The standard XML Schema for a message type provides validation rules for individual fields. The mapper also provides a dialect for appending cross field constraints to the schema to provide a fully validated payload. If a message is fully validated it can either be sent on to a SEND Queue 920 or sent to be processed into a raw message and sent to an OUT Queue 940. Other incarnations of a message can also be validated by using custom local operations.

Handling Collections of Messages

There are a number of reasons for a gateway 110 to act based on the state of a collection of messages in addition to processing individual messages. Doing so allows an application to maintain an association between heterogeneous messages or transactions, maintains integrity while processing batch files, and makes it possible to handle fuzzy two-phase commits when sending out a large set of configuration updates.

The gateway 110 supports several types of message collections including a GROUP, a SEQUENCE, and a SET. The parameters associated with these collections are contained in a COLLECTION block in the message header. A unit of work can call a specific collection procedure if a message is part of a collection. The selection of the appropriate collection procedure can be based on the collection ID and type. The gateway 110 is preferably bundled with some standard collection procedures to handle common uses of those collections, such as to handle a sequenced record in a batch or a fuzzy two-phased commit for software module distribution. The ability to handle these collection types in the system 100 is a useful capability and also creates some building blocks to execute complex transactions from simple transactions.

GROUPs

A GROUP is a loose and informal collection of heterogeneous messages and/or transactions for which a user application 950 wants to maintain an association. A GROUP is established by creating a unique GROUPID. Once established, the GROUP remains open until a message is received from an application or a remote gateway to close the GROUP. In most cases, GROUPs are not closed as there is little reason to do so. A message that is identified as part of a GROUP through its GROUPID can also be a member of a SEQUENCE or SET.

SEQUENCE

A SEQUENCE has an associated SEQUENCE-ID, SEQUENCE-Type, SEQUENCE-Number and SEQUENCE-End, which is a Boolean indicating whether the payload is the last element in the SEQUENCE. On return, the appropriate collection-procedure updates a set of state variables, the values of which direct actions to be taken by the calling unit of work. Actions usually are either to continue processing to throw an exception, i.e., process an error conditions, or execute a "choice" based on the state variable.

An example of using a SEQUENCE is for batch file processing. A very large percentage of automated transmission of information between enterprises is done by batch processing, which includes the movement of large files of bundled transactions. These bundles are treated as an ordered sequence of transactions. The sending application may assume that the record in the file will be processed in sequence and may build in dependencies based on this assumption. If each record in a batch file is to be processed and mapped as a separate message, the gateway 110 is preferably configured to preserve the designated sequence of messages so as to preserve the dependency for the receiving application.

SET

A SET is an unordered set of messages that when processed can create states that require action. For example, a Service Provider gateway can send out a large number of Request/Reply administrative messages whose payloads include a new message type schema and associated maps. The sending gateway can send these messages as a SET. The Reply, which will be sent by a targeted gateway, is that it has received the payload and is prepared to use it. The sending gateway will process these Replies as a SET, and when a critical mass of positive replies are received (e.g., 95% positive replies), the sending gateway will cause a new administrative message to be sent that tells all the receiving gateways that they can now use the new message type.

SETs have some characteristics of GROUPs and some characteristics of SEQUENCES. They have a SET-ID, a SET-Type, and a SET-End, but no sequence number.

Customization

The gateway 110 is designed so that most of its components can be replaced. To permit this replacement, a clean API can be presented for each component and specified parameters can be entered into the configuration data store so a new component can be invoked in the context of a transaction type and message type. This modular design makes it easy to create and distribute new versions of all of these components. More important, it allows a Service Provider to create custom modules and distribute them and it allows each member or user, through their administrator, to create customized modules. The customizability enhances the ability of the gateway 110 to provide custom processing specific to a single gateway and transaction type.

Below is a table of the components that can be customized or replaced.

| | |
|---|---|
| Out Queue Resolver | SEND Queue Resolver |
| Address Resolver | Network Address Resolver |
| Raw Formatter | Local Operations |
| Abstract Queue | Header Block Processors |
| Formatter | Crypto-Implementation |
| Admin Message Proc. | |

With such an open system, it is desirable that system security is maintained. Since these custom components are distributed as administrative messages, all of the security capabilities for gateway message processing are available for component access and distribution, including hierarchical access privilege maps, encryption, and digital signing to verify that modules have not been tampered with.

Rules Engine

The processing for customized modules may need decisions or actions based on rules. For example, a queue resolver associated with a SEND queue 920 might decide where to send a message based on the message content using a rule that "all payments going to Europe that are over $1 M must be sent to a small bank on the Isle of Mann." A data enrichment procedure might use a rule that "any Swiss bank payments where the beneficiary is specified with a name should be replaced with a coded account number." Or a screening procedure might use a rule that "any payments to banks in Afghanistan where the beneficiary's last name is Bin Laden should be flagged for review."

Gateways 110 preferably include a standardized business rules API so that business rules engines, conforming to this API, can be used. A conformant business rules procedure with a corresponding rules editor can be bundled with the gateway.

Data Enrichment

Data Enrichment involves the local insertion, update, or modification of elements in raw messages or gateway messages. Data enrichment can be used to convert data from one format to another, such as by replacing a national account number with an IBAN. It can also be used to provide data not supplied in the message itself. This is especially useful in moving data from one message format to another where the focus is on moving a subset of data in the first message to data in the second. Further, data enrichment can improve the efficiency of message transmission. A full XML Message or payload need not be transferred as long as through the effective use common content identifiers, data enrichment can fill in the missing elements. This type of data enrichment is useful when transmitting a binary form of a message that is to be turned into an instance of an XML model in the gateway 110 for proper processing. Another desirable use of data enrichment is to handle a key part of lossless conversions, i.e., the reconstruction of data which has been down-mapped or down transformed.

Security Mechanisms

The gateway's security mechanisms focus on the integrity and persistence of messages, data, and software. The focus of security in most other network-oriented applications is transmission security. Since the gateway 110 relies on and wraps external message transports, it relies on these transports to provide transmission security, such as for preventing interception of messages, man-in-the-middle attacks, etc. The gateway security mechanisms, which focuses on data security, can ensure privacy through encryption and ensure audit-ability through digital signing.

The Keystore

Each gateway 110 preferably includes a keystore, which is a storage location for securely keeping PKI certificates and private key pairs. Each gateway 110 keeps at least two current private key/public key certificate pairs, one for encryption and one for digital signing. The meaning of "current" is that the keys can be actively used and are valid. Certificates normally expire after a period just like a driver's license. However, because the gateway 110 is concerned with security for persisted data, its keystore must hold and manage all previous key pairs. As a result, persisted data can still be decrypted or its digital signing verified no matter how long it has been persisted. For example, by law, some persisted financial data must be readable and verifiable for as long as 80 to 100 years after it is first recorded.

The private key/public keys can initially be generated by each gateway 110 at initialization. As a default, the gateways 110 preferably do not rely on a certificate authority, so the generated public key certificate is not certified by a trusted third party. Certification involves a trusted third party digitally signing the certificate to authorize it. The security architecture in the gateway 110 allows for a hierarchy of trusted third parties to authorize a certificate, so a federated security model can be implemented. At a minimum, if the gateway is part of a BTA that is supported by a Solution Provider, the Solution Provider can act as a trusted third party and authenticate a gateway's certificates.

Security Policy Per Message Type

Message security can be managed by means of cryptographic policies for each message type. These policies can also be shared among all gateways 110 in a gateway network. These per message policies are preferably stored in a MsgInfo configuration section of the configuration file.

A cryptographic policy specifies a set of cryptographic actions that are performed in sequence on a message. These actions include, for example, encrypting some payload elements or an entire payload entity, signing some payload elements or an entire payload entity, and signing specific message header elements. Some header elements may not be able to be encrypted, such as elements in the security block.

When sending a message, the cryptographic actions specified in the message type policy in the MsgInfo configuration section are executed just before placing the message on a SEND Queue 920. For receiving a message, a gateway 110 performs the same actions in the reverse order just after removing the message from a RECEIVE Queue 930.

Use of Encryption

Encryption is used to protect payload data or some sections of the message header from unauthorized accessed by users while a message is being processed or while it is persisted. Public encryption is very specifically targeted to the holder of the private key that will be used for decryption. That means that one message may utilize a number of encryption signatures as service elements along a transaction path to deny access to some content and, in rare cases, the receiver of the message may need to be denied access to some elements that should only be available to a service. Instances may arise where the same payload is to be sent to many gateways. In that case, where individual encryption of each message instance would be too inefficient, it is possible to create an encryption certificate for a set of gateways 110.

Use of Digital Signings

Digital signings are used to validate identity and to ensure content integrity. A digital signing contains the signing gateway's identity, and a hash of the content that is being signed, which is all encrypted by the private key of the signing gateway. Digital signings can be hierarchical, i.e., the content that is signed can itself contain digital signatures. For example a time-stamp can be combined with a digital signature and that entity, itself, digitally signed to provide a verifiable signing time to the original digital signature.

To establish a secure identity, all public key certificates are digitally signed. These certificates contain a gateway's identity, its public key and other identifying information. Thus a gateway's identity can be verified along with the verification that a public key does belong to that gateway.

Any set of elements in a message or payload can be digitally signed, as defined by the cryptographic policy for that message. Digital signings within a Message will be persisted along with a message, since the signatures are stored in the Security Header block of the message. Other gateway entities, such as data frames, can also be digitally signed.

Digital signings provide a useful audit-ability capability. Not only are the signed records of a transaction persisted at one gateway, they will also, most likely, be independently persisted at the other gateways that have participated in the transactions. Since all transactions have unique IDs, all information about a transaction can, if needed, be aggregated to produce a robust and complete record of a transaction. This is especially true to settle disputes and allow for non-repudiation of a transaction. In the discussion of data frames, a use of signed data frames is presented that provides the most complete record of a transaction.

All the software modules (e.g., JAR files) used at runtime by a gateway 110 can be digitally signed. When a gateway 110 is started, these digital signatures are checked, and if they are not validated, the gateway will not start. Checking these digital signatures effectively makes the gateway 110 tamperproof. In general, all customized modules, even if they are purely local, are preferably sent to a Solution Provider so that they can be properly digitally signed.

Certificate Source

By default, certificates in the gateway network are self signed. That means that the chain of trust is only one deep, that one being a Solution Provider. However, any X509 certificate, e.g., from the GSA certificate authority, can be used.

Privileges

Privileges determine what access rights external entities have on a gateway's data store and meta-data store. These access rights include Read, Add, Update, and Delete. The access rights can apply to the various sections of configuration data, to other components of the meta-data, and to data in the data store. Privileges are applied when request messages are received by the gateway from the external entities. A digital signature can ensure the secure identity of the requesting entity.

Entities that can make these requests are a gateway administration tool, when used by a local member administrator, other gateways, and a special gateway that belongs to the Solution Provider. When a request requires an access right, the sender's identity is checked against a privilege table stored in the configuration data store. Privileges can be specified, in order of precedence, for any individual gateway 110, a Solution Provider (there are some privileges that can only be granted to the Solution Provider), a local entity (which is usually a request from the administration tool as exercised by a member administrator, the identity of the member administrator being stored in the gateway's configuration file), and a remote entity (which is usually another gateway 110).

The following partial table provides an example of the scope of privileges.

|  | SOLUTION_PROVIDER | LOCAL | REMOTE |
| --- | --- | --- | --- |
| Admin | READ ADD UPDATE DELETE | READ | READ |
| gatewayInfos | READ ADD UPDATE DELETE | READ | READ |
| Envelope | READ ADD UPDATE DELETE | READ | READ |
| FileSignatures | READ ADD UPDATE DELETE | READ | READ |
| InstanceData | READ | READ ADD UPDATE DELETE | READ |
| InstancePlugins | READ | READ ADD UPDATE DELETE | READ |
| MapComponent | READ ADD UPDATE DELETE | READ | READ |

Primary Value of Gateway Security

These various security mechanisms for gateways 110, in the aggregate, provide an effective solution to the problem of managing private keys and certificates. The larger the number of participants in a collaborative network and the more diverse the environments for those participants, the more difficult it is to maintain a secure PKI environment. In PKI, private keys need to remain private. In addition, certificates expire, forcing renewal of certificates in a secure and authenticated manner. The effort to manage certificates does not scale well. Rather, it gets more costly and complicated the more certificates need to be issued. This is especially true if private keys are somehow extended to cover the identity of actual (human) users.

The gateway 110 provides a controlled, closed cross-enterprise environment that has a consistent structure that is easy to manage where the number of private keys and certificates is limited to the number of gateways 110 in the network. To accomplish this, the PKI mechanisms maintained within the gateway 110 provide security and identification for the other players in the network, specifically human users and the user applications 950 interacting with the gateways 110.

Security Signing Service

The gateway 110 provides security mechanisms to applications 950 through a service and API that it offers where an application 950 can get a dataset encrypted or digitally signed using the gateway's key set. The gateway 110 also provides a unique digital signing for an application 950 when that application 950 is registered as a user of the gateway 110. This digital signing can be used by other gateways 110 and applications 950 to securely identify an application 950 that is the source of payloads.

Digitally Signed Signatures

The gateway 110 provides security mechanisms associated with human users of the system by providing identification through a digital signing essentially based on the user's actual signature. This digital signing can then be used as a secure identification of the individual, which provides the ability to permanently associate data with an individual. This is very useful for audit-ability and for avoiding mistakes when data, such as medical records, are associated with the wrong person.

Neither of the above mechanisms offers the full security that PKI-based private keys and certificates offer. But this level of security is often unnecessary. In the few cases where it is required, full PKI key pairs can be issued.

Persistent Message Data Store

The gateway 110 preferably includes a local database for persisting information about transactions, messages and payloads. When taken in aggregate across all of the gateways in a gateway network, these local databases form a distributed data store.

Persisting Message Data

In standard processing, an IN-SEND unit of work first records a raw message it receives, and as a last step, it records the processed message. These messages are preferably permanently stored in the data store as the last action of the queue resolver. This supports reliable messaging so that, if anything happens during unit of work processing, there will not be any erroneous message content stored in the database. For RECEIVE-OUT units of work, the order is reversed. If desired, these messages can be signed. This means that there is a record of the raw message and the processed message so that it is clear what processing was done by the gateway 110. Also, the state of a transaction as known by a gateway 110 is updated in the data store, such as an acknowledgement being received that a sent message was successfully received or the fact that a reply was received for a response message. These features can provide full transaction audit-ability.

Additional features of the gateway data store include, for example, the ability to activate a number of breakpoints during unit of work processing where the state of a message can be stored. This feature makes it possible to debug processing problems as they occur. In the definition of a message type, some fields in a structured payload can be identified as key fields. These key fields can be extracted from a message and stored in the data store to add in data querying.

Data Frames

When retrieving information from the data store, the gateway 110 generates a data frame. A data frame is a set of messages along with associated transaction data that is retrieved from the data store and/or a set of configuration meta-data.

Data Frame Content

The data frame, which is produced by processing a data frame request (query), can be delivered as a set of XML documents collected together into a Zip file. These XML documents comprise, for example, retrieved messages, including raw messages; all of the transaction data associated with messages; any logs concerning the processing of the included messages. There are also XML documents that describe and summarize the content of the data frame. Each of the XML documents in the data frame can be digitally signed, as well as the data frame itself, so any content changes can be detected.

Data Frame Request

A data frame request is preferably configured as an XML document that specifies the criteria for retrieving messages and their associated transaction data and specifies the criteria for retrieving configuration meta-data form the data store. The data frame request can be created, for example, using the gateway administrative tool. A data frame request can be written in a syntax that is similar to the syntax used in a SQL WHERE clause, as the gateway 100 can actual convert the data frame request into a SQL Query. Queries can include any defined key fields. Queries can include any transaction states, such as "Completed" transaction, "Failed" transactions, etc.

Separate query expressions can be prepared for production messages and those messages that have been stored in the data store at internal breakpoints. However, both query expressions can exist in the same data frame request.

Figure 14:
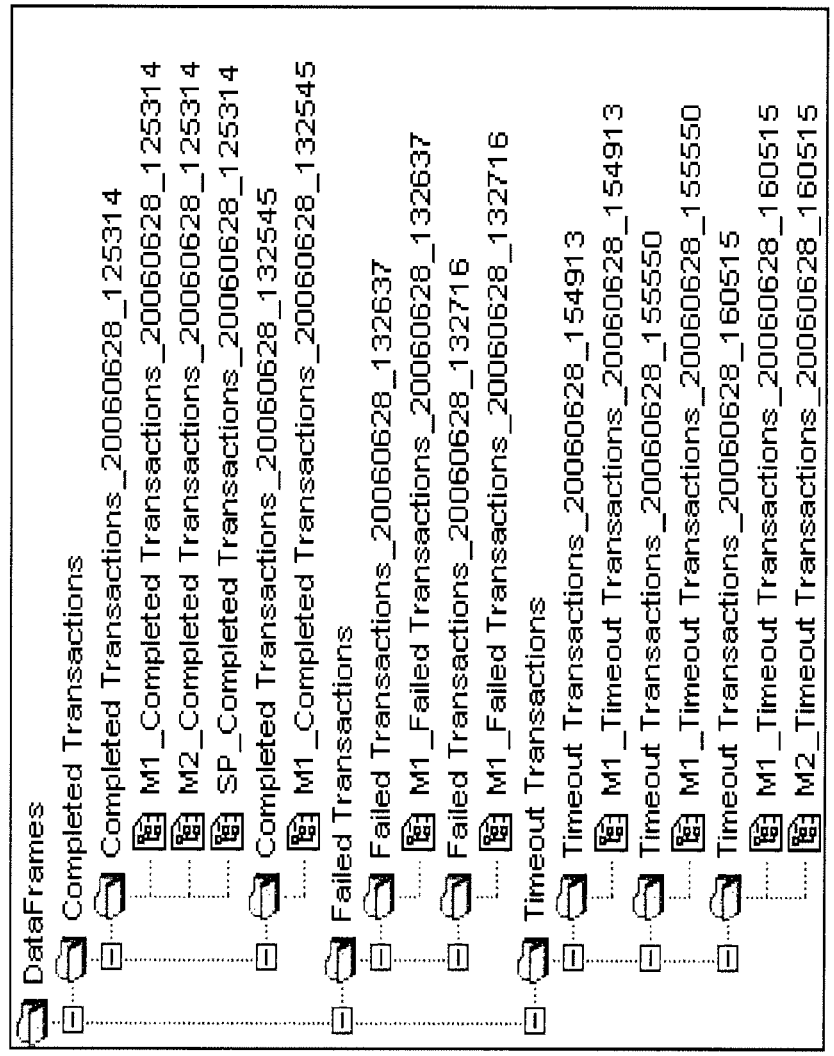
FIG. 14 illustrates an example of a data frame resulting from monitoring activity, in accordance with an exemplary embodiment of the present invention.

A data frame request XML document can be sent to a gateway as a message where it is processed. The resulting data frame is then sent back to the application or gateway that requested it. Since data frame requests are preferably implemented as XML documents, they can be used repeatedly. As a result, it is easy to set up data frame requests to provide effective monitoring of the activities of a gateway 110. FIG. 14 shows a simplified output of such a monitoring activity.

Delivering a Data Frame

A data frame request is received by a gateway 110 either from an application 950 or from a remote gateway 110. When a gateway 110 has executed the data frame request and produced a data frame, such as in the form of a zip file, the gateway 110 sends a response message treating the data frame as an attachment. This action leverages the flexibility of attachments, informing the requestor of the size of the data frame, allowing for the lazy reading of a data frame, as data frames can get very large.

Archiving with Data Frames

There are three modes for processing a data frame request. The mode discussed above is to "copy" the information and produce the data frame. A second mode is to "cut" or delete the information that is used to produce the data frame. The third mode is to "remote" the data by leaving the transaction information about a message in the data store, removing the message body, and replacing it with pointer to the data frame that will contain it.

The cut method provides a means to archive data and persist it for a long time. First of all, it removes data from the data store in a planned and orderly fashion, keeping that data store at a manageable size. The extracted data frames create a very usable archive of the message traffic. Since the documents in a data frame are preferably in an XML format, they can be read long into the future without requiring any proprietary software, including that of a gateway 110 or any of its tools. If an archive of the signing gateway's public keys is kept, then the digital signatures on the content of the data frame can assure that the integrity of the archives is maintained.

Audit and Non-Repudiation

Data frames are also useful to provide audit-ability and to provide non-repudiation of a transaction. All of the information concerning a transaction in a gateway's data store can be extracted and stored in a data frame, even including meta-data, that, for example, describe the syntax rules for describes definitions of a message syntax. This data frame can be digitally signed itself. Any information about a transaction at other gateways can also be extracted as signed data frames. All of these data frames form a complete and accurate record of a transaction that is audit-able and can be used for non-repudiation.

Configuration and State Data Store

Configuration and state data, which are stored in the data store, are used to control how a gateway 110 operates. This data is designed to make a gateway 110 self-contained and remotely controllable, i.e., any expected changes in the behavior of a gateway 110 can be instituted by sending a message that updates some configuration values and the state of the gateway 110 can be ascertained by querying state data. Configuration and state data can be queried and updated as long as the requestor has the appropriate privileges. Also, a standard API can be provided so that a software module running in the gateway 110 can directly access this data. A set of administrative messages can also be provided to add additional entities and parameters remotely to the configuration and state data as long as the sender has the appropriate privileges.

Configuration Data

Configuration data includes configuration entities, such as maps, transactions definitions, schemas, queue definitions, routing templates, etc., which are stored in the gateway's data store. The declarative configuration data contains all of the parameters to run the gateway 110. Updating the configuration entities allows gateway behavior to be changed without requiring recoding. Configuration entities can be updated through administrative messages received by the gateway 110, typically in the form of a data frame. Most updates can be implemented through a "hot" update, i.e., the gateway 110 does not have to be restarted for the update to take effect. Gateways 110 can operate in a self contained mode where behavior changes are brought about by updating configuration data through remote messaging, which essentially obviates the need for local access to a gateway 110 once it is up and running.

It is possible to set up a "static" BTA by providing all necessary configuration data during the initialization process. Such a BTA can work with client gateways without the need for any service nodes. More commonly, the Configuration data included at initialization can be just enough to get the gateway 110 running so that a full configuration data store can be bootstrapped through messaging with a service that provides the rest of the needed configuration data.

Configuration Entities Include the Following:

Admin—The Admin configuration entity specifies information about administrative transactions and messages.

GatewayInfos—The GatewayInfos configuration entity includes information about other gateways 110 in the gateway network with which a particular gateway 110 can exchange messages. It also includes information about a particular gateway 110 that is exposed to other gateways 110 in the gateway network.

Header—The header configuration entity defines the processing that occurs within a gateway 110 for the header part of a gateway message. It defines the blocks that are required and optional within the header, as well as the class that processes each block.

FileSignatures—The FileSignatures configuration entity can be used to sign one or more files associated with a configuration. When signing a file using this entity, the administration tool adds a file signature to the configuration together with a reference to the signed file. Any change in the file content can be detected.

InstanceData—The InstanceData configuration entity includes general options for a gateway 110, including instance name (gateway name), timeouts, thread pool options, JMX options, and logging options.

InstancePlugins—The InstancePlugins configuration entity specifies the classes used for the exception handler, OUT queue resolver, SEND queue resolver, local address resolver, network address resolver, and the Solution Provider instance name.

MapComponent—The MapComponent configuration entity includes certain XML files associated with a map. It includes:

MAP file: The map file. Pointer to the other files associated with the map;

OM file: The object model. There is one OM file in a map;

XM files: An XML model. There can be multiple XML models in a map, one for each schema; and OXM files: A mapping between an XML model and the object model. There can be multiple mappings in a map.

MsgInfo—The MsgInfo configuration entity shows the payload block(s) of a message. It also defines the cryptographic actions that are performed on a message.

OperationDefs—The OperationDefs configuration entity specifies classes and parameters for standard and custom operations.

OutQueueMaps—For each defined target application, the OutQueueMaps configuration entity specifies the local OUT queue target based on message type.

Privileges—The Privileges configuration entity sets access to configuration data and message data within the gateway network.

QueueDefs—The QueueDefs tab is used to set up gateway queues. Each queue that is set up is initialized when the gateway 110 is started. IN, OUT, SEND, and RECEIVE queues can be defined.

RawFormatterDefs—The RawFormatterDefs configuration entity defines the raw formatters that are available.

Schema—Each schema used in a gateway network, whether for business messages, administrative messages, or system messages, is a Schema configuration entity.

SendQueueMaps—The SendQueueMaps configuration entity controls how messages are routed to SEND Queues 920 from the gateway 110.

SystemMsgDefs—The SystemMsgDefs configuration entity shows the namespaces and content blocks for the system messages. System messages include Receipts, Rejections, and Faults.

TargetAppInfos—The TargetAppInfos configuration entity defines the physical address(es) to which messages associated with a particular application should be routed.

TxnInfoFixed—The TxnInfoFixed configuration entity specifies the steps that will be taken for particular transaction types within a gateway 110.

TxnInfoLocal—The TxnInfoLocal configuration entity specifies the steps that will be taken for particular transaction types within a gateway 110.

State Data

The parameters and entities stored as state data provide a profile of how a gateway 110 is operating. For example, this can include quality of service parameters, tracking parameters like the total number of messages received, and, often, licensing parameters to ascertain "charges" due. State data will also can variables utilized for the processing of collections.

Gateway-Based Business Transaction Application (BTA)

This section will present the general features of a Business Transaction Application as facilitated by a set of gateways 110.

Serviced-Oriented Architecture

An SOA (Service-Oriented Architecture) is a popular enterprise architecture. An SOA is a peer-to-peer network comprised of nodes that can usually be divided into client-nodes, which consume the processing done within the SOA, and service nodes, which provide an identifiable, single-purpose function to support a process. The nodes are coupled together through a set of gateway/adapters that interface with a network. One view of an SOA stack is presented in the diagram below. The adapter/gateways that service both client and service nodes operate in a true peer-to-peer fashion. In all cases, the gateway 110 is interacting with an application whether that application is a client or service application.

Composite Application

SOAs are typically focused on service nodes, creating "composite applications" out of existing applications. This involves wrapping legacy applications with a new interface so they can be called as a component (or service) in that composite application, much like independent procedures are called in a traditional programming language. In this context, there are typically a very small number of client nodes, such as a portal or a data warehouse. The adapter/gateways are focused on wrapping applications with a Web Services interface, which is a standard for wrapping processes with a standardized remote procedure call based on an XML standard. The process orchestration is done through a centralized business process monitor.

Business Transaction Application

Another use, and the original concept, for SOA networks is to perform loosely coupled applications between client nodes. These Business Transaction Applications (BTAs), which are based on messaging using defined and often standardized messages, are structured to perform specific applications that involve the exchange of information between client nodes. For example, the clearing and settling of payments between enterprises, the communication of information between different functions within an enterprise, etc. BTAs have been facilitated in the inter-enterprise space by Value-Added Networks (VANs) and within an enterprise by Enterprise Service Buses (ESBs).

The gateway 110 enables the implementation of a modern Business Transaction Application. A gateway peer-to-peer network is designed to support a very large number of heterogeneous, new or legacy client nodes. It treats client nodes as the true "users" within a BTA. The gateway 110 functions without the requirement for any centralized services, such as a transaction processor or centralized database. Basic functions of the gateway network are distributed and carried out within each gateway 110. In fact, a static gateway-based BTA can be set-up with no requirement for any services.

Services can be easily added to a gateway network, to add services to manage the BTA and provide specific, needed functionality.

Because of its fully distributed nature, the gateway 110 effectively supports inter-enterprise BTAs, where many client nodes wish to transact with many other client nodes and the maintenance of centralized procedures and services is more problematic. The gateway 110 also effectively supports intra-enterprise applications when peer-to-peer communication between client nodes is valued. This is especially applicable if the IT topology reflects the merger and acquisition of many divisions.

Gateway Location and EAI Engines

Location Independence

The gateway 110 is preferably designed as a logical gateway that provides a peer-to-peer connection between applications to run a Business Transaction Application. A gateway 110 can be located in the neighborhood of the applications 950 that it serves. However, in many cases those in control of a neighborhood, e.g., an enterprise's internal IT department, may not want the responsibility or the risk of having the gateway 110 physically located in their neighborhood. The gateway 110 is configured so that it can operate remotely from the applications 950 that it serving. This remote operation is possible as long as the networked connection between an application 950 and the abstract queues that service the application 950 is maintained. For example, the gateway 110 for a number of user applications 950 in an inter-enterprise BTA can exist in an external server farm and not reside within the user application's enterprise space.

Gateway Seen as a Centralized Processor

When gateways 110 are collected together on one or a set of servers, they take on many of the characteristics of a more traditional centralized Transaction or EAI (Enterprise Application Integration) engine. When viewed as a centralized engine, the collection of gateways 110 presents a profile with different benefits, which distinguish it from other transaction and EAI engines, such as a gateway's Chinese-wall privacy features. This different profile may be attractive to particular market segments of the traditional centralized VAN, EAI and Transaction market. For example, it can be used for a one-to-many, hub and spoke configuration, where an enterprise wants to service many of its counterparties (clients, suppliers, etc.) and flexibility for the gateway location is required.

Administrative Messages

The gateways 110 can communicate with each other through a set of "administrative" messages. These administration messages provide the mechanism for exchanging internal information of all sorts. Some examples of administrative messages include, for example, technical acknowledgements from a receiving gateway to a sending gateway that a message was received, a data frame request sent from a gateway to a remote gateway to retrieve information from the remote gateway data store, and a simple ping to make sure that a gateway is "up." Administrative messages make it possible to have a fully distributed system as they are used to implement coordinated activity in a gateway-based BTA.

System Messages-Types

System messages are a class of administrative messages used to communicate information between a gateway 110 and a user application 950 that it is serving. System messages can be placed on any OUT/SEND/REPLYTO queue. One example of a system message-type is the "RECEIPT." A RECEIPT is the technical acknowledgement that a message has arrived at its destination. It is sent by the receiving gateway to the sending gateway. The RECEIPT makes it possible for the source user application 950 to know that a message has been received. Not all messages require receipts. If one is required, the requirement will be configured in the message definition of that message type. If a RECEIPT is asked for and not received within a proscribed time, the sending gateway can assume it has an error condition.

Other system message type includes the "REJECTION" and the "FAULT." The REJECTION reports expected error conditions to a user application 950, such as that a message violates constraints specified in a validation rule, etc. A FAULT reports unexpected error conditions, such as that a module unexpectedly terminated its processing and throws an exception.

Administrative messages form the coordinating backbone of a BTA, so it is desirable that they are sent and received over a reliable message transport, which can be bundled with the gateway along with the appropriate SEND and RECEIVE abstract queues.

Creating Administrative and System Message Types

For both administrative and system messages, a new message can be easily added for those that have that privilege, which is usually a Solution Provider. The mechanism for defining a new message combines the normal designer processes for defining a message with the mechanism for defining an associated software module in a manner similar to the mechanism used to define an associated software module for a customized header block as described previously.

Dynamic Complex Transactions

Defining a Complex Transaction

Complex Transactions involve multi-step transactions among multiple user applications 950 in a BTA. For example, a merchant payment credit card payment may involve the following steps:

Merchant sends request for payment messages to its bank (Bank A) along with the customers bank ID (Bank B), and bank account and bank routing number;

Bank A sends notice of debit to Bank B;

Bank A bundles all request for payment messages into a batch file;

Bank A sends file to a clearing and settling agent;

Clearing and Settling agent nets out all debits and credits between Bank A and Bank B;

Clearing and Settling agent notifies Bank A and Bank B that netting transaction is settled;

Bank B deducts payment from customer's account;

Bank B sends payment acknowledgement to bank A; and

Bank A send payment acknowledgement to merchant.

Complex transactions can have complicated process flows and can, in turn, trigger numerous other complex transactions, such as an authorization or authentication actions.

Industry Approach

The industry norm is that these types of complex transactions are handled by some centralized process monitoring service. In fact, there are a couple of product classes that have emerged to deal with complex transactions—transaction monitors and business process monitors. In these systems, a central body such as a Solution Provider or standards organization is dictating the transaction flow for all users of the system. As a result, it can be difficult for users of a BTA to create competitive advantage, such as by doing things differently to give an enterprise a leg up on its competition, to respond to local market requirements, such as by adding a required step due to local regulations, or to respond quickly to changes in market conditions, such as by introducing a new payment partner which has slightly different requirement.

Gateway's Dynamic Complex Transactions

The gateway 110 provides a dynamic mechanism for complex transactions. It allows enterprise users to define their own customized transactions with effective transaction security, tracking and audit-ability. This is accomplished by building complex transactions out of the two-types of the simple transactions, Transmission and Request/Reply, bound together with a scripting language to define process flow. Since simple transactions cover the two basic types of interaction needed in a transaction, any complex transaction can be built using defined simple transactions. When a message arrives at a gateway 110, the gateway 110 can ascertain what step in a complex transaction is next required by referring to an enriched Routing Slip that describes the transaction and the steps already accomplished. Since the execution of the current step involves a defined simple transaction, the gateway 110 knows how to execute the required step. In addition, since the state of a transaction can be preserved simply by persisting a message, complex transactions can be paused to allow associated transactions to be completed through the use of a simple push-down stack mechanism. Upon the successful completion of associated transactions, the complex transaction can be resumed. This ability adds another level of dynamism to complex transactions while at the same time greatly simplifying the specification of nested complex transactions.

Remote Data Queries

Looking at a BTA from a top-down perspective, the data store in each gateway 110 becomes part of a distributed database. In order to coordinate this distributed database and take advantage of its unique features, it is useful for at least one gateway 110 to be able to retrieve data from one or more remote gateways 110. This ability can be accomplished by using data frame requests and data frames. Data frame requests are preferably created and stored as an XML document. There is an administrative Request/Response message that can carry a query as a payload. The receiving gateways executes the query and send back a Reply administrative message with a data frame as an attachment. The receiving gateway checks its privileges to make sure that the requesting gateway has the right to execute the data frame request. If the query is denied or if any other problem arises in executing the data frame requests, then the Reply will contain an explanatory payload. Data frame requests can be sent to multiple gateways as a SET, so the requesting gateway will know when all requests have been fulfilled.

Since data frame requests are preferably stored XML documents, sending them remotely can be scheduled, which makes them useful for many maintenance and monitoring activities over a set of gateways 110. This includes querying message, configuration and state data, or updating and deleting that data, if the sender has the appropriate privileges. For example, this includes data frame requests to remotely delete (cut) data from a database and archive it or to remotely update configuration data. All data frame requests and data frame responses can be signed, so there is an auditable record of the information gathered. A tool, such as the admin tool, can be used to create data frame requests and to display data frames. A number of useful parameterized data frame requests templates can also be provided in a library.

Audit-Ability and Non-Repudiation

The use of security features and data frames in a gateway network provides transaction audit-ability. Messages can be extracted on a periodic basis through data frame requests, signed and archived. Signed information about any specific transaction can be gathered through local and remote data frame requests. These queries can include not only a record of messages sent and received but also of all relevant configuration and state information, e.g., exactly what message type schemas and maps were utilized, etc. All of this information can be digitally signed with time stamps to provide powerful non-repudiation of all aspects of the transaction.

The Full BTA—Gateway-Based Services Nodes

While a gateway 110 is designed to not require service nodes, a fully effective BTA can make use of many services. Some of these services are useful for the smooth running, maintenance and enhancement of a gateway-based BTA. These, in general will be provided by the vendor and may be bundled with the product. Other services can be perceived to be mandatory for a particular BTA or class of BTAs. The Solution Provider, who is running that application, would add those services. There will also be room for services that enhance the capabilities of a BTA. These may be added by the vendor, the Solution Provider or a Third-party Provider. As long as any Provider properly utilizes a gateway 110 and integrates a service into the Routing Slip of various transactions, they can add a service to a BTA. Also any service can be replaced as long as the messaging interface of the original is maintained or new message type properly defined and integrated into a BTA.

Roles in Running a BTA

To better understand how a gateway BTA operates, it is useful to understand the roles played by persons or organizations involved in a BTA. While there is a lot of flexibility in how a BTA can be set up and managed, there are some standard roles for people and organizations that may be assumed in designing the gateway to support BTAs.

Solution Provider

For any BTA, there is some entity in charge, that can take help calls, initialize the BTA network, provide on-going updates, and if it is an inter enterprise BTA, make money by running the BTA. This entity/role can be referred to as the Solution Provider. The existence of a Solution Provider is a difference between gateway-based BTAs and transaction applications that simply provide connections between applications over the Internet.

Normally, there is one gateway in a BTA that is denoted as the Solution Provider gateway. This gateway has the widest array of privileges and is, initially, the only gateway that can author a change in privileges for other nodes. All of its authored changes will be appropriately signed for security reasons. Solution Providers can delegate privileges to other entities at their discretion.

Member Administrator

The Member Administrator role involves the ownership, maintenance and management of the client-side of a gateway 110, i.e., the "local" processing, in a BTA. Member Administrators can be responsible for one or more gateways 110. Since gateways 110 are all designed to operate in a self-contained manner, Member Administrators can interact remotely with the gateways 110 in their purview. The Solution Provider creates a Member Administrator by creating an appropriate privileges group. The Member Administrator can also delegate privileges.

Provided Central Services

The following is a listing of some preferable services bundled with a gateway 110 to allow for the general management and maintenance of a BTA. Services are typically applications that will send raw messages, usually raw administrative messages to one or more gateways 110.

Admin Tool

The Admin Tool is the primary application used by Solution Provider or Member Administrator to bootstrap, maintain and monitor a gateway 110. Since the Admin Tool is an application, it can communicate with a local gateway (one for which it is registered) by sending a raw administrative message.

The Admin Tool can create, update and package all of the components of a gateway 110, e.g., configuration data, maps, schema, software modules, etc. In many cases, the packaging of these components can be in the form of a data frame. The Admin Tool also can have a data frame editor that can be used to create data frame requests and to view data frames.

Gateway Deployment

The Admin Tool is used to create the set of files that are used to initialize a gateway 110. Normally, the first gateway that must be setup is the Solution Provider gateway, as this is the gateway that has controlling privileges. Then a normal gateway installation will be done through a bootstrapping process. A "disk image" will be prepared that includes all the basic software modules and a minimum number of meta-data components to allow the new gateway to communicate with at least one other gateway, in most cases the Solution Provider gateway. This package will include an installation program that instantiates the new gateway. Once instantiated, the new gateway can acquire additional modules and data, usually from the Solution Provider gateway, another central service or through a Member Administrator, to become fully configured. The use of SETs and SEQUENCEs can support bootstrapping by making sure that all required messages are received.

Gateway Updates

All updates are created and packaged using the Admin Tool. In preparing updates, including software modules, the Admin Tool can specify the set of gateways 110 to receive these updates. The Admin Tool's local gateway will send administrative messages to each target gateway. It can utilize digital signing in sending the updates to verify their integrity. The gateway 110 has a bundled SET process for executing updates using a fuzzy two-phase commit scheme so that changes are only operational when a critical mass of target gateways have incorporated them.

Map Designer

The Map Designer is a separate application that creates, edits, and packages transaction/message maps. These packaged maps are then picked up by the Admin Tool for distribution. The Map Designer preferably includes the features of ObjectSpark, a product of FireStar and described in U.S. Pat. Nos. 5,522,077, and 5,542,078, 5,937,402, and 6,101,502.

Setting Network Topology

Normally, a gateway-based BTA will involve a dynamic set of gateways 110 (new ones being added, existing ones being decommissioned, etc.), and typically there will be an administrative entity that has responsibility for managing the BTA. That entity preferably knows the topology of the network it is serving. Also, each gateway 110 preferably knows what set of remote gateways with which it can interact. There are two bundled services that are provided to manage the topology of the BTA network.

Registration

A Registration Service keeps track of a profile of all the gateways 110 in the BTA. When a gateway 110 is initialized or when its profile changes, it sends an administrative Message to the Registration Service. As a last act, when a gateway 110 is removed from the BTA, the Registration Service is also informed. The Registration Service is responsible for providing a new gateway 110 with the address configurations of the set of gateways 110 with which it can communicate and for informing an existing set of gateways 110 with the address configuration of the new gateway 110. Also, the Registration Service can include, in effect, a schematic of the BTA's topology. This is useful for various maintenance and monitoring functions, such as for reconstructing a network where many nodes have been corrupted.

A basic Registration Service is bundled with the gateway 110 but there are many options for a Solution Provider to provide their own service. The only constraint is that the raw messages being passed between the service and its local gateway adhere to the standard raw administrative messages that are defined for Registration. Included in this set of raw administrative messages are a set of specific queries so that the network topology can be explored.

Privileges

Privileges are a mechanism for refining the topology of a BTA network. The Registration Service and the registration information in a local gateway's configuration data store indicate the remote gateways with which a local gateway can communicate. The privileges in the local configuration data define what action and access remote gateways can perform in relationship to the local gateway with which they can communicate.

Normally, an initial set of privileges will be contained in the initial instantiation of a gateway 110. These initial privileges will, at a minimum, allow a Solution Provider read/write access to much of the local gateway's meta-data. These initial privileges can also provide read/write access to a Member Administrator for certain sections of the meta-data and message data store, while denying similar write access to the Solution Provider or any other remote gateway for those sections. This arrangement ensures that aspects of the data store will remain private. After the initial setup, Privileges can be updated through the appropriate administrative message.

Remote Maintenance and Monitoring

In a gateway network, all aspects of monitoring and maintenance, including bug tracking, can be done remotely. Maintenance that does not require human participation can handled through administrative messaging. Normal maintenance activity includes, for example, updating a gateway database, remote querying of the message database, etc. Remote UI-based tools can be provided for maintenance activities that do require human participation. The remote monitoring and maintenance capabilities are designed to work over diverse WAN networks such as the public Internet. For example, in addition to traditional active network monitoring mechanisms, gateways 110 support passive or reactive mechanisms in order to provide effective monitoring in a WAN.

Below are monitoring and maintenance capabilities that are bundled with the gateway 110.

Viewer

The Viewer is a local UI-based application that can be embedded with every gateway 110. It provides capabilities to monitor the processing of a message within a gateway 110 and a testing framework to setup debugging, tracing and testing scenarios. A browser-based remote access tool can be bundled with the gateway 110 to provide the ability to operate the Viewer remotely.

Active and Passive Monitoring

Active Monitoring

A set of administrative messages are provided to provide data for active monitoring of gateway states. These range from simple pings to ascertain that a gateway 110 is up to a set of canned data frame requests that can provide an operational profile of a gateway 110. In order to provide this profile, there are a set of state variables that can be maintained in the configuration data store that are consistently updated by a local gateway.

For certain operational problems within a gateway 110, the normal communication channels that utilize abstract queues may not work. There is a standard industry network monitoring and messaging channel that can be accessed through a standard interface called JMX. This messaging standard handles very simple, structured messages but is built to be very robust. The gateway 110 preferably includes capabilities to handle a set of monitoring messages using the JMX interface. In addition to adding robustness and redundancy to monitoring a BTA, this JMX channel is useful because it is an industry standard, and the gateway JMX messages can be incorporated into existing network monitoring facilities. The use of JMX in a gateway-based BTA is primarily active monitoring. Regular heartbeats are sent to a gateway 110 being monitored to make sure that it is up and operating. Direct requests can be made of a gateway 110 to make sure key components, such as each abstract queue, are also up and operating. A gateway-based BTA can bundle a monitoring console to display the results of JMX monitoring.

Reactive

Reactive monitoring also makes use of both standard administrative messages and JMX. It differs from active monitoring as it relies on indirect detection of an error condition. For example, if the SEND Queue 920 in a sending gateway gets an error message that it cannot reach the receiving gateway, a message can be sent to a monitoring service that there is a possible problem. At that point, the monitoring service can initiate active monitoring to investigate the problem Store and Forward A gateway 110 can offer special services to deal with either deliberate or accident situations in which a receiving gateway is not operating. For example, if a gateway 110 is not active but has requested the availability of a "post office box," then messages directed to it will automatically be redirected to the store and forward service, which holds the messages until the receiving gateway is up again and requests its mail.

In accordance with the foregoing embodiments, a system and method for accessing messages in a data store in a gateway comprises receiving a data frame request, which is a structured SQL query, applying the received data frame request to the gateway data store, which stores messages, and generating a data frame comprising messages from the data store that are responsive to the received data frame request, the data frame having a format that is readable by a character editor. Configuration data and state data can also be stored in the gateway data store, wherein the data frame further comprises at least one of configuration data or state data from the data store that is responsive to the data frame request.

The messages from the data store that are provided in the data frame can be deleted from the data store. Each message preferably includes a header and a payload, wherein the payloads are deleted from the data store of the messages that are provided in the data frame. A reference is added to the data store of the data frame having the payloads deleted from the data store. In addition, the at least one of the configuration data or the state data can be deleted from the data store that are provided in the data frame.

The data frame can be imported into the gateway data store. When generating the data frame each of the one or more messages in the data frame can be formatted as an XML document. In addition, each of the XML documents in the data frame can be collected into a Zip file. The data frame is transmitted to a source of the data frame request.

At least one of the messages in the data frame can include financial transaction data, medical or patient data, security and access control data, compliance and regulatory data, or communication protocols and network data.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments (which can be practiced separately or in combination) were chosen and described in order to explain the principles of the invention and as a practical application to enable one skilled in the art to make and use the invention in various embodiments and with various modifications suited to the particular uses contemplated. It is intended that the scope of the invention be defined by the claims appended hereto and their equivalents.

What is claimed is:

1. A method for accessing transaction messages in a data store of a first gateway, comprising:
   receiving, by the first gateway, a data frame request from a second gateway, the data frame request comprising a structured query and including criteria for retrieving at least one transaction message transmitted by or received at the first gateway and stored in the data store of the first gateway,
      wherein the at least one transaction message stored at the first gateway includes information of a transaction identified by metadata associated with the at least one transaction message, the metadata comprising a unique message identifier and zero or more of a unique transaction identifier, a message type, or a transaction type, and
      wherein the criteria for retrieving the at least one transaction message included in the data frame request includes the metadata associated with the at least one transaction message;
   retrieving, by the first gateway, the at least one transaction message from the data store of the first gateway using the criteria for retrieving the at least one transaction message included in the received data frame request; and
   generating, by the first gateway comprising at least one processor, a data frame comprising the at least one transaction message retrieved from the data store of the first gateway, the data frame having a format that is readable by a character editor; and
   sending, by the first gateway to the second gateway, responsive to the data frame request, the generated data frame.

2. The method according to claim 1, further comprising: storing state data as metadata associated with the transaction message in the data store of the first gateway; and retrieving the state data for generating the data frame based on a data frame request criteria.

3. The method according to claim 1, further comprising deleting the at least one transaction message from the data store of the first gateway that are provided in the generated data frame.

4. The method according to claim 1, wherein the at least one transaction message in the data store of the first gateway includes a header and a payload, the method further comprising:

deleting, from the data store, the payload of the at least one transaction message that are provided in the generated data frame; and creating a reference to the generated data frame that contains the delete payload, the reference being stored in the metadata of the transaction message.

5. The method according to claim 1, further comprising importing, by the second gateway, the at least one transaction message including the metadata in the generated data frame into the data store of the second gateway.

6. The method according to claim 1, wherein at least one of the transaction messages in the data frame includes financial transaction data.

7. The method according to claim 1, wherein at least one of the transaction messages in the data frame includes medical or patient data.

8. The method according to claim 1, wherein at least one of the transaction messages in the data frame includes security and access control data.

9. The method according to claim 1, wherein at least one of the transaction messages in the data frame includes compliance and regulatory data.

10. The method according to claim 1, wherein at least one of the transaction messages in the data frame includes communication protocols and network data.

11. The method according to claim 1, wherein the data frame request is one of a set of data frame requests being sent by the second gateway, the set of data frame requests including requests for the information of the transaction identified by metadata associate with the transaction messages, and at least one of the set of data frame requests being sent to another gateway, further comprising:

receiving, by the second gateway, a first response message from the first gateway and a second response message from the another gateway; and generating, by the second gateway, a second data frame comprising at least one of the response messages received from the first gateway and the another gateway.

12. A method for accessing data in a data store in a first gateway, comprising:

receiving, by the first gateway, a data frame request from a second gateway, the data frame request comprising a structured query and including criteria for retrieving state data stored in the data store of the first gateway;

wherein the state data is associated with at least one transaction message stored at the first gateway, the at least one transaction message including information of a transaction identified by metadata associated with the at least one transaction message, the metadata comprising a unique message identifier and zero or more of a unique transaction identifier, a message type, or a transaction type, and wherein the criteria for retrieving the state data included in the data frame request includes the metadata associated with the at least one transaction message;

retrieving, by the first gateway, the state data from the data store of the first gateway using the criteria for retrieving the state data included in the received data frame request; and generating, by the first gateway comprising at least one processor, a data frame comprising the state data retrieved from the data store, the data frame having a format that is readable by a character editor; and sending, by the first gateway to the second gateway, responsive to the data frame request, the generated data frame.

13. The method according to claim 12, wherein the data frame request is one of a set of data frame requests being sent by the second gateway, the set of data frame requests including requests for the state data identified by metadata associate with the transaction messages, and at least one of the set of data frame requests being sent to another gateway, further comprising:

receiving, by the second gateway, a first response message from the first gateway and a second response message from the another gateway; and generating, by the second gateway, a second data frame comprising at least one of the response messages received from the first gateway and the another gateway.

14. A gateway for storing and accessing transaction messages in a data store, comprising:

a processor; and a memory, coupled to the processor, the memory comprising a plurality of instructions executed by the processor, the plurality of instructions configured to:

receive, at the gateway, a data frame request from a second gateway, the data frame request comprising a structured query and including criteria for retrieving at least one transaction message transmitted by or received at the gateway and stored in the data store of the gateway;

wherein the at least one transaction message stored at the first gateway includes information of a transaction identified by metadata associated with the at least one transaction message, the metadata comprising a unique message identifier and zero or more of a unique transaction identifier, a message type, or a transaction type, and wherein the criteria for retrieving the at least one transaction message included in the data frame request includes the metadata associated with the at least one transaction message;

retrieve, at the gateway, the at least one transaction message from the data store of the gateway using the criteria for retrieving the at least one transaction message included in the received data frame request; and generate, at the gateway, a data frame comprising the at least one transaction message retrieved from the data store, the data frame having a format that is readable by a character editor; and send, to the second gateway, responsive to the data frame request, the generated data frame.

15. The gateway according to claim 14, wherein the memory further comprises instructions configured to:

store state data as metadata associated with the transaction message in the data store of the gateway; and retrieve the state data for generating the data frame based on a data frame request criteria.

16. The gateway according to claim 14, wherein the memory further comprises an instruction configured to delete the at least one transaction message from the data store of the gateway that are provided in the data frame.

17. The gateway according to claim 14, wherein the at least one transaction message in the data store of the gateway includes a header and a payload, wherein the memory further comprises instructions configured to:

delete from the data store the payload of the at least one transaction message that are provided in the generated data frame; and create a reference to the generated data frame that contains the delete payload, the reference being stored in the metadata of the transaction message.

18. The gateway according to claim 14, wherein the memory further comprises an instruction configured to import the at least one transaction message including the metadata in the generated data frame into a data store of the second gateway.

19. The gateway according to claim 14, wherein the data frame request is one of a set of data frame requests being sent by the second gateway, the set of data frame requests including requests for the information of the transaction identified by metadata associate with the transaction messages, and at least one of the set of data frame requests being sent to another gateway, further comprising:

receiving, by the second gateway, a first response message from the gateway and a second response message from the another gateway; and generating, by the second gateway, a second data frame comprising at least one of the response messages received from the gateway and the another gateway.

20. A gateway, comprising:
a data store storing transaction messages, each message including a message header with one or more header blocks and a payload;
an abstract queue configured to receive a data frame request from a second gateway comprising a structured query and including criteria for retrieving at least one transaction message transmitted by or received at the gateway and stored in the data store of the gateway,
wherein the at least one transaction message stored at the first gateway includes information of a transaction identified by metadata associated with the at least one transaction message, the metadata comprising a unique message identifier and zero or more of a unique transaction identifier, a message type, or a transaction type, and
wherein the criteria for retrieving the at least one transaction message included in the data frame request includes the metadata associated with the at least one transaction message;
at least one processing unit configured to:
retrieve the at least one transaction message from the data store of the gateway using the criteria for retrieving the at least one transaction message included in the received data frame request;

generate a data frame comprising the at least one transaction message retrieved from the data store, the data frame having a format that is readable by a character editor; and send, from the gateway to the second gateway, responsive to the data frame request, the generated data frame.

21. The gateway according to claim 20, wherein the data store further includes state data as metadata associated with the transaction message, and wherein the data frame further comprises the state data retrieved from the data store based on the data frame request.

22. The gateway according to claim 20, wherein the at least one processing unit is further configured to delete the at least one transaction message from the data store of the gateway that are provided in the generated data frame.

23. The gateway according to claim 20, wherein the at least one processing unit is further configured to:

delete the payload of the at least one transaction message that are provided in the generated data frame; and create a reference to the generated data frame that contains the delete payload, the reference being stored in the metadata of the transaction message.

24. The gateway according to claim 20, wherein the second gateway is configured to import the at least one transaction message including the metadata in the generated data frame into a data store of the second gateway.

25. The gateway according to claim 20, wherein the data frame request is one of a set of data frame requests being sent by the second gateway, the set of data frame requests including requests for the information of the transaction identified by metadata associate with the transaction messages, and at least one of the set of data frame requests being sent to another gateway, further comprising:

receiving, by the second gateway, a first response message from the gateway and a second response message from the another gateway; and generating, by the second gateway, a second data frame comprising at least one of the response messages received from the gateway and the another gateway.

\* \* \* \* \*